US012663621B2

(12) United States Patent
Nihei et al.

(10) Patent No.: US 12,663,621 B2
(45) Date of Patent: Jun. 23, 2026

(54) OPTICAL LENS, CAMERA MODULE, AND ELECTRONIC DEVICE

(71) Applicant: HUAWEI TECHNOLOGIES CO., LTD., Shenzhen (CN)

(72) Inventors: Yasuhide Nihei, Tokyo (JP); Takumi Matsui, Tokyo (JP); Kaiyuan Zhang, Dongguan (CN); Liuchang Xiao, Dongguan (CN); Rongkai Feng, Shenzhen (CN); Yita Chiang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 275 days.

(21) Appl. No.: 18/558,167

(22) PCT Filed: Apr. 18, 2022

(86) PCT No.: PCT/CN2022/087472
§ 371 (c)(1),
(2) Date: Oct. 30, 2023

(87) PCT Pub. No.: WO2022/228189
PCT Pub. Date: Nov. 3, 2022

(65) Prior Publication Data
US 2024/0210664 A1 Jun. 27, 2024

(30) Foreign Application Priority Data
Apr. 28, 2021 (CN) .......................... 202110479020.1

(51) Int. Cl.
*G02B 15/14* (2006.01)
*H04N 23/55* (2023.01)
*H04N 23/958* (2023.01)

(52) U.S. Cl.
CPC ......... *G02B 15/1421* (2019.08); *H04N 23/55* (2023.01); *H04N 23/958* (2023.01)

(58) Field of Classification Search
CPC ... G02B 9/60; G02B 9/62; G02B 9/64; G02B 13/009; G02B 13/0045; G02B 15/1421; G02B 15/15; H04N 23/55; H04N 23/958
See application file for complete search history.

(56) References Cited

U.S. PATENT DOCUMENTS

| | | | |
|---|---|---|---|
| 5,463,499 A | 10/1995 | Ito et al. | |
| 2003/0076601 A1 | 4/2003 | Yoneyama | |

FOREIGN PATENT DOCUMENTS

| | | | |
|---|---|---|---|
| CN | 1147097 A | 4/1997 | |
| CN | 1213085 A | 4/1999 | |

(Continued)

OTHER PUBLICATIONS

Warren J Smith Ed—Warren J Smith: "Excerpt. "Scaling a Design, Its Aberrations, and Its MTF"", Jan. 1, 1992 (Jan. 1, 1992), Optical and Electro-Optical Engineering Series(Optics Toolbox); [Optical and Electro-Optical Engineering Series], Mcgraw-Hill, New York, pp. 57-58, XP007908443.

*Primary Examiner* — Jack Dinh

(57) ABSTRACT

This application provides an optical lens, a camera module, and an electronic device. The optical lens includes a first lens element group and a second lens element group. The first lens element group and the second lens element group each include a plurality of lens elements. In different use scenarios, the second lens element group can be moved to change a distance between the first lens element group and the second lens element group, to change a focal length of the optical lens. In this application, the second lens element group is disposed within a back focal length range of the first lens element group.

19 Claims, 31 Drawing Sheets

(56)     References Cited

FOREIGN PATENT DOCUMENTS

| CN | 1749798 | A | 3/2006 |
| CN | 109212729 | A | 1/2019 |
| CN | 112612125 | A | 4/2021 |

656 nm 486 nm 587 nm 1.00

0.75

486 nm 0.50

656 nm 587 nm 0.25

−0.200        −0.100        0.0        0.100        0.200

OPTICAL LENS, CAMERA MODULE, AND ELECTRONIC DEVICE

This application is a National Stage of International Application No. PCT/CN2022/087472, filed on Apr. 18, 2022, which claims priority to Chinese Patent Application No. 202110479020.1, filed on Apr. 28, 2021, both of which are hereby incorporated by reference in their entireties.

TECHNICAL FIELD

Implementations of this application relate to the lens field, and specifically, to an optical lens, a camera module, and an electronic device.

BACKGROUND

As people have increasingly diversified and complex requirements on shooting scenarios of a lens, the lens needs to be able to achieve a high-quality shooting effect in different scenarios. For example, among photographic lenses, a telephoto lens (with a long focal length) can shoot a distant object, and provide high magnification while ensuring good imaging quality. However, when a user uses the telephoto lens to shoot a close-up scene, the telephoto lens has a poor shooting effect. In contrast, a macro lens can show great ability when shooting a close-up scene in a macro shooting scenario, but a shot image in a telephoto shooting scenario has poor quality.

To resolve a problem that a photographic lens is incompatible with shooting of scenes at different locations and ensure that a high-quality shooting effect can be achieved in different shooting scenarios, a plurality of lenses are usually disposed in an electronic device. Different lenses correspond to different scenarios, to ensure that a good shooting effect can be achieved in all different scenarios. For example, the electronic device usually includes both a telephoto lens and a macro lens. A distant scene is shot through the telephoto lens, and a near scene is shot through the macro lens, to ensure that good shooting effect can be achieved in different scenarios. However, the plurality of lenses occupy large space. In addition, disposing the plurality of lenses makes a structure of the electronic device complex. Consequently, manufacturing costs of the electronic device are increased.

SUMMARY

Implementations of this application provide an optical lens, a camera module including the optical lens, and an electronic device including the camera module. One optical lens is applied to different shooting scenarios, to reduce space occupied by the optical lens, simplify a structure of the electronic device, and reduce manufacturing costs of the electronic device.

According to a first aspect, this application provides an optical lens. The optical lens includes a first lens element group and a second lens element group that are arranged from an object side to an image side. The first lens element group and the second lens element group are coaxially disposed. The first group and the second lens element group each include a plurality of lens elements. Each of the lens elements includes an object side surface facing the object side and an image side surface facing the image side. The first lens element group has positive optical power. The second lens element group has negative optical power. The second lens element group is movable relative to the first lens element group in an axial direction. A distance $\Delta d$ for which the second lens element group is movable relative to the first lens element group satisfies the following relation: $\Delta d \leq 4$ mm. That the first lens element group and the second lens element group are coaxially disposed means that an optical axis of the first lens element group is collinear with an optical axis of the second lens element group.

In this application, in different use scenarios, the second lens element group is moved to change a distance between the first lens element group and the second lens element group, to change a focal length of the optical lens. This ensures that the optical lens in this application can achieve a good shooting effect in different use scenarios. In this application, a lens element group is moved as a whole. The second lens element group is movable relative to the first lens element group. A distance between lens elements in a single lens element group remains unchanged. However, in the conventional technology, each lens element is movable. Consequently, a distance between the lens elements is large, resulting in a larger total track length. In addition, in this application, that the first lens element group and the second lens element group are arranged from the object side to the image side means an arrangement order of "object side-first lens element group-second lens element group-image side". The second lens element group is located between the first lens element group and the image side. That is, the second lens element group is disposed within a back focal length range of the first lens element group. In comparison with a solution in which the distance between the lens elements of the optical lens is adjusted to change the focal length of the optical lens, a total track length of the optical lens in this application can be small, so that the optical lens can be used within a thin electronic device.

In addition, in this application, positive and negative coordination of the optical power of the first lens element group and the second lens element group can achieve a good effect of eliminating aberration, to achieve a good optical effect. Furthermore, the first lens element group has positive optical power and can converge external light, so that as much light as possible is converged into the optical lens. The second lens element group has negative optical power and can diverge light to increase a height of an image formed on a photosensitive element, so that the optical lens can match the photosensitive element with a large incident angle of a chief ray, and an imaging resolution of the optical lens is improved.

In some implementations of this application, a distance $\Delta d$ for which the second lens element group is movable relative to the first lens element group satisfies the following relation: $\Delta d < 4$ mm. In other words, the distance for which the second lens element group moves relative to the first lens element group changes between 0 mm and 4 mm, so that requirements for the optical lens in different shooting scenarios can be met. This ensures that the optical lens can have a small total track length in different application scenarios, so that the optical lens in this application can be better applied to a thin electronic device such as a mobile phone. In addition, because the distance for which the second lens element group is movable relative to the first lens element group is small, a requirement for a drive structure that drives the second lens element group 12 to move is low, and costs of the drive structure can be reduced. A volume of the drive structure can also be smaller, so that the optical lens can be more suitable for application in a miniaturized device such as a mobile phone.

In some implementations, the optical lens satisfies the following relation:

TTL≤25 mm, where TTL represents the total track length of the optical lens. In other words, the total track length of the optical lens in this application is less than or equal to 25 mm in different application scenarios (including a telephoto application scenario and a macro application scenario). The total track length of the optical lens in this application can be small in different application scenarios, so that the optical lens can be better applied to a thin electronic device such as a mobile phone.

In some implementations, the optical lens satisfies the following relation:

0<Δd/TTL≤0.25, where Δd represents the distance for which the second lens element group is movable relative to the first lens element group, and TTL represents the total track length of the optical lens.

In this implementation of this application, the optical lens meets the foregoing relation. It can be ensured that the optical lens can have a small total track length in different use scenarios and that the distance for which the second lens element group moves relative to the first lens element group can be small when the optical lens switches in different use scenarios, so that the optical lens can be better applied to a thin electronic device such as a mobile phone.

In some implementations, the optical lens satisfies the following relation:

F #≥2, where F # represents an f-number of the optical lens.

The f-number of the optical lens is a ratio of the focal length of the lens to an aperture diameter of the lens. In this implementation of this application, the aperture diameter of the optical lens can ensure that the optical lens can have an appropriate amount of incident light, so that the optical lens can have a good optical imaging effect. In addition, when the f-number of the optical lens meets the foregoing relation, the focal length of the optical lens can meet requirements of the optical lens for different application scenarios (including telephoto shooting and macro shooting).

In some implementations of this application, the aperture diameter of the optical lens may be less than 20 mm.

In some implementations, a position of the first lens element group is fixed. The second lens element group moves to be close to or away from the first lens element group, to implement relative movement between the second lens element group and the first lens element group. This ensures that the optical lens can have a small total track length when performing shooting in different application scenarios. In addition, in this implementation, the position of the first lens element group is fixed, to ensure that a position of the first lens element group relative to a light incidence position (for example, a light incidence hole) remains unchanged. This ensures that an amount of light incident to the optical lens through the light incidence position can remain unchanged in different application scenarios of the optical lens. In other words, the amount of light incident to the optical lens in different application scenarios can be ensured. In this way, shooting effects of the optical lens in different application scenarios are ensured.

In some implementations, the lens elements in the first lens element group include a first lens element and a second lens element that are sequentially arranged from the object side to the image side. The first lens element has positive optical power. The second lens element has negative optical power. Combined optical power of the lens elements in the first lens element group except the first lens element and the second lens element is positive optical power. The combined optical power of the lens elements in the first lens element group except the first lens element and the second lens element is overall optical power of the lens elements in the first lens element group except the first lens element and the second lens element as a whole. For example, when the first lens element group includes the first lens element, the second lens element, a third lens element, and a fourth lens element, the combined optical power of the lens elements in the first lens element group except the first lens element and the second lens element is overall optical power of the third lens element and the fourth lens element as a whole.

In this implementation of this application, the lens elements in the first lens element group include the first lens element and the second lens element that are sequentially arranged from the object side to the image side. The first lens element has positive optical power. The second lens element has negative optical power. The combined optical power of the lens elements in the first lens element group except the first lens element and the second lens element is positive optical power. Positive and negative coordination of the optical power of the lens elements in the first lens element group can achieve a better effect of correcting aberration. In addition, the first lens element has positive optical power and has a light convergence function, so that more external light can be converged into the optical lens, and the amount of light incident to the optical lens is increased, to achieve a better shooting effect.

In some implementations, the lens elements in the second lens element group include a first lens element sequentially arranged from the object side to the image side. The first lens element is a meniscus lens element. An image side surface of the first lens element is a concave surface.

In this implementation of this application, the first lens element in the second lens element group is a meniscus lens element. In other words, an object side surface of the first lens element is a convex surface, and the image side surface is a concave surface; or the object side surface of the first lens element is a concave surface, and the image side surface is a convex surface. In some implementations of this application, the image side surface of the first lens element is a concave surface, and the object side surface of the first lens element is a convex surface, so that light transmitted to the second lens element group after passing through the first lens element group can be diverged to a wider range, to eliminate a field curvature to some extent and enable the optical lens to have a better shooting effect.

In some implementations, the first lens element group includes three or four lens elements, and the second lens element group includes two or three lens elements.

In this implementation of this application, the first lens element group includes three or four lens elements, and the second lens element group includes two or three lens elements. This can ensure that the optical lens has a good optical effect and reduce the total track length of the optical lens as much as possible, so that the optical lens in this implementation can be more applicable to the thin electronic device.

In some implementations, the optical lens satisfies the following relation:

$$0.4 < |f1/f2| < 1.1.$$

f1 represents a focal length of the first lens element group, and f2 represents a focal length of the second lens element group.

The optical lens in this application meets the foregoing relation. The focal lengths of the first lens element group and the second lens element group of the optical lens can be properly allocated, so that the optical lens can have a good imaging effect.

In some implementations of this application, an absolute value |f1/f2| of a ratio of the focal length of the first lens element group to the focal length of the second lens element group is less than 1. In other words, the focal length of the first lens element group of the optical lens is less than the focal length of the second lens element group. A light adjustment capability of the first lens element group is stronger than that of the second lens element group. A light adjustment effect of the second lens element group is small. Therefore, a difference between light adjustment effects of the optical lens when the second lens element group moves between different positions is reduced, to ensure that the imaging effect of the optical lens can be always good when the second lens element group is moved to adjust the focal length of the optical lens to implement telephoto shooting and macro shooting.

In some implementations, the optical lens satisfies the following relation:

$$0.4 < |f2/f| < 1.$$

f2 represents the focal length of the second lens element group, and f represents a focal length of the optical lens when the first lens element group is closest to the second lens element group. The second lens element group moves relative to the first lens element group. The two lens element groups are closest to each other when the two lens element groups are in contact.

The optical lens in this application meets the foregoing relation. The focal length of the second lens element group of the optical lens can be properly allocated. Therefore, when the second lens element group is moved based on an actual use requirement of the optical lens, the focal length of the optical lens can be adaptively adjusted to meet shooting requirements in different scenarios. In addition, the second lens element group can cooperate with the first lens element group to correct aberration of the optical lens, reduce distortion, and improve imaging quality of the optical lens 10.

In some implementations, the first lens element group of the optical lens satisfies the following relation:

$$0.2 < |f11/f12| < 1.1.$$

f11 represents a focal length of the first lens element in the first lens element group, and f12 represents a focal length of the second lens element in the first lens element group.

The optical lens in this application meets the foregoing relation. The focal lengths of the first lens element and the second lens element in the first lens element group can be properly allocated, so that the optical lens can have a good imaging effect.

In some implementations of this application, an absolute value |f11/f12| of a ratio of the focal length of the first lens element in the first lens element group to the focal length of the second lens element is less than 1. That is, in some implementations of this application, an absolute value of the optical power of the first lens element in the first lens element group is less than an absolute value of the optical power of the second lens element. In other words, the first lens element has a good refraction capability and can have a good light convergence effect to converge more external light into the optical lens. This increases the amount of light incident to the optical lens, so that the optical lens has a better imaging effect.

In some implementations, the second lens element group of the optical lens satisfies the following relation:

$$|f21/f2L| < 10.$$

f21 represents a focal length of the first lens element in the second lens element group, and f2L represents a focal length of a lens element closest to the image side in the second lens element group.

The optical lens in this application meets the foregoing relation. The focal lengths of the first lens element and the lens element closest to the image side in the second lens element group can be properly allocated, so that the second lens element group can have a good light adjustment effect, and the second lens element group can achieve a good focal length adjustment effect, to move in the axial direction to achieve a good effect of adjusting the focal length of the optical lens. This ensures that the optical lens can have a good shooting effect for different use requirements.

In some implementations of this application, an absolute value |f21/f2L| of a ratio of the focal length of the first lens element to the focal length of the lens element closest to the image side in the second lens element group is less than 1. In other words, an absolute value of the focal length of the first lens element is less than an absolute value of the focal length of the lens element closest to the image side in the second lens element group. Therefore, the first lens element in the second lens element group has a high refraction degree. Light incident to the first lens element group and transmitted to the second lens element group can be adjusted as soon as possible after passing through the first lens element. This ensures that a good light adjustment effect is achieved in different use scenarios through as few lens elements as possible, to ensure that the optical lens can have a good imaging effect in different use scenarios.

In some implementations, the second lens element group of the optical lens satisfies the following relation:

$$1.4 < |1 - \beta^2| < 3.8.$$

$\beta$ represents a ratio of an incident angle of light on the second lens element group to an emergent angle of the light, and $1-\beta^2$ represents focal length sensitivity of the second lens element group.

In this implementation of this application, focal length sensitivity determines a light adjustment capability and affects a focal length of a lens element group. In this implementation, when the focal length sensitivity of the second lens element group meets the foregoing relation, the focal length and the light adjustment capability of the second lens element group fall within an appropriate range. This can achieve a better focal length adjustment effect, so that the optical lens can achieve a good imaging effect in different use scenarios.

In some implementations, a lens element closest to the object side in the first lens element group is a glass lens element, and the lens element closest to the object side in the first lens element group is a spherical lens element.

In this implementation of this application, at least one lens element in the first lens element group is a glass lens element, and the other lens elements are glass lens elements or plastic lens elements. Because a temperature coefficient of a relative refractive index of the glass lens element is small, in other words, a refractive index of the glass lens element changes slightly with a temperature, a temperature drift coefficient of the optical lens in this application is greatly reduced compared with that of the optical lens in which all lens elements are plastic lens elements. In general, a relationship in which the refractive index of the glass lens element changes with the temperature satisfies the following relation: dn/dT>0. A relationship in which a refractive index of the plastic lens element changes with the temperature satisfies the following relation: dn/dT<0. When the temperature changes, compensation is generated between the glass lens element and the plastic lens element, to reduce a temperature drift of the optical lens. In addition, in this implementation, because the lens element closest to the object side in the first lens element group is usually closest to the outside, the lens element is most affected by the temperature. Therefore, the temperature drift of the optical lens can be maximally reduced by setting the lens element to a glass lens element.

Furthermore, in this implementation of this application, the lens element closest to the object side in the first lens element group is a spherical lens element. In other words, the glass lens element may be a spherical lens element. Processing of the spherical lens element can be simpler than that of an aspheric lens element.

In some implementations, the plurality of lens elements in the first lens element group include at least four aspheric lens elements, and the lens elements in the second lens element group are all aspheric lens elements, to ensure that the lens elements of the optical lens have a higher degree of surface freedom. A surface of the lens element can be arbitrarily designed based on a requirement, so that aberration, a field curvature, and the like of the optical lens can be reduced, to enable the optical lens to have a better imaging effect.

In some implementations, the lens elements in the first lens element group except the lens element closest to the object side are aspheric lens elements, and the lens elements in the second lens element group are all aspheric lens elements, to ensure that the lens elements of the optical lens have a high degree of freedom. This can reduce aberration, a field curvature, and the like, to ensure that the optical lens can have a better imaging effect.

In some implementations, the optical lens further includes an optical path refraction element. The optical path refraction element can change a light transmission direction. The optical path refraction element is disposed on a side that is of the first lens element assembly and that is away from the second lens element assembly. Light is refracted by the optical path refraction component, sequentially passes through the first lens element assembly and the second lens element assembly, and then is emergent.

In this implementation of this application, the optical lens may be a periscope lens. That is, the axial directions of the first lens element group and the second lens element group may be perpendicular to a thickness direction of the electronic device, to avoid impact of an axial distance between the first lens element group and the second lens element group on a thickness of the electronic device. Light outside the electronic device may be incident to the optical lens in the thickness direction of the electronic device, be refracted by the optical path refraction element of the optical lens, sequentially pass through the first lens element assembly and the second lens element assembly, and then be emergent to the photosensitive element for imaging.

It may be understood that in some other implementations of this application, because the total track length of the optical lens in this application can be small, the axial direction of the optical lens may be set to be the same as the thickness direction of the electronic device. In this case, the light outside the electronic device does not need to be refracted before being entering the first lens element group and the second lens element group. In other words, the optical lens may have no optical path refraction element.

According to a second aspect, this application further provides a camera module. The camera module includes a photosensitive element and the foregoing optical lens. The photosensitive element is located on the image side of the optical lens. Light is projected onto the photosensitive element after passing through the optical lens. A distance between the first lens element assembly and the photosensitive element remains unchanged. The second lens element assembly is movable along an optical axis between the first lens element assembly and the photosensitive element.

An optical image obtained after the light passes through the optical lens is converted into an electrical signal through the photosensitive element, and then image processing and the like are performed, so that a high-quality image can be obtained. The distance between the first lens element group and the photosensitive element of the optical lens in this application remains unchanged. The second lens element group located between the first lens element group and the photosensitive element is moved to change the focal length of the optical lens. This ensures that the optical lens in this application can achieve a good shooting effect in different use scenarios. In addition, in this application, the second lens element group is disposed within a back focal length range of the first lens element group. In comparison with the solution in which the distance between the lens elements of the optical lens is adjusted to change the focal length of the optical lens, the total track length of the optical lens in this application can be small, so that the optical lens can be used within the thin electronic device.

According to a third aspect, this application further provides an electronic device. The electronic device includes an image processor and the foregoing camera module. The image processor is communicatively connected to the camera module. The camera module is configured to obtain image data and input the image data into the image processor. The image processor is configured to process the image data.

In this application, the image processor processes the image data from the camera module to obtain a better photographed picture or image. In addition, the optical lens in this application can zoom in and out in different use scenarios, so that a good imaging effect can be achieved for different use requirements (telephoto shooting and macro shooting). Furthermore, the total track length of the optical lens in this application can be small. Therefore, the optical lens imposes a small limitation on the thickness of the electronic device. That is, the electronic device can achieve a better thinning effect.

DESCRIPTION OF EMBODIMENTS

Figure 1:
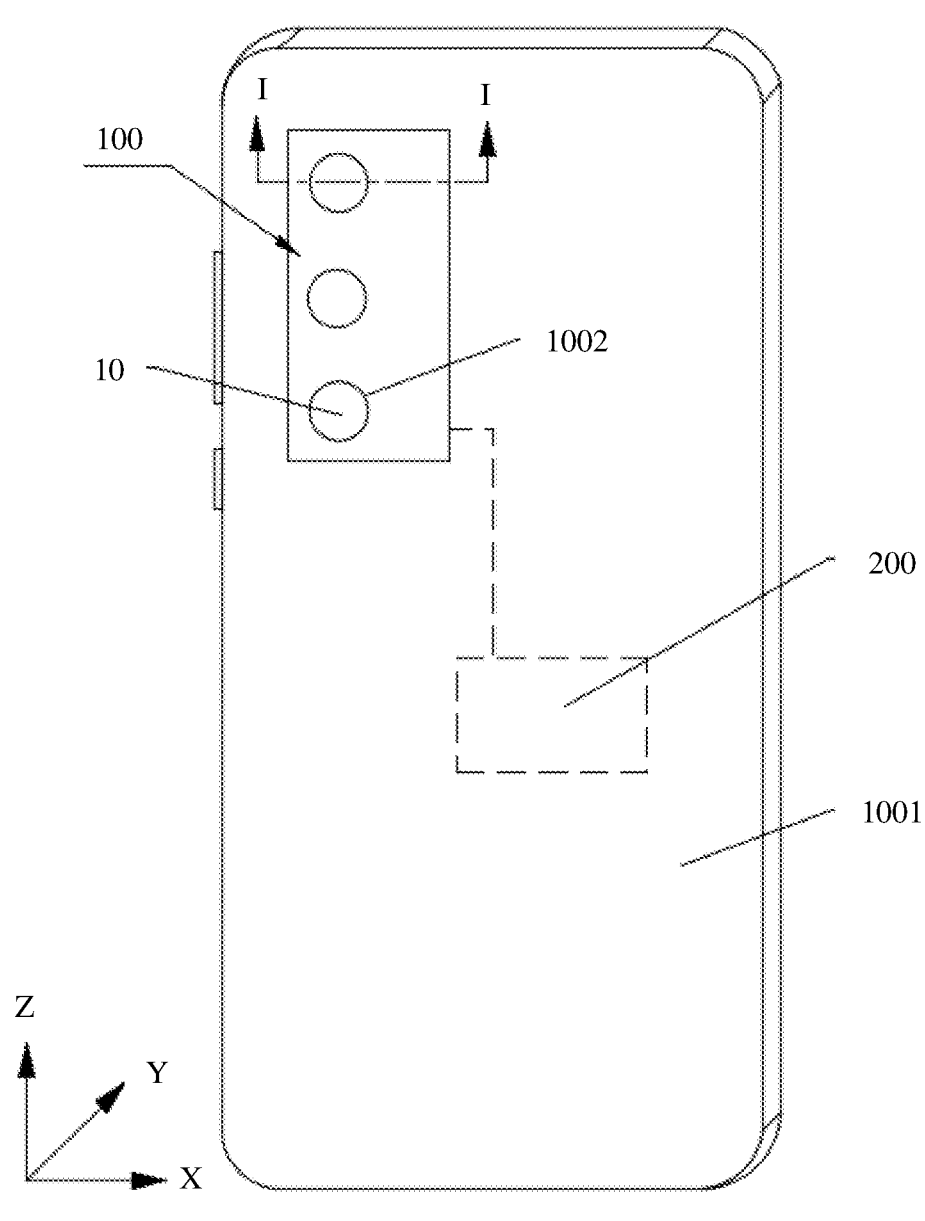
FIG. 1 is a schematic diagram of a structure of an electronic device according to an implementation of this application.

For ease of understanding, technical terms in this application are explained and described before embodiments of this application are described with reference to the accompanying drawings.

A focal length (focal length, f for short), also referred to as a focal distance, is a measure of how strongly an optical system converges or diverges light, and is a vertical distance from an optical center of a lens element or a lens element group to a focal plane when a clear image of an infinite scene is formed on the focal plane through the lens element or the lens element group.

An aperture is an apparatus configured to control an amount of light that passes through a lens and irradiates a photosensitive element. An aperture size is represented by an f-number/f-value.

The f-number (F #) is a ratio (a reciprocal of a relative aperture) of a focal length of a lens to a diameter of a clear aperture of the lens. If the f-number is smaller, more light enters in a unit time. If the f-number is larger, a depth of field is smaller, and background content of a photo is blurred.

Positive optical power, which may also be referred to as positive refractive power, indicates that a lens element has a positive focal length and a light convergence effect.

Negative optical power, which may also be referred to as negative refractive power, indicates that a lens element has a negative focal length and a light divergence effect.

A total track length (total track length, TTL) is a total length from an end that is of an optical lens and that is away from an image plane to the image plane, and is a main factor in forming a thickness of an electronic device. In this application, the total track length is a distance from an object side surface of a first lens element in a first lens element group to a photosensitive element on an optical axis of the optical lens.

The image plane is a plane on which an image is located. The image is a real image that is projected onto a light screen after light is refracted, diffracted, or transmitted through a small hole in a straight line.

An Abbe number, namely, a dispersion coefficient, is a ratio of variations of refractive indices of an optical material at different wavelengths, and represents a dispersion degree of the material.

A half image height (image height, IH) is a radius of an imaging circle.

An optical axis is an imaginary line that defines how an optical system transmits light. The optical axis is usually a line along which light perpendicularly passes through a center of a lens element.

An object side is a side on which a scene is located with an optical lens as a boundary.

An image side is a side on which an image of the scene is located with the optical lens as a boundary.

An object side surface is a surface that is of a lens element and that faces the object side.

An image side surface is a surface that is of the lens element and that faces the image side.

A back focal length (back focal length, BFL) is an axial distance between the image plane and an image side surface of a lens element closest to the image side of the optical lens.

Distortion (distortion) is a difference between an actual position of a point in an image and a position of the point in an ideal system.

A field of view (field of view, FOV) angle is an angle formed by two edges of a maximum range in which an image of an object can pass through a lens of an optical instrument with the lens as a vertex.

A free-form surface is a surface that cannot be formed by an elementary analytic surface, but is formed by a curve and surface that can change freely in a complex manner, namely, a free-form curve and surface.

This application provides an electronic device. The electronic device may be a mobile phone, a tablet, a computer, a video camera, a camera, or an electronic device in another form and with a photographing or video recording function. FIG. 1 is a schematic diagram of a structure of an electronic device 1000 according to an implementation of this application. In this implementation, the electronic device 1000 is a mobile phone. In another implementation, the electronic device 1000 may be a device in another form and with a shooting function, such as a tablet, a camera, or the like.

The electronic device 1000 may include a camera module 100 and an image processor 200 that is communicatively connected to the camera module 100. The camera module 100 is configured to obtain image data and input the image data into the image processor 200, so that the image processor 200 processes the image data. The communicative connection between the camera module 100 and the image processor 200 may include an electrical connection such as a cable connection or the like for data transmission, or may be implemented in another manner that can implement data transmission, such as an optical cable connection, wireless transmission, or the like.

The image processor 200 may optimize a digital image signal through a series of complex mathematical algorithm operations, and finally send an optimized signal to a display or store the optimized signal in a memory. The image processor 200 may be an image processing chip or a digital signal processing (digital signal processing, DSP) chip.

In the implementation shown in FIG. 1, the camera module 100 may be disposed on a back side of the electronic device 1000, and is a rear-facing camera of the electronic device 1000. In this application, the electronic device 1000 includes a rear cover 1001. The rear cover 1001 is provided with a light incidence hole 1002. Light outside the electronic device 1000 is incident to an optical lens 10 in the camera module 100 through the light incidence hole 1002. It should be understood that a mounting position of the camera module 100 of the electronic device 1000 in the implementation shown in FIG. 1 is merely an example. In some other implementations, the camera module 100 may alternatively be mounted at another position of the electronic device 1000. For example, the camera module 100 may be mounted on a front side of the electronic device 1000, and is a front-facing camera of the electronic device 1000. Alternatively, the camera module 100 may be mounted at an upper middle position or an upper right corner of the back side of the electronic device 1000. Alternatively, the camera module 100 may not be disposed on a main body of the mobile phone, but may be disposed on a component that can move or rotate relative to the mobile phone. For example, the component may extend, retract, rotate, or the like on the main body of the mobile phone. The mounting position of the camera module 100 is not limited in this application.

Figure 2:
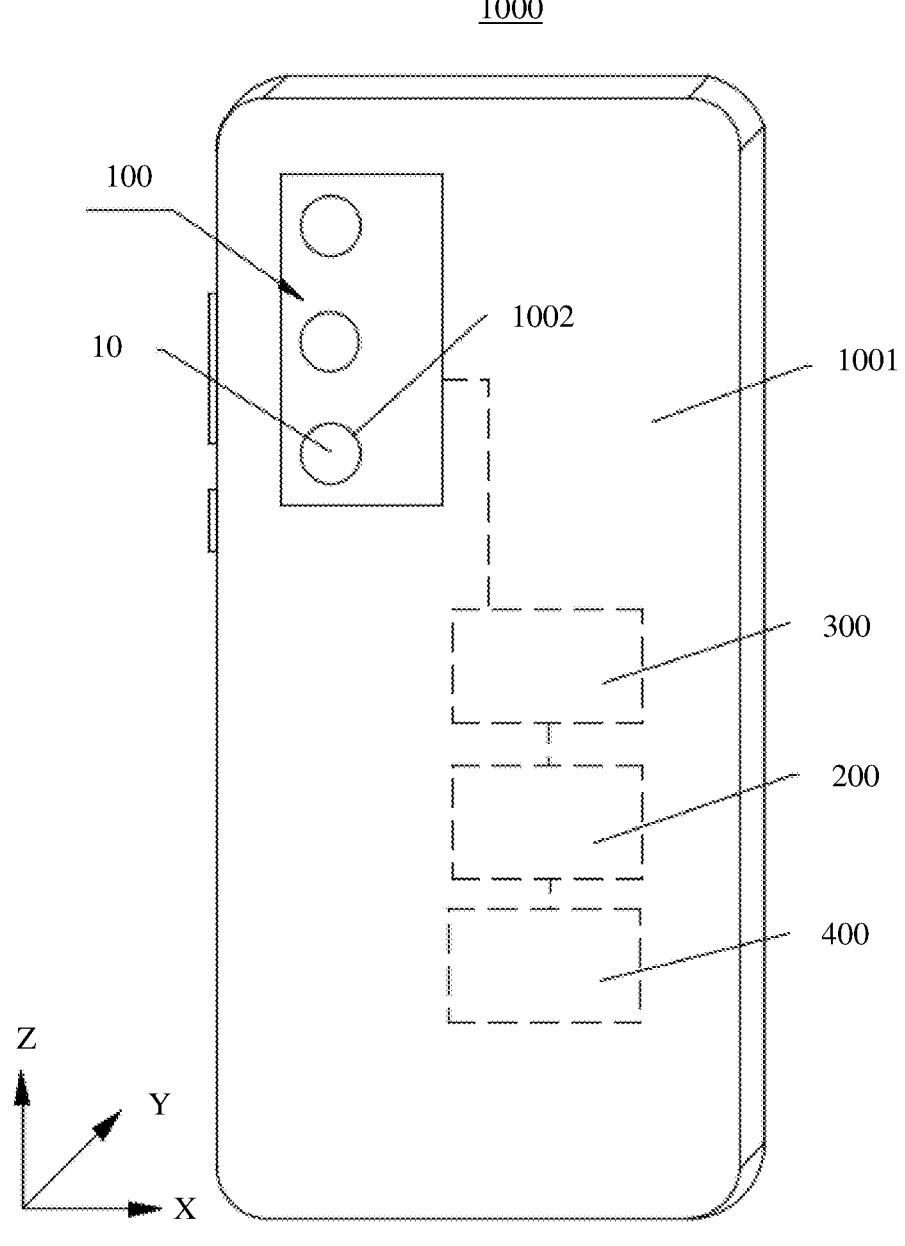
FIG. 2 is a schematic diagram of a structure of an electronic device according to another implementation of this application.

FIG. 2 is a schematic diagram of a structure of an electronic device 1000 according to another implementation of this application. A camera module 100, a light incidence hole 1002, and an optical lens 10 in FIG. 2 are the same as those in FIG. 1, and details are not described herein again. In the implementation shown in FIG. 2, in comparison with FIG. 1, the electronic device 1000 further includes an analog-to-digital converter (digital analog converter, DAC) 300. With reference to FIG. 2, the analog-to-digital converter 300 is connected between the camera module 100 and the image processor 200. The analog-to-digital converter 300 is configured to convert an analog image signal generated by the camera module 100 into a digital image signal and send the digital image signal to the image processor 200.

Then, the image processor 200 processes the digital image signal. Finally, a picture or an image is displayed on a display screen or a display.

In some implementations, the electronic device 1000 may further include a memory 400. The memory 400 is communicatively connected to the image processor 200. After processing the digital image signal, the image processor 200 sends the image to the memory 400. In this way, when the image needs to be viewed subsequently, the image can be found in the memory at any time and displayed on the display screen (with reference to FIG. 2). In some implementations, the image processor 200 further compresses a processed digital image signal, and then stores a compressed digital image signal in the memory 400 to save space in the memory 400. It should be noted that FIG. 2 is merely a schematic diagram of a structure in this implementation of this application. Position structures and the like of the camera module 100, the image processor 200, the analog-to-digital converter 300, and the memory 400 shown in the figure are merely examples.

Figure 3:
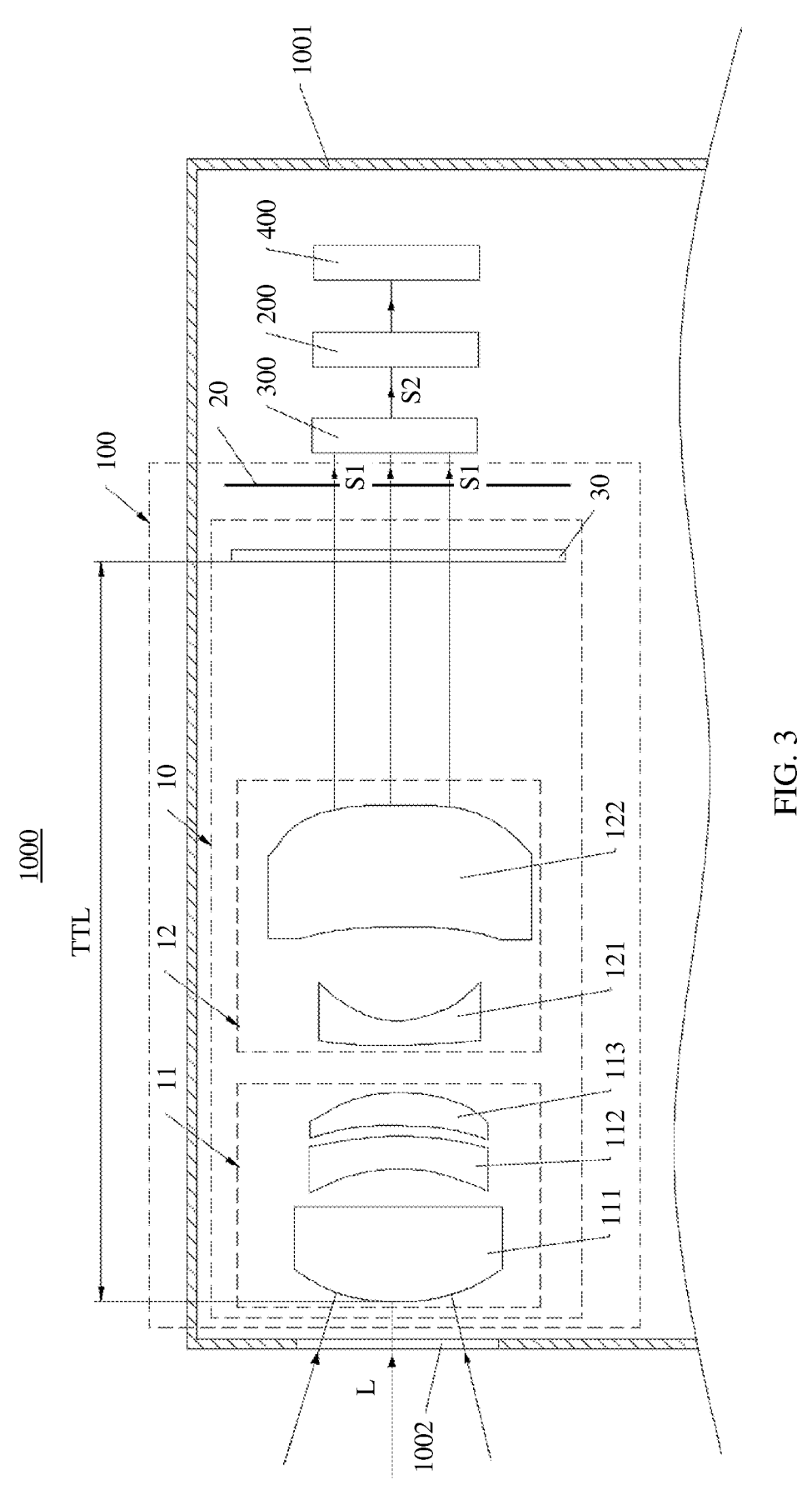
FIG. 3 is a schematic diagram of an imaging principle of the electronic device shown in FIG. 2.

FIG. 3 is a schematic diagram of an imaging principle of the electronic device 1000 shown in FIG. 2. The camera module 100 includes the optical lens 10 and a photosensitive element 20. The photosensitive element 20 is located on an image side of the optical lens 10. The image side of the optical lens 10 is a side that is of the optical lens 10 and that is close to an image of a scene. When the camera module 100 works, the scene is imaged on the photosensitive element 20 through the optical lens 10. A working principle of the camera module 100 is as follows: After light L reflected by the scene passes through the optical lens 10, an optical image is generated and projected onto a surface of the photosensitive element 20. The photosensitive element 20 converts the optical image into an electrical signal, namely, an analog image signal S1, and sends the analog image signal S1 to the analog-to-digital converter 300. The analog-to-digital converter 300 converts the analog image signal S1 into a digital image signal S2 and sends the digital image signal S2 to the image processor 200.

The photosensitive element 20 is a semiconductor device. A surface of the photosensitive element 20 may contain hundreds of thousands to millions of photodiodes. When the photosensitive element 20 is irradiated by light, a charge is generated. In this way, an optical signal is converted into an electrical signal. Optionally, the photosensitive element 20 may be any device that can convert an optical signal into an electrical signal. For example, the photosensitive element 20 may be a charge coupled device (charge coupled device, CCD) or a complementary metal-oxide-semiconductor (complementary metal-oxide semiconductor, CMOS) device.

The optical lens 10 affects imaging quality and an imaging effect. The optical lens 10 includes a plurality of lens elements arranged from an object side to the image side, and mainly performs imaging by using a refraction principle of the lens elements. After light of a to-be-imaged object passes through the optical lens 10, a clear image is formed on a focal plane. An image of a scene is recorded through the photosensitive element 20 located on an image plane. Adjacent lens elements may be spaced apart or arranged in close contact with each other. Main functions of the lens elements are different. Optimal imaging quality is achieved through cooperation between different lens elements.

In some implementations of this application, the optical lens 10 further includes a light filter 30 configured to correct chromatic aberration. The light filter 30 is located between the photosensitive element 20 and the lens elements of the optical lens 10. Light refracted by the lens elements of the optical lens 10 is irradiated on the light filter 30 and transmitted to the photosensitive element 20 through the light filter 30. The light filter 30 may filter out light that does not need to be projected onto the photosensitive element 20, to prevent the photosensitive element 20 from producing a false color or a ripple. This improves effective resolution and color reproduction of the photosensitive element 20, and can prevent some external light from damaging the photosensitive element 20 and protect the photosensitive element 20.

In some implementations of this application, the optical lens 10 may alternatively include a protection element configured to protect the photosensitive element 20. The protection element is located between the photosensitive element 20 and the lens elements of the optical lens 10. The light refracted by the lens elements of the optical lens 10 is irradiated on the protection element. The protection element can filter out light that is in the light and that causes damage to the photosensitive element 20, to prevent some external light from damaging the photosensitive element 20 and protect the photosensitive element 20. It should be noted that the light filter 30 and the protection element in this application are both of a flat structure, which does not affect a light transmission direction, so that the light filter 30 and the protection element can be prevented from affecting the imaging effect.

It may be understood that in some implementations of this application, the camera module 100 may include a plurality of optical lenses 10. The plurality of optical lenses 10 may be suitable for different use scenarios, to ensure that the camera module 100 can have a good shooting effect in different use scenarios. For example, in some implementations, the camera module 100 may include an optical lens suitable for night shooting, an optical lens suitable for telephoto shooting, an optical lens suitable for wide-angle shooting, and the like.

In an implementation of this application, as shown in FIG. 3, the optical lens 10 includes a first lens element group 11 and a second lens element group 12 that are arranged from the object side to the image side. The first lens element group 11 and the second lens element group 12 are coaxially disposed. That the first lens element group 11 and the second lens element group 12 are coaxially disposed means that an optical axis of the first lens element group 11 is collinear with an optical axis of the second lens element group 12. Light outside the electronic device 1000 is incident through the light incidence hole 1002, sequentially refracted by the first lens element group 11 and the second lens element group 12, and then irradiated on the photosensitive element 20 for imaging. The first lens element group 11 and the second lens element group 12 each include a plurality of lens elements. In this implementation, a position of the first lens element group 11 is fixed. In other words, a relative position between the first lens element group 11 and the photosensitive element 20 remains unchanged. The second lens element group 12 is movable relative to the first lens element group 11 along the optical axis of the second lens element group 12.

In this application, in different use scenarios, the second lens element group 12 is moved, so that a distance between the first lens element group 11 and the second lens element group 12 can be changed, to change a focal length of the optical lens 10. This can ensure that the optical lens 10 in this application can achieve a good shooting effect in different use scenarios. For example, in some implementations of this application, the optical lens 10 may be in a telephoto shooting state and a macro shooting state. When the second lens element group 12 moves relative to the first lens element group 11, the optical lens 10 switches between the telephoto shooting state and the macro shooting state. When the optical lens 10 is in the telephoto shooting state, the second lens element group 12 moves to be close to the first lens element group 11 to adjust the focal length of the optical lens 10, to ensure a good telephoto shooting effect. When the optical lens 10 is in the macro shooting state, the second lens element group 12 moves to be away from the first lens element group 11 to adjust the focal length of the optical lens 10, to ensure a good telephoto shooting effect.

In some implementations of this application, the electronic device 1000 may further include a drive structure. The drive structure is connected to the second lens element group 12. The drive structure drives the second lens element group 12 to move, to change the distance between the first lens element group 11 and the second lens element group 12. In some implementations, the drive structure may be a micro motor.

In this application, the second lens element group 12 is disposed within a back focal length range of the first lens element group 11. In comparison with a solution in which a distance between the lens elements of the optical lens 10 is adjusted to change the focal length of the optical lens 10, the lens elements included in the first lens element group 11 of the optical lens 10 in this application do not need to move. Therefore, a distance between the lens elements in the first lens element group 11 can be small. Similarly, the lens elements included in the second lens element group 12 of the optical lens 10 in this application do not need to move. Therefore, a distance between the lens elements in the second lens element group 12 can be small. In this way, a total track length TTL of the optical lens 10 can be small, so that the optical lens 10 can be used within the thin electronic device 1000. The total track length TTL in this implementation of this application is a distance from an object side surface of a first lens element in the first lens element group 11 to the photosensitive element 20 on an optical axis of the optical lens 10. In some implementations of this application, the total track length TTL of the optical lens 10 may be less than 25 mm, so that the optical lens 10 can be used within the thin electronic device 1000 such as a mobile phone or a tablet.

In addition, in this implementation of this application, the position of the first lens element group 11 is fixed. That is, a distance between the first lens element group 11 of the optical lens 10 and the light incidence hole 1002 remains unchanged. This ensures that an amount of light incident to the optical lens 10 through the light incidence hole 1002 can remain unchanged in different application scenarios of the optical lens 10. In other words, the amount of light incident to the optical lens 10 in different application scenarios can be ensured. In this way, shooting effects of the optical lens 10 in different application scenarios are ensured. It may be understood that in some other implementations of this application, the first lens element group 11 of the optical lens 10 may also move, so that the optical lens 10 adapts to requirements of different application scenarios (including telephoto shooting and macro shooting) through cooperation and movement of the first lens element group 11 and the second lens element group 12, to ensure that the optical lens 10 can have good shooting effects in different application scenarios.

In some implementations of this application, a distance $\Delta d$ for which the second lens element group 12 is movable relative to the first lens element group 11 satisfies the following relation: $\Delta d < 4$ mm. In other words, the distance for which the second lens element group 12 moves relative to the first lens element group 11 changes between 0 mm and 4 mm, so that requirements for the optical lens 10 in different shooting scenarios can be met. This ensures that the optical lens 10 can have a small total track length in different application scenarios, so that the optical lens 10 in this application can be better applied to a thin electronic device such as a mobile phone. In addition, because the distance for which the second lens element group 12 is movable relative to the first lens element group 11 is small, a requirement for the drive structure that drives the second lens element group 12 to move is low, and costs of the drive structure can be reduced. A volume of the drive structure can also be smaller, so that the optical lens can be more suitable for application in a miniaturized device such as a mobile phone.

In some implementations of this application, the optical lens 10 may further meet the following relation: $0 < \Delta d / TTL \leq 0.25$. $\Delta d$ represents the distance for which the second lens element group 12 is movable relative to the first lens element group 11. TTL represents the total track length of the optical lens 10. Because a value of TTL in this application is small, when $\Delta d / TTL$ meets the foregoing relation, $\Delta d$ is small, so that the distance for which the second lens element group 12 moves relative to the first lens element group 11 can be small. Therefore, it can be ensured that the optical lens 10 can have a small total track length in different use scenarios and that the distance for which the second lens element group 12 moves relative to the first lens element group 11 can be small when the optical lens 10 switches in different use scenarios, so that the optical lens 10 can be better applied to a thin electronic device such as a mobile phone.

Figure 4:
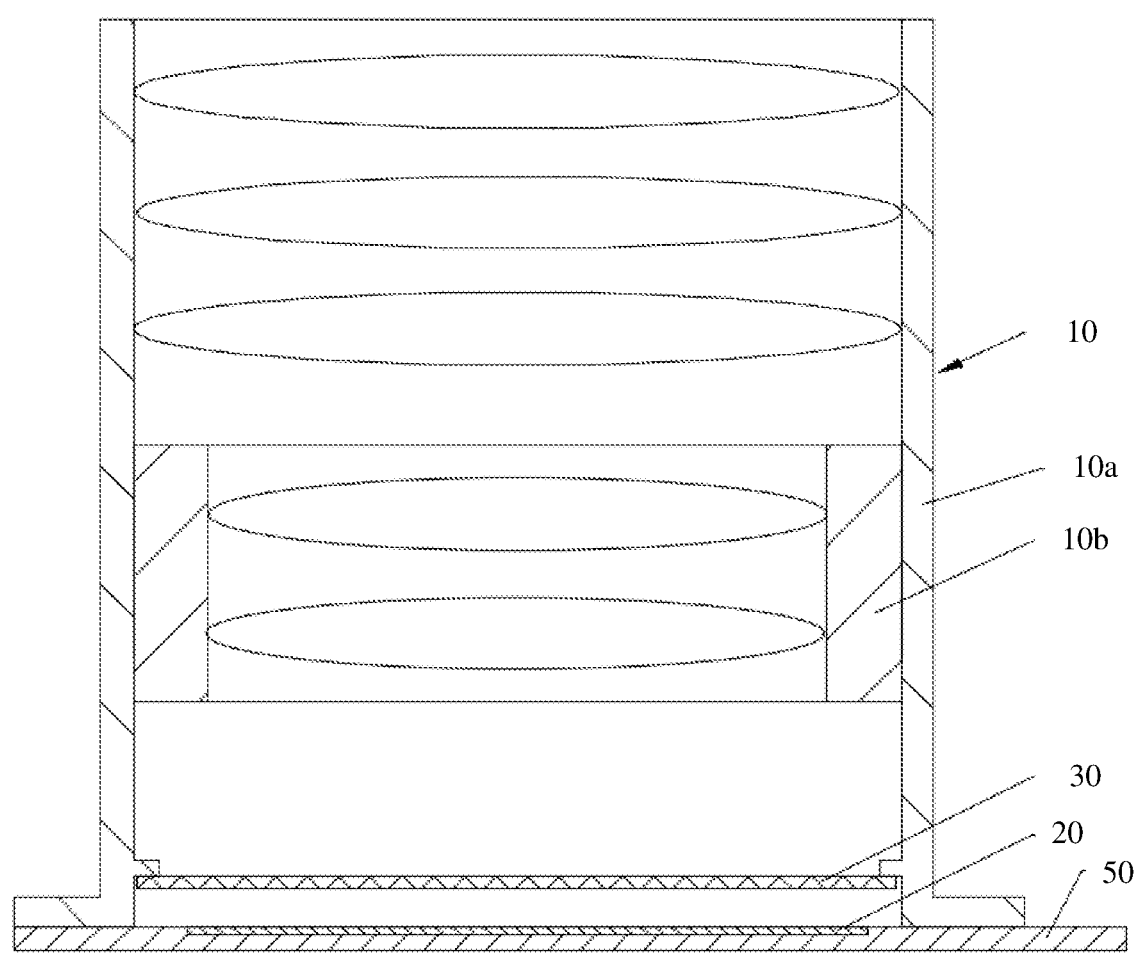
FIG. 4 is a schematic diagram of a structure of a camera module according to some implementations of this application.

FIG. 4 is a schematic diagram of a structure of a camera module 100 according to some implementations of this application. As mentioned above in FIG. 3 and its implementation, the second lens element group 12 is movable relative to the first lens element group 11. For further understanding, refer to FIG. 4 below. In some implementations of this application, in comparison with FIG. 3, the optical lens 10 further includes a first lens barrel 10*a* and a second lens barrel 10*b*. The second lens barrel 10*b* is mounted in the first lens barrel 10*a*. The second lens barrel 10*b* is movable in the first lens barrel 10*a* in an axial direction of the first lens barrel 10*a*. The first lens barrel 10*a* and the second lens barrel 10*b* are coaxially disposed. That is, a central axis of the first lens barrel 10*a* is collinear with a central axis of the second lens barrel 10*b*. The plurality of lens elements in the first lens element group 11 of the optical lens 10 are fastened in the first lens barrel 10*a*. The plurality of lens elements in the first lens element group 11 are coaxially disposed. The plurality of lens elements in the second lens element group 12 of the optical lens 10 are fastened in the lens barrel 10*a* and fastened in the second lens barrel 10*b*. The plurality of lens elements in the second lens element group 12 are coaxially disposed. The second lens barrel 10*b* moves in the first lens barrel 10*a* in the axial direction of the first lens barrel 10*a*, and can drive the second lens element group 12 fastened in the second lens barrel 10*b* to move relative to the first lens element group 11. It may be understood that in some other implementations of this application, the optical lens 10 may alternatively be of another structure, to implement movement of the second lens element group 12 relative to the first lens element group 11. This is not limited in this application.

In this implementation of this application, the camera module 100 further includes a structure such as a circuit board 50. The circuit board 50 is fastened to a side that is of the first lens barrel 10*a* and that faces the image side. The circuit board 50 is configured to transmit an electrical signal. The circuit board 50 may be a flexible printed circuit (flexible printed circuit, FPC) or a printed circuit board (printed circuit board, PCB). The FPC may be a single-sided flexible printed circuit, a double-sided flexible printed circuit, a multi-layer flexible printed circuit, a flexible printed circuit of a hybrid structure, or the like. Other elements included in the camera module 100 are not described in detail herein. The light filter 30 or the protection element may be fastened to an end that is of the first lens barrel 10*a* of the optical lens 10 and that faces the image side, and located between the second lens barrel 10*b* and the circuit board 50; or may be fastened to the circuit board 50 through a support. The photosensitive element 20 is fastened, through bonding, surface mounting, or the like, to a surface that is of the circuit board 50 and that faces the first lens barrel 10*a*. The photosensitive element 20 is disposed opposite to the lens elements of the optical lens 10. An optical image generated by the optical lens 10 can be projected onto the photosensitive element 20. In some implementations, the analog-to-digital converter 300, the image processor 200, the memory 400, and the like are also integrated on the circuit board 50 through bonding, surface mounting, or the like, to implement a communicative connection between the photosensitive element 20, the analog-to-digital converter 300, the image processor 200, the memory 400, and the like through the circuit board 50.

Refer to FIG. 3 again. In this application, the first lens element group 11 and the second lens element group 12 of the optical lens 10 each include the plurality of lens elements. Any lens element of the optical lens 10 may be a lens element having positive optical power or negative optical power, to ensure that each lens element can achieve a specific optical effect. In this way, a quantity of the lens elements of the optical lens 10 is reduced as much as possible and the total track length of the optical lens 10 is reduced while it is ensured that a desired optical effect of the optical lens 10 is achieved. Therefore, the optical lens 10 is miniaturized, so that a small volume is occupied when the optical lens 10 is mounted in the electronic device 1000, and impact of the optical lens 10 on a thickness of a terminal is reduced. When a plane mirror is inserted between the plurality of lens elements, the plane mirror is not considered as a lens element of the optical lens 10 in this application. For example, when a plane mirror is inserted between the first lens element group 11 and the second lens element group 12, the plane mirror cannot be considered as a lens element of the optical lens 10 in this implementation of this application.

In this implementation of this application, two lens element groups (the first lens element group 11 and the second lens element group 12) are combined, and the second lens element group 12 is moved to adjust the focal length of the optical lens 10, so that the optical lens 10 can meet different application scenarios (such as telephoto shooting and macro shooting). In this implementation of this application, when the optical lens 10 is in the telephoto shooting state, the distance between the first lens element group 11 and the second lens element group 12 of the optical lens 10 is the shortest. When the optical lens 10 is in the macro shooting state, the distance between the first lens element group 11 and the second lens element group 12 of the optical lens 10 is the longest.

In some implementations of this application, the first lens element group 11 has positive optical power, and the second lens element group 12 has negative optical power. Positive and negative coordination of the optical power of the first lens element group 11 and the second lens element group 12 can achieve a good effect of eliminating aberration, to achieve a good optical effect. In addition, in this implementation of this application, the second lens element group 12 has negative optical power and can diverge light, to ensure that the optical lens 10 has a large image height, so that the optical lens 10 can match the photosensitive element 20 with a large incident angle of a chief ray, and an imaging resolution of the optical lens 10 is improved.

In some implementations of this application, the first lens element group 11 includes three or four lens elements, and the second lens element group 12 includes two or three lens elements.

In this implementation of this application, the first lens element group 11 includes three or four lens elements, and the second lens element group 12 includes two or three lens elements. This can ensure that the optical lens 10 has a good optical effect and reduce the total track length of the optical lens 10 as much as possible, so that the optical lens 10 in this implementation can be more applicable to the thin electronic device 1000.

It may be understood that in some other implementations of this application, the first lens element group 11 may include two, three, or more lens elements, or the second lens element group 12 may include three or more lens elements. However, the total track length of the optical lens 10 may be increased. This affects a thickness and the like of the electronic device 1000.

In some implementations of this application, the optical lens 10 satisfies the following relation: TTL≤25 mm. TTL represents the total track length of the optical lens 10. In this implementation of this application, the optical lens 10 has a small total track length and occupies a small volume, so that the optical lens 10 can be adapted to the thin electronic device 1000 such as a mobile phone.

In some implementations of this application, the lens elements in the first lens element group 11 include a first lens element 111 and a second lens element 112 that are sequentially arranged from the object side to the image side. The first lens element 111 has positive optical power, and the second lens element 112 has negative optical power. Combined optical power of the lens elements in the first lens element group 11 except the first lens element 111 and the second lens element 112 is positive optical power. For example, in some implementations of this application, the first lens element group 11 includes three lens elements. A lens element other than the first lens element 111 and the second lens element 112 is a third lens element 113. Therefore, the third lens element 113 has positive optical power. In some other implementations of this application, the first lens element group 11 includes four lens elements. Lens elements other than the first lens element 111 and the second lens element 112 are the third lens element 113 and a fourth lens element. Therefore, combined optical power of the third lens element 113 and the fourth lens element is positive optical power. In this implementation of this application, the first lens element 111 has positive optical power, the second lens element 112 has negative optical power, and the combined optical power of the lens elements in the first lens element group 11 except the first lens element 111 and the second lens element 112 is positive optical power. Positive and negative coordination of the optical power of the lens elements in the first lens element group 11 can achieve a better effect of correcting aberration. In addition, the first lens element 111 has positive optical power and has a light convergence function, so that more external light can be converged into the optical lens 10, and the amount of light incident to the optical lens 10 is increased, to achieve a better shooting effect.

In some implementations of this application, the optical lens 10 satisfies the following relation: F #≥2. F # represents an f-number of the optical lens 10. In this implementation of this application, the f-number of the optical lens 10 can meet the foregoing relation, and the optical lens 10 can have an appropriate aperture diameter, to ensure that the optical lens 10 can have an appropriate amount of incident light, so that the optical lens 10 can have a good optical imaging effect. In some implementations of this application, the aperture diameter of the optical lens may be less than 20 mm. The f-number of the optical lens 10 is a ratio of the focal length of the optical lens 10 to the aperture diameter of the lens. Therefore, when the f-number of the optical lens 10 meets the foregoing relation, the aperture diameter of the optical lens 10 can meet a requirement of the optical lens 10 for the amount of incident light, and the focal length of the optical lens 10 can meet requirements of the optical lens 10 for different application scenarios (including telephoto shooting and macro shooting).

In some implementations, the lens elements in the second lens element group 12 include a first lens element 121 sequentially arranged from the object side to the image side. The first lens element 121 is a meniscus lens element. That is, curvatures of an object side surface and an image side surface of the first lens element 121 are both positive or negative. In other words, the object side surface of the first lens element 121 is a convex surface, and the image side surface is a concave surface; or the object side surface of the first lens element 121 is a concave surface, and the image side surface is a convex surface. In some implementations of this application, the image side surface of the first lens element 121 is a concave surface, so that light transmitted to the second lens element group 12 after passing through the first lens element group 11 can be diverged to a wider range, to eliminate a field curvature to some extent and enable the optical lens 10 to have a better shooting effect. It may be understood that in some implementations of this application, the image side surface of the first lens element 121 may alternatively be a convex surface.

In some implementations, the optical lens 10 satisfies the following relation: 0.4<|f1/f2|<1.1. f1 represents a focal length of the first lens element group 11. f2 represents a focal length of the second lens element group 12.

The first lens element group 11 and the second lens element group 12 in this application meet the foregoing relation. The focal lengths of the first lens element group 11 and the second lens element group 12 of the optical lens 10 can be properly allocated, so that the optical lens 10 can have a good imaging effect.

In some implementations of this application, an absolute value |f1/f2| of a ratio of the focal length of the first lens element group 11 to the focal length of the second lens element group 12 is less than 1. In other words, the focal length of the first lens element group 11 is less than the focal length of the second lens element group 12. A refraction capability of the first lens element group 11 is stronger than that of the second lens element group 12. A light adjustment capability of the first lens element group 11 is stronger than that of the second lens element group 12. A light adjustment effect of the second lens element group 12 is small. Therefore, a difference between light adjustment effects of the optical lens 10 when the second lens element group 12 moves between different positions is reduced, to ensure that the imaging effect of the optical lens 10 can be always good when the second lens element group 12 is moved to adjust the focal length of the optical lens 10 to implement telephoto shooting and macro shooting.

In some implementations, the optical lens 10 satisfies the following relation: 0.4<|f2/f| <1. f2 represents the focal length of the second lens element group 12. f represents the focal length of the optical lens 10 in the telephoto shooting state. In this implementation of this application, when the optical lens 10 is in the telephoto shooting state, the distance between the first lens element group 11 and the second lens element group 12 is the shortest. The optical lens 10 in this application meets the foregoing relation. The focal length of the second lens element group 12 of the optical lens 10 can be properly allocated. Therefore, when the second lens element group is moved based on an actual use requirement of the optical lens 10, the focal length of the optical lens 10 can be adaptively adjusted to meet shooting requirements in different scenarios.

In some implementations, the first lens element group 11 of the optical lens 10 satisfies the following relation: 0.2<|f11/f12|<1.1. f11 represents a focal length of the first lens element 111 in the first lens element group 11. f12 represents a focal length of the second lens element 112 in the first lens element group 11. The first lens element 111 and the second lens element 112 in the first lens element group 11 in this application meet the foregoing relation. The focal lengths of the first lens element 111 and the second lens element 112 in the first lens element group 11 can be properly allocated, so that the optical lens 10 can have a good imaging effect. In some implementations of this application, an absolute value |f11/f12| of a ratio of the focal length of the first lens element in the first lens element group to the focal length of the second lens element is less than 1. That is, in this implementation of this application, an absolute value of the optical power of the first lens element 111 is less than an absolute value of the optical power of the second lens element 112. In other words, the first lens element 111 can have a good capability and a good light convergence effect to converge more external light into the optical lens 10. This increases the amount of light incident to the optical lens 10, so that the optical lens 10 has a better imaging effect.

In some implementations, the second lens element group 12 of the optical lens 10 satisfies the following relation: |f21/f2L|<10. f21 represents a focal length of the first lens element 121 in the second lens element group 12. f2L represents a focal length of a lens element closest to the image side in the second lens element group 12. In some implementations of this application, the second lens element group 12 includes two lens elements. The two lens elements are the first lens element 121 and a second lens element 122 that are sequentially arranged from the object side to the image side. Therefore, the lens element closest to the image side in the second lens element group 12 is the second lens element 122. In some other implementations, the second lens element group 12 may include three lens elements. The three lens elements are the first lens element 121, the second lens element 122, and a third lens element 123 (not shown in the figure) that are sequentially arranged from the object side to the image side. Therefore, the lens element closest to the image side in the second lens element group 12 is the third lens element 123.

The optical lens 10 in this application meets the foregoing relation. The focal lengths of the first lens element 121 and the lens element closest to the image side in the second lens element group 12 can be properly allocated, so that the second lens element group 12 can have a good light adjustment effect, and the second lens element group 12 can achieve a good focal length adjustment effect, to move in the axial direction to achieve a good effect of adjusting the focal length of the optical lens 10. This ensures that the optical lens 10 can have a good shooting effect for different use requirements.

In some implementations of this application, an absolute value |f21/f2L| of a ratio of the focal length of the first lens element 121 to the focal length of the lens element closest to the image side in the second lens element group 12 is less than 1. In other words, an absolute value of the focal length of the first lens element 121 is less than an absolute value of the focal length of the lens element closest to the image side in the second lens element group 12. Therefore, the first lens element 121 in the second lens element group 12 has a high refraction degree. Light incident to the first lens element group 11 and transmitted to the second lens element group 12 can be adjusted as soon as possible after passing through the first lens element 121. This ensures that a good light adjustment effect is achieved in different use scenarios through as few lens elements as possible, to ensure that the optical lens 10 can have a good imaging effect in different use scenarios.

In some implementations, the second lens element group 12 of the optical lens 10 satisfies the following relation: $1.4<|1-\beta^{\hat{}}|<3.8$. $\beta$ represents a ratio of an incident angle of light on the second lens element group 12 to an emergent angle of the light. $1-\beta^{\hat{}}2$ represents focal length sensitivity of the second lens element group 12. In this implementation of this application, focal length sensitivity determines a light adjustment capability and affects a focal length of a lens element group. In this implementation, when the focal length sensitivity of the second lens element group 12 meets the foregoing relation, the focal length and the light adjustment capability of the second lens element group 12 fall within an appropriate range. This can achieve a better focal length adjustment effect, so that the optical lens 10 can achieve a good imaging effect in different use scenarios.

In this implementation of this application, at least one lens element in the first lens element group 11 is a glass lens element, and the other lens elements are glass lens elements or plastic lens elements. Because a temperature coefficient of a relative refractive index of the glass lens element is small, in other words, a refractive index of the glass lens element changes slightly with a temperature, a temperature drift coefficient of the optical lens 10 in this application is greatly reduced compared with that of the optical lens 10 in which all lens elements are plastic lens elements. In general, a relationship in which the refractive index of the glass lens element changes with the temperature satisfies the following relation: dn/dT>0. dn represents a change value of the refractive index. dT represents a ratio of a change value of the temperature. A relationship in which a refractive index of the plastic lens element changes with the temperature satisfies the following relation: dn/dT<0. When the temperature changes, compensation is generated between the glass lens element and the plastic lens element, to reduce a temperature drift of the optical lens 10. In this implementation, a lens element closest to the object side (namely, the first lens element 111) in the first lens element group 11 is a glass lens element. Because the lens element closest to the object side in the first lens element group 11 is usually closest to the outside, the lens element is most affected by the temperature. Therefore, the temperature drift of the optical lens 10 can be maximally reduced by setting the lens element to a glass lens element.

In some implementations, the plurality of lens elements in the first lens element group 11 include at least four aspheric lens elements, and the lens elements in the second lens element group 12 are all aspheric lens elements, to ensure that the lens elements of the optical lens 10 have a higher degree of surface freedom. A surface of the lens element can be arbitrarily designed based on a requirement, so that aberration, a field curvature, and the like of the optical lens 10 can be reduced, to enable the optical lens 10 to have a better imaging effect. In some implementations of this application, the lens element closest to the object side (namely, the first lens element 111) in the first lens element group 11 is a spherical lens element, and the other lens elements are all aspheric lens elements. In some implementations of this application, the first lens element 111 is a glass lens element. The glass lens element is difficult to process. Therefore, when the first lens element 111 is a spherical lens element, processing of the lens element can be simpler than that of an aspheric lens element. It may be understood that in some other implementations of this application, the lens elements in the first lens element group 11 except the first lens element 121 may also be glass lens elements, to further reduce the temperature drift of the optical lens 10. In addition, a surface of the glass lens element included in the first lens element group 11 may alternatively be an aspheric surface, to increase a degree of surface freedom of the lens element. Therefore, the surface of the lens element can be arbitrarily designed based on a requirement, so that aberration, field curvature, and the like of the optical lens 10 are reduced, to enable the optical lens 10 to have a better imaging effect. In some implementations of this application, alternatively, one of the object side surface and the image side surface of the lens element may be a spherical surface, and the other surface is an aspheric surface.

Figure 5:
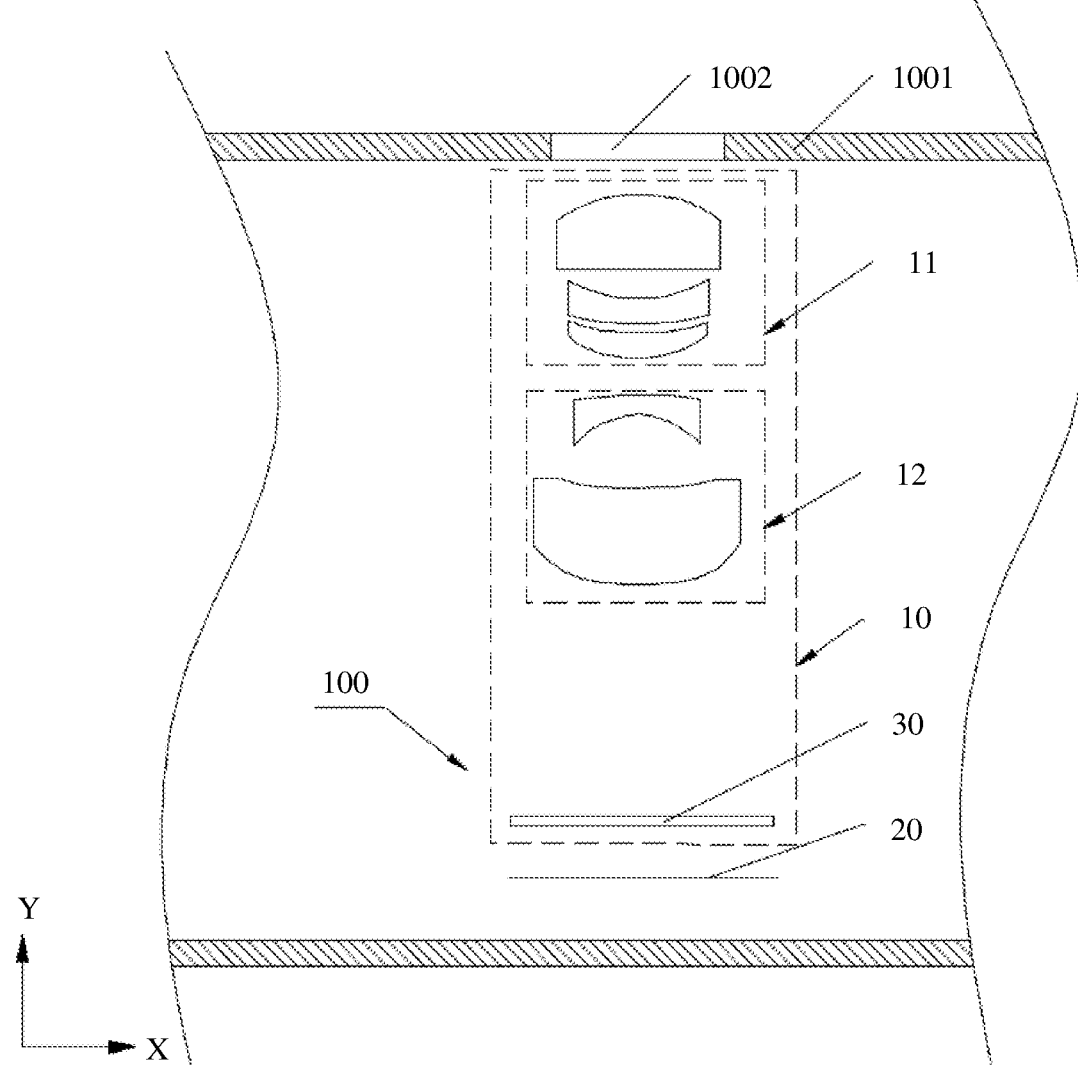
FIG. 5 is a schematic diagram of a partial cross section of the electronic device in the implementation of this application shown in FIG. 1 taken along I-I.

FIG. 5 is a schematic diagram of a partial cross section of the electronic device 1000 in the implementation shown in FIG. 1 taken along I-I. In this implementation, when the camera module 100 is mounted in the electronic device 1000, an axial direction of the optical lens 10 is the same as a thickness direction (namely, a Z-axis direction in the figure) of the electronic device 1000, and the optical lens 10 is opposite to the light incidence hole 1002 of the electronic device 1000. The light outside the electronic device 1000 is incident to the optical lens 10 through the light incidence hole 1002, and then is emergent to the photosensitive element 20 for imaging after passing through the optical lens 10. In this implementation, the axial direction of the optical lens 10 is the same as axial directions of the first lens element group 11 and the second lens element group 12. The total track length of the optical lens 10 affects the thickness of the electronic device 1000. In this application, because the total track length of the optical lens 10 can be small, the thickness of the electronic device 1000 can be small, so that the electronic device 1000 is thin.

Figures 6, 7A:
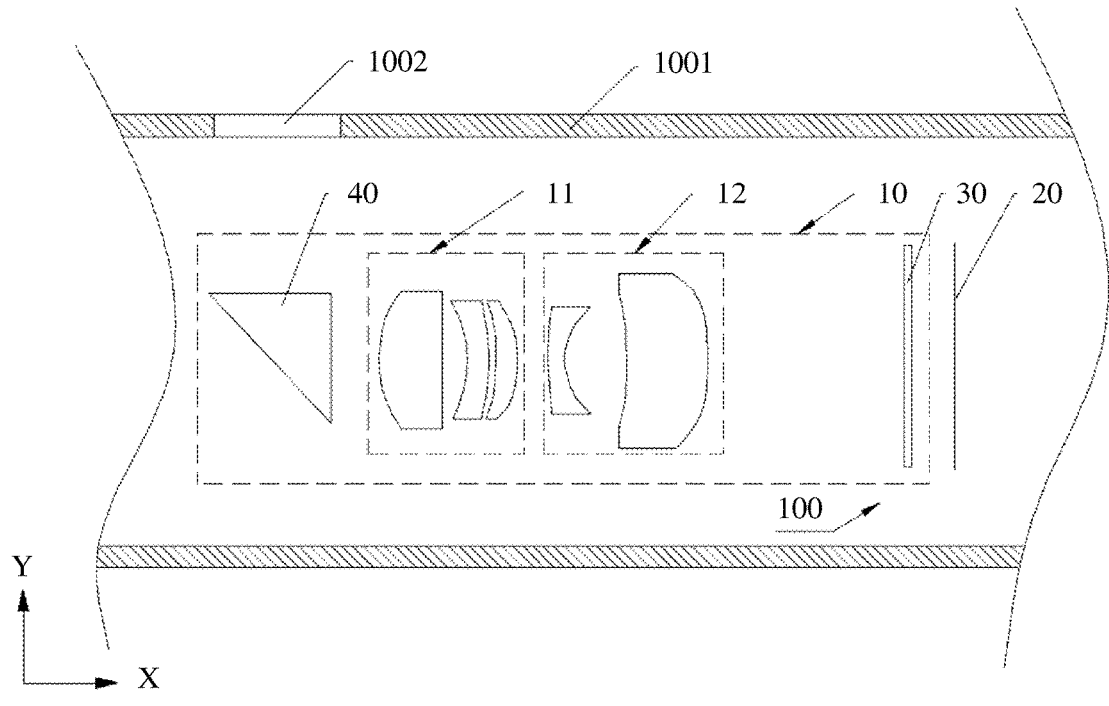
FIG. 6 is a schematic diagram of a partial cross section of the electronic device in the another implementation of this application taken along I-I in FIG. 1.
FIG. 7*a* is a schematic diagram of a structure of an optical lens in a first implementation of this application during telephoto shooting.

FIG. 6 is a schematic diagram of a partial cross section of an electronic device 1000 in another implementation of this application taken along I-I in FIG. 1. In this implementation, the optical lens 10 may be a periscope lens. That is, the axial directions of the first lens element group 11 and the second lens element group 12 may be perpendicular to the thickness direction (the Z-axis direction in the figure) of the electronic device 1000, to avoid impact of an axial distance between the first lens element group 11 and the second lens element group 12 on the thickness of the electronic device 1000. In this implementation, the axial directions of the first lens element group 11 and the second lens element group 12 are an X-axis direction in the figure. The optical lens 10 further includes an optical path refraction element 40. The optical path refraction element 40 can change the light transmission direction. In this implementation, the optical path refraction element 40 is disposed on a side that is of the first lens element group 11 and that is away from the second lens element group 12, and is opposite to the light incidence hole 1002 of the electronic device 1000. The light outside the electronic device 1000 may be incident to the optical lens 10 through the light incidence hole 1002 in the thickness direction of the electronic device 1000, be refracted by the optical path refraction element 40 of the optical lens 10, sequentially pass through the first lens element group 11 and the second lens element group 12, and then be emergent to the photosensitive element 20 for imaging. In this implementation, the optical path refraction element 40 may be a prism, a reflector, or the like. It may be understood that in some implementations of this application, a lens element may further be disposed between the optical path refraction element 40 and the light incidence hole 1002 of the electronic device 1000, to further improve the imaging effect of the optical lens 10.

In this application, in different use scenarios (including a telephoto shooting scenario and a macro shooting scenario), the second lens element group 12 is moved to change the distance between the first lens element group 11 and the second lens element group 12, to change the focal length of the optical lens 10. This ensures that the optical lens 10 in this application can achieve a good shooting effect in different use scenarios. In addition, in this application, the second lens element group 12 is disposed within a back focal length range of the first lens element group 11. In comparison with the solution in which the distance between the lens elements of the optical lens 10 is adjusted to change the focal length of the optical lens 10, the total track length of the optical lens 10 in this application can be small, so that the optical lens 10 can be used within the thin electronic device 1000. In addition, in this application, the optical power of the first lens element group 11 and the second lens element group 12 is properly allocated, the optical power of the lens elements in the first lens element group 11 and the second lens element group 12 is properly allocated, and the quantity of lens elements is controlled, so that the aperture, focal length, thickness, refractive index, total track length, and the like of the optical lens 10 cooperate together. In this way, the optical lens 10 can have a good imaging effect in different application scenarios. In addition, a requirement for a compact structure of an optical system is met, so that the optical lens 10 has a small volume and can be better applied to the miniaturized electronic device 1000.

The following describes in more detail some non-limiting examples in the implementations of this application with reference to FIG. 7a to FIG. 33.

Figure 7B:
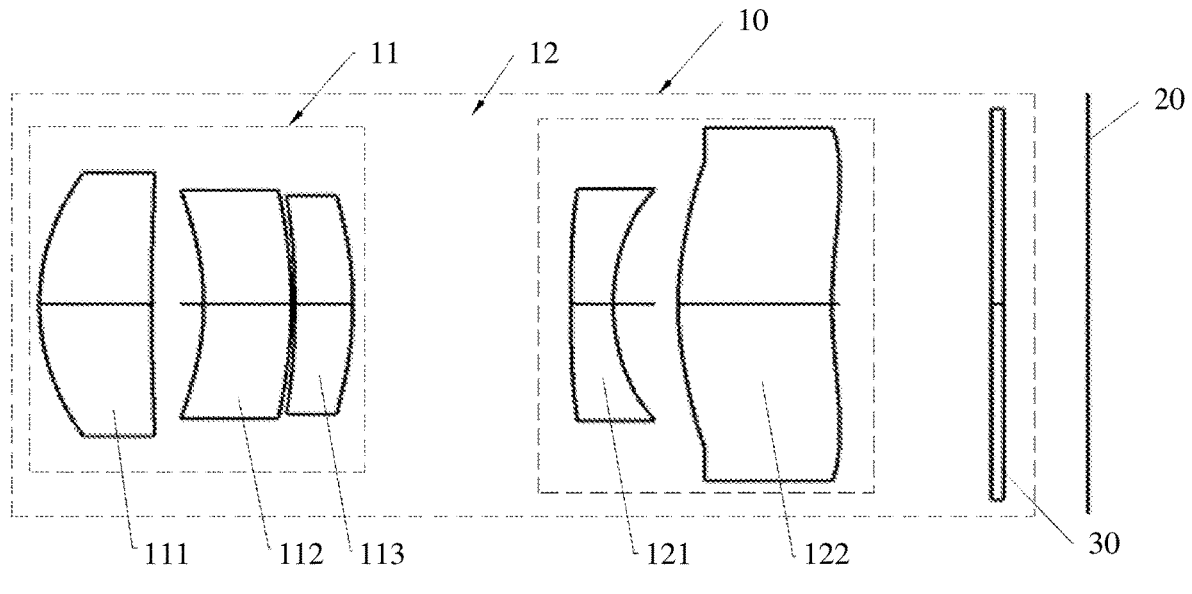
FIG. 7*b* is a schematic diagram of a structure of the optical lens in the first implementation of this application during macro shooting.

Refer to FIG. 7a and FIG. 7b. FIG. 7a is a schematic diagram of a structure of an optical lens 10 in a first implementation of this application during telephoto shooting. FIG. 7b is a schematic diagram of a structure of an optical lens 10 in the first implementation of this application during macro shooting. In this implementation, the optical lens 10 includes a first lens element group 11 and a second lens element group 12 that are sequentially arranged from an object side to an image side. The first lens element group 11 has three lens elements: a first lens element 111, a second lens element 112, and a third lens element 113. The first lens element 111, the second lens element 112, and the third lens element 113 are sequentially arranged from the object side to the image side. The second lens element group 12 has two lens elements: a first lens element 121 and a second lens element 122. The first lens element 121 and the second lens element 122 are sequentially arranged from the object side to the image side. In this implementation, the first lens element 111, the second lens element 112, the third lens element 113, the first lens element 121, and the second lens element 122 are coaxially disposed. In this implementation, an axial direction of the first lens element group 11 is an optical axis direction of the first lens element 111, the second lens element 112, and the third lens element 113. An axial direction of the second lens element group 12 is the lens of the first lens element 121 and the second lens element 122. The first lens element group 11 and the second lens element group 12 are coaxial.

The first lens element group 11 has positive optical power, and the second lens element group 12 has negative optical power. In the first lens element group 11, the first lens element 111 has positive optical power, the second lens element 112 has negative optical power, and the third lens element 113 has positive optical power. In the second lens element group 12, the first lens element 121 has positive optical power, and the second lens element 122 has negative optical power. The first lens element 121 in the second lens element group 12 is a meniscus lens element, and an image side surface of the first lens element 121 is a concave surface.

In this implementation, the first lens element 111 in the first lens element group 11 is a glass lens element. Both an object side surface and the image side surface of the first lens element 111 in the first lens element group 11 are spherical surfaces. Object side surfaces and image side surfaces of the second lens element 112 and the third lens element 113 are high-order aspheric surfaces. Object side surfaces and image side surfaces of the first lens element 121 and the second lens element 122 in the second lens element group 12 are high-order aspheric surfaces. Based on the foregoing relations that the optical lens 10 in this application meets, design parameters of the optical lens 10 in the first implementation of this application are shown in Table 1.

TABLE 1

| Design parameters of the optical lens 10 in the first implementation | | | | | | |
|---|---|---|---|---|---|---|
| Surface number | Surface type | Curvature radius (mm) | Thickness d1 (mm) | Thickness d2 (mm) | Material refractive index | Material Abbe number |
| S11 | Spherical surface | 5.709 | 2.023 | 2.023 | 1.62 | 63.9 |
| S12 | Spherical surface | Infinity | 0.804 | 0.804 | | |
| S13 | Aspheric surface | −5.180 | 0.613 | 0.613 | 1.66 | 20.4 |
| S14 | Aspheric surface | −8.735 | 0.270 | 0.270 | | |
| S15 | Aspheric surface | −32.197 | 0.690 | 0.690 | 1.54 | 55.9 |
| S16 | Aspheric surface | −5.419 | 0.999 | 2.320 | | |

TABLE 1-continued

| | Design parameters of the optical lens 10 in the first implementation | | | | | |
|---|---|---|---|---|---|---|
| Surface number | Surface type | Curvature radius (mm) | Thickness d1 (mm) | Thickness d2 (mm) | Material refractive index | Material Abbe number |
| S21 | Aspheric surface | 20.630 | 0.527 | 0.527 | 1.54 | 55.9 |
| S22 | Aspheric surface | 3.118 | 1.779 | 1.779 | | |
| S23 | Aspheric surface | −60.971 | 2.415 | 2.415 | 1.54 | 55.9 |
| S24 | Aspheric surface | −13.099 | 5.126 | 3.806 | | |
| S31 | Spherical surface | Infinity | 0.210 | 0.210 | 1.52 | 64.2 |
| S32 | Spherical surface | Infinity | 1.372 | 1.372 | | |

S11 represents the object side surface of the first lens element 111. S12 represents the image side surface of the first lens element 111. S13 represents the object side surface of the second lens element 112. S14 represents the image side surface of the second lens element 112. S15 represents the object side surface of the third lens element 113. S16 represents the image side surface of the third lens element 113. S21 represents the object side surface of the first lens element 121. S22 represents the image side surface of the first lens element 121. S23 represents the object side surface of the second lens element 122. S24 represents the image side surface of the second lens element 122. S31 represents an object side surface of a light filter 30. S32 represents an image side surface of the light filter 30. It should be noted that meanings of S11, S12, S13, S14, S15, S16, S21, S22, S23, S24, S31, S32, and the like are the same in this application. When the symbols appear again subsequently, their meanings are not described again.

The thickness d1 represents a thickness of each lens element of the optical lens 10 and a distance between the lens elements when the optical lens 10 is in a telephoto shooting state. Here, d1/S11 represents a thickness of the first lens element 111 when the optical lens 10 is in the telephoto shooting state. d1/S12 represents a distance between the image side surface of the first lens element 111 and the object side surface of the second lens element 112 when the optical lens 10 is in the telephoto shooting state. d1/S13 represents a thickness of the second lens element 112 when the optical lens 10 is in the telephoto shooting state. d1/S14 represents a distance between the image side surface of the second lens element 112 and the object side surface of the third lens element 113 when the optical lens 10 is in the telephoto shooting state. d1/S15 represents a thickness of the third lens element 113 when the optical lens 10 is in the telephoto shooting state. d1/S16 represents a distance between the image side surface of the third lens element 113 and the object side surface of the first lens element 121 when the optical lens 10 is in the telephoto shooting state. d1/S21 represents a thickness of the first lens element 121 when the optical lens 10 is in the telephoto shooting state. d1/S22 represents a distance between the image side surface of the first lens element 121 and the object side surface of the second lens element 122 when the optical lens 10 is in the telephoto shooting state. d1/S23 represents a thickness of the second lens element 122 when the optical lens 10 is in the telephoto shooting state. d1/S24 represents a distance between the image side surface of the second lens element 122 and the object side surface of the light filter 30 when the optical lens 10 is in the telephoto shooting state. d1/S31 represents a thickness of the light filter 30 when the optical lens 10 is in the telephoto shooting state. d1/S32 represents a distance between the image side surface of the light filter 30 and a photosensitive element 20 when the optical lens 10 is in the telephoto shooting state.

The thickness d2 represents a thickness of each lens element of the optical lens 10 and a distance between the lens elements when the optical lens 10 is in a macro shooting state. Here, d2/S11 represents a thickness of the first lens element 111 when the optical lens 10 is in the macro shooting state. d2/S12 represents a distance between the image side surface of the first lens element 111 and the object side surface of the second lens element 112 when the optical lens 10 is in the macro shooting state. d2/S13 represents a thickness of the second lens element 112 when the optical lens 10 is in the macro shooting state. d2/S14 represents a distance between the image side surface of the second lens element 112 and the object side surface of the third lens element 113 when the optical lens 10 is in the macro shooting state. d2/S15 represents a thickness of the third lens element 113 when the optical lens 10 is in the macro shooting state. d2/S16 represents a distance between the image side surface of the third lens element 113 and the object side surface of the first lens element 121 when the optical lens 10 is in the macro shooting state. d2/S21 represents a thickness of the first lens element 121 when the optical lens 10 is in the macro shooting state. d2/S22 represents a distance between the image side surface of the first lens element 121 and the object side surface of the second lens element 122 when the optical lens 10 is in the macro shooting state. d2/S23 represents a thickness of the second lens element 122 when the optical lens 10 is in the macro shooting state. d2/S24 represents a distance between the image side surface of the second lens element 122 and the object side surface of the light filter 30 when the optical lens 10 is in the macro shooting state. d2/S31 represents a thickness of the light filter 30 when the optical lens 10 is in the macro shooting state. d2/S32 represents a distance between the image side surface of the light filter 30 and the photosensitive element 20 when the optical lens 10 is in the macro shooting state.

It should be noted that meanings of d1, d2, d1/S11, d1/S12, d1/S13, d1/S14, d1/S15, d1/S16, d1/S21, d1/S22, d1/S23, d1/S24, d1/S31, d1/S32, d2/S11, d2/S12, d2/S13, d2/S14, d2/S15, d2/S16, d2/S21, d2/S22, d2/S23, d2/S24, d2/S31, d2/S32, and the like are the same in this application. When the symbols appear again subsequently, their meanings are not described again.

Table 2 shows design parameters of aspheric lens elements of the optical lens 10 in this implementation. It should be noted that the aspheric lens element described in this application is a lens element whose image side surface and object side surface are both aspheric surfaces. In this implementation, the second lens element 112 and the third lens element 113 in the first lens element group 11, and the first lens element 121 and the second lens element 122 in the second lens element group 12 are all aspheric lens elements.

TABLE 2

Design parameters of the lens elements of the optical lens 10 in the first implementation

| | S13 | | S14 | | S15 | | S16 |
|---|---|---|---|---|---|---|---|
| K | 0.0000E+00 | K | 0.0000E+00 | K | 0.0000E+00 | K | 0.0000E+00 |
| $A_2$ | 0.0000E+00 | $A_2$ | 0.0000E+00 | $A_2$ | 0.0000E+00 | $A_2$ | 0.0000E+00 |
| $A_4$ | 3.7308E–03 | $A_4$ | 2.2305E–03 | $A_4$ | –2.9016E–03 | $A_4$ | –5.7294E–04 |
| $A_6$ | –2.0917E–04 | $A_6$ | –4.8004E–04 | $A_6$ | –4.7801E–04 | $A_6$ | –9.8118E–05 |
| $A_8$ | 1.4703E–05 | $A_8$ | 1.3680E–04 | $A_8$ | 2.7395E–04 | $A_8$ | 1.2754E–04 |
| $A_{10}$ | –8.2788E–07 | $A_{10}$ | –1.4958E–05 | $A_{10}$ | –2.7794E–05 | $A_{10}$ | –1.0823E–05 |
| $A_{12}$ | 0.0000E+00 | $A_{12}$ | 0.0000E+00 | $A_{12}$ | 0.0000E+00 | $A_{12}$ | 0.0000E+00 |
| | S21 | | S22 | | S23 | | S24 |
| K | 0.0000E+00 | K | 0.0000E+00 | K | 0.0000E+00 | K | 0.0000E+00 |
| $A_2$ | 0.0000E+00 | $A_2$ | 0.0000E+00 | $A_2$ | 0.0000E+00 | $A_2$ | 0.0000E+00 |
| $A_4$ | 2.3751E–03 | $A_4$ | 5.1054E–04 | $A_4$ | –3.7422E–03 | $A_4$ | –2.9382E–03 |
| $A_6$ | –3.5615E–04 | $A_6$ | –1.7099E–04 | $A_6$ | –6.7599E–05 | $A_6$ | –9.7366E–05 |
| $A_8$ | 1.4491E–04 | $A_8$ | 1.9853E–04 | $A_8$ | 6.3427E–05 | $A_8$ | 2.0844E–05 |
| $A_{10}$ | –1.6616E–05 | $A_{10}$ | –2.0738E–05 | $A_{10}$ | –4.4891E–06 | $A_{10}$ | –1.4773E–06 |
| $A_{12}$ | 0.0000E+00 | $A_{12}$ | 0.0000E+00 | $A_{12}$ | 8.8965E–08 | $A_{12}$ | 3.3404E–08 |

K represents a conic constant. A2, A4, A6, A8, A10, A12, and the like represent polynomial coefficients. It should be noted that the parameters in the table are represented through scientific notation. For example, 3.7308E-03 indicates $3.7308 \times 10^{-03}$, and −1.4773E-06 indicates $-1.4773 \times 10^{-6}$ Meanings of K, A2, A4, A6, A8, A10, A12, and the like are the same in this application. When the symbols appear again subsequently, their meanings are not described again.

In this implementation, all aspheric surfaces may be defined by, but not limited to, the following aspheric surface formula:

$$z = \frac{cr^2}{1 + \sqrt{1 - Kc^2 r^2}} + \sum_{i=1}^{N} \alpha_i \rho^i$$

z represents a vector height of the aspheric surface (namely, a relative distance between a point on the aspheric surface and at a distance r from an optical axis of the aspheric surface and a tangent plane of an intersection point tangent to the optical axis of the aspheric surface). r represents a radial coordinate of the aspheric surface (namely, a perpendicular distance between a point on a curve of the aspheric surface and the optical axis). c represents a spherical curvature of a vertex on the aspheric surface. K represents the conic constant. $\alpha_i$ represents an $i^{th}$-order aspheric surface coefficient. ρ represents a normalized axial coordinate.

$$\sum_{i=1}^{N} \alpha_i \rho^i = A_2 r^2 + A_4 r^4 + A_6 r^6 + A_8 r^8 + A_{10} r^{10} + A_{12} r^{12}$$

In this implementation, the second lens element 112, the third lens element 113, the first lens element 121, and the second lens element 122 in the optical lens 10 in this implementation can be designed by substituting the parameters in Table 2 into the foregoing aspheric surface formula.

The optical lens 10 in this implementation is obtained based on the design parameters of the foregoing lens elements. Basic parameters of the optical lens 10 in this implementation are shown in Table 3.

TABLE 3

Basic parameters of the optical lens 10 in the first implementation

| Parameter | Value | Parameter | Value |
|---|---|---|---|
| f1 (mm) | 7.78 | f22 (mm) | 30.1 |
| f2 (mm) | −10.47 | f (mm) | 16.57 |
| f11 (mm) | 9.2 | F# (mm) | 3.0 |
| f12 (mm) | −20.67 | IH (mm) | 4.5 |
| f13 (mm) | 11.86 | β | 2.13 |
| f21 (mm) | −6.82 | $|1 − β^2|$ | 3.54 |
| TTL (mm) | 16.828 | | | f1 represents a focal length of the first lens element group 11.

f2 represents a focal length of the second lens element group 12.

f11 represents a focal length of the first lens element 111 in the first lens element group 11.

f12 represents a focal length of the second lens element 112 in the first lens element group 11.

f13 represents a focal length of the third lens element 113 in the first lens element group 11.

f21 represents a focal length of the first lens element 121 in the second lens element group 12.

f22 represents a focal length of the second lens element 122 in the second lens element group 12.

f represents a focal length of an optical system.

F # represents an f-number of the optical system.

β represents a ratio of an incident angle of light on the second lens element group 12 to an emergent angle of the light. $|1-β^2|$ represents focal length sensitivity.

TTL represents a total track length, namely, an axial distance from the object side surface of the first lens element 111 in the first lens element group 11 to an image plane.

It should be noted that meanings of TTL, ImgH, f, f1, f1, f11, f12, f13, f21, f22, β, $|1-β^2|$, F #, and the like are the same in this application. When the symbols appear again subsequently, their meanings are not described again.

In this implementation, the total track length of the optical lens 10 is 16.828 mm. In this implementation, a distance d between an image side surface of a lens element closest to the second lens element group 12 in the first lens element group 11 and an object side surface of a lens element closest to the first lens element group 11 in the second lens element group 12 is a distance between the image side surface S16 of the third lens element 113 and the object side surface S21 of the first lens element 121. In this implementation, when the optical lens 10 is in the telephoto shooting state, the distance between the image side surface S16 of the third lens element 113 and the object side surface S21 of the first lens element 121 is 0.999 mm. When the optical lens 10 is in the macro shooting state, the distance between the image side surface S16 of the third lens element 113 and the object side surface S21 of the first lens element 121 is 2.32 mm.

In this implementation, a distance Δd for which the second lens element group 12 is movable relative to the first lens element group 11 is 1.32 mm. Application requirements in different scenarios of the optical lens 10 can be implemented through a short movement distance, and a requirement for a drive structure that drives the second lens element group 12 to move is low. A ratio of the distance Δd for which the second lens element group 12 is movable relative to the first lens element group 11 to the total track length TTL of the optical lens 10 is 0.138. In this implementation, a ratio |f1/f2| of the focal length of the first lens element group 11 to the focal length of the second lens element group 12 of the optical lens 10 is 0.74. A ratio |f1/f| of the focal length of the first lens element group 11 of the optical lens 10 to the focal length of the optical lens 10 is 0.47. A ratio |f2/f| of the focal length of the second lens element group 12 of the optical lens 10 to the focal length of the optical lens 10 is 0.63. The focal lengths of the first lens element group 11 and the second lens element group 12 of the optical lens 10 can be properly allocated, so that the optical lens 10 can have a good imaging effect. The second lens element group 12 can cooperate with the first lens element group 11 to correct aberration of the optical lens 10, reduce distortion, and improve imaging quality of the optical lens 10. In addition, in this implementation, an absolute value |f1/f2| of the ratio of the focal length of the first lens element group 11 to the focal length of the second lens element group 12 is less than 1. That is, a refraction capability of the first lens element group 11 is stronger than that of the second lens element group 12. The first lens element group 11 has a stronger light adjustment capability. A light adjustment effect of the second lens element group 12 is small. Therefore, a difference between light adjustment effects of the optical lens 10 when the second lens element group 12 moves between different positions is reduced, to ensure that the imaging effect of the optical lens 10 can be always good when the second lens element group 12 is moved to adjust the focal length of the optical lens 10 to implement telephoto shooting and macro shooting.

In this implementation, a ratio |f11/f12| of the focal length of the first lens element 111 to the focal length of the second lens element 112 in the first lens element group 11 is 0.45. The focal lengths of the first lens element 111 and the second lens element 112 in the first lens element group 11 can be properly allocated, so that the optical lens 10 can have a good imaging effect. In addition, in this implementation, optical power of the first lens element 111 is less than focal length of the second lens element 112. That is, the first lens element 111 can have a good light convergence effect to converge more external light into the optical lens 10. This increases an amount of light incident to the optical lens 10, so that the optical lens 10 has a better imaging effect.

In this implementation, a ratio |f21/f2L| of the focal length of the first lens element 121 to a focal length of a lens element closest to the image side (namely, the second lens element 122) in the second lens element group 12 is 0.23. The focal lengths of the first lens element 121 and the lens element closest to the image side (namely, the second lens element 122) in the second lens element group 12 can be properly allocated, so that the second lens element group 12 can have a good light adjustment effect, and the second lens element group 12 can achieve a good focal length adjustment effect, to move in an axial direction to achieve a good effect of adjusting the focal length of the optical lens 10. This ensures that the optical lens 10 can have a good shooting effect for different use requirements. In addition, in this implementation, an absolute value of the focal length of the first lens element 121 is less than an absolute value of the focal length of the lens element closest to the image side (namely, the second lens element 122) in the second lens element group 12. That is, the first lens element 121 in the second lens element group 12 has a high refraction degree. Therefore, during movement of the second lens element group 12 in the axial direction, light incident to the first lens element group 11 and transmitted to the second lens element group 12 can be adjusted as soon as possible after passing through the first lens element 121. This ensures that a good light adjustment effect is achieved in different use scenarios through as few lens elements as possible, to ensure that the optical lens 10 can have a good imaging effect in different use scenarios.

The focal length sensitivity $|1-\beta^2|$ of the second lens element group 12 is 3.54. The ratio $\beta$ of the incident angle of the light on the second lens element group 12 to the emergent angle of the light is 2.13. In this implementation, the focal length and the light adjustment capability of the second lens element group 12 fall within an appropriate range. This can achieve a better focal length adjustment effect, so that the optical lens 10 can achieve a good imaging effect in different use scenarios.

Figure 8:
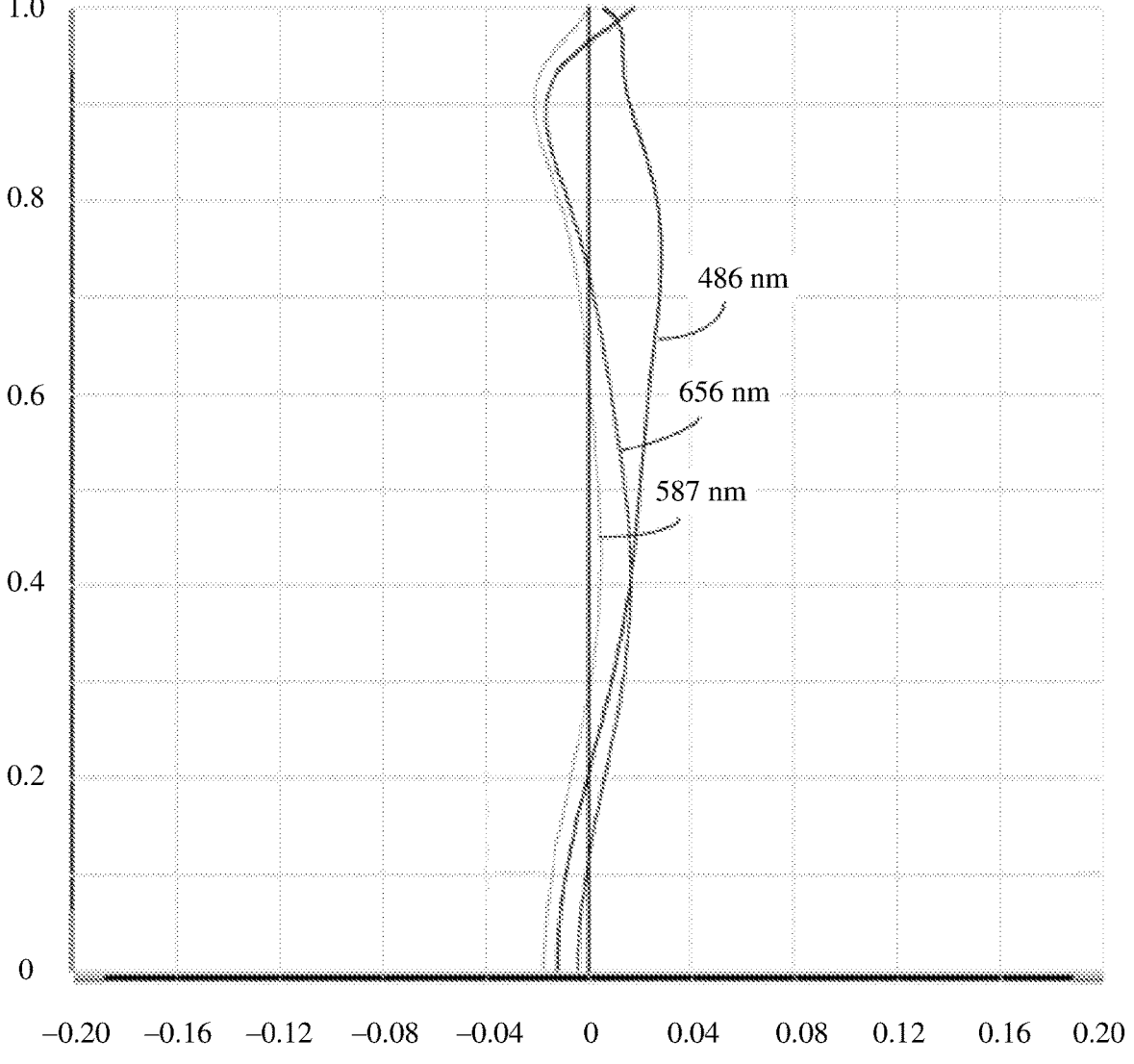
FIG. 8 is a diagram of transverse spherical aberration curves of light with wavelengths of 656 nm, 587 nm, and 486 nm passing through the optical lens in the first implementation of this application.
Figure 9:
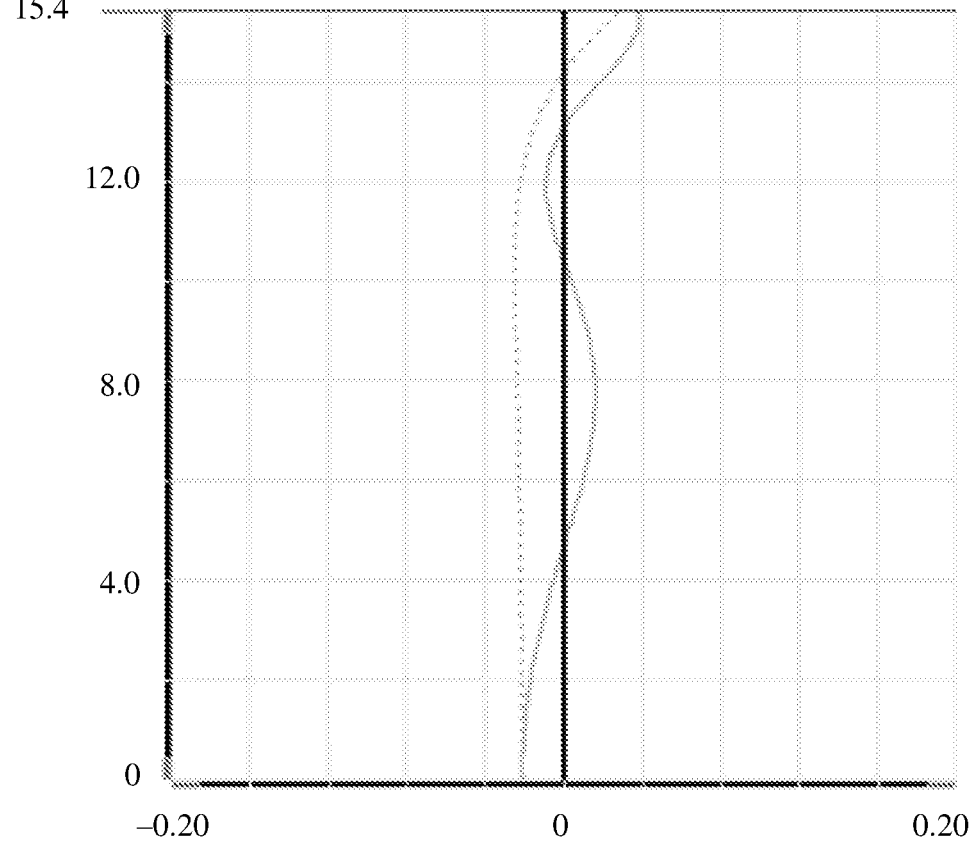
FIG. 9 is a diagram of an astigmatism field curvature of light with a wavelength of 555 nm passing through the optical lens in the first implementation of this application.
Figure 10:
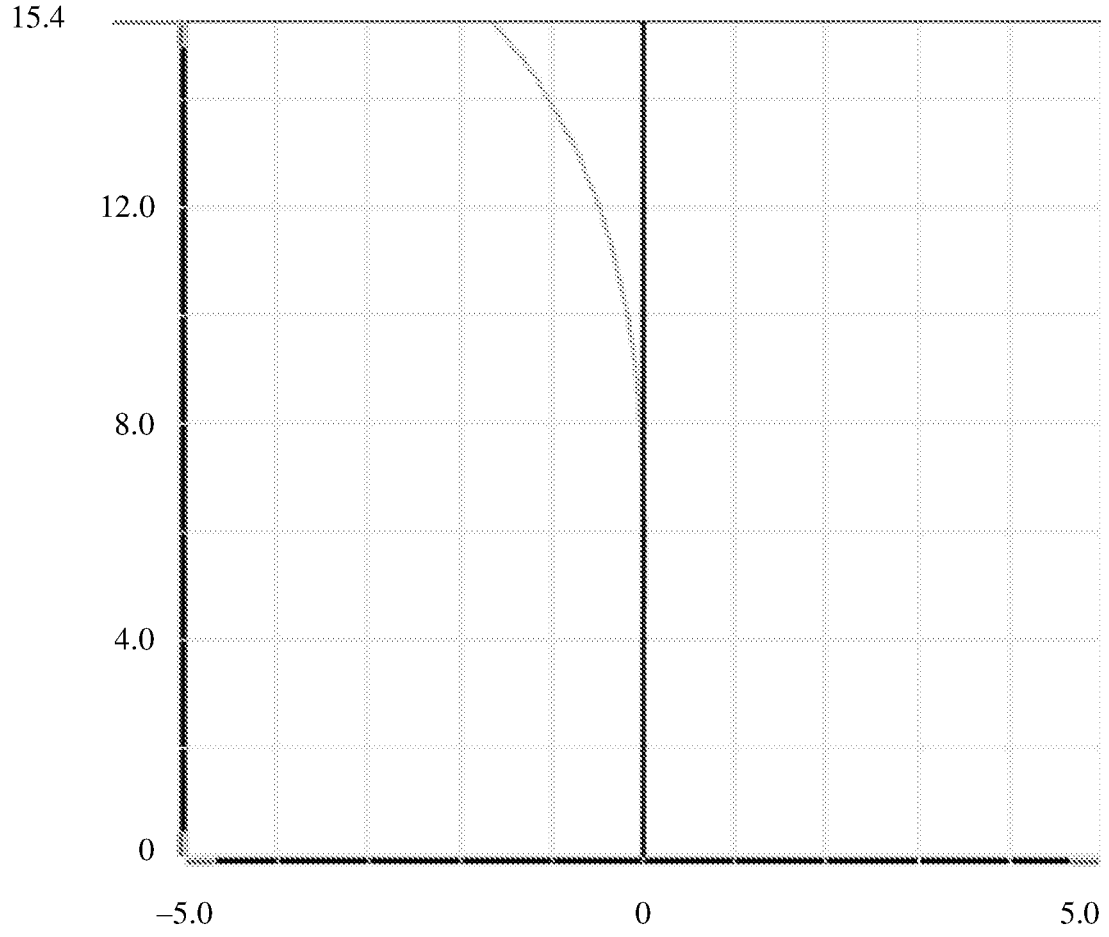
FIG. 10 is a distortion diagram of light with a wavelength of 555 nm passing through the optical lens in the first implementation of this application.

Refer to FIG. 8, FIG. 9, and FIG. 10. FIG. 8 is a diagram of transverse spherical aberration curves after light whose wavelengths are 656 nm, 587 nm, and 486 nm passes through the optical lens 10 in the first implementation. In FIG. 8, a vertical coordinate represents an actual image height, in millimeters; and a horizontal coordinate represents chromatic aberration in a transverse direction, in millimeters. FIG. 9 is a diagram of an astigmatism field curvature of light with a wavelength of 555 nm passing through the optical lens 10 in the first implementation. In FIG. 9, a vertical coordinate represents a field of view angle, in degrees (°); and a horizontal coordinate represents an astigmatism field curvature of the optical lens 10, in millimeters (mm). A solid line represents a field curvature of light with a center wavelength (555 nm) on a meridian image plane. A dashed line represents a field curvature of light with a center wavelength (555 nm) on a sagittal image plane. FIG. 10 is a distortion diagram of light with a wavelength of 555 nm passing through the optical lens 10 in the first implementation. In FIG. 10, a vertical coordinate represents a field of view angle, in degrees (°); and a horizontal coordinate represents distortion of the light with a wavelength of 555 nm passing through the optical lens 10 in the first implementation, in %. It can be learned from FIG. 8 that in this implementation, the transverse spherical aberration after the light with different wavelengths passes through the optical lens 10 in this implementation is also controlled within a small range. It can be learned from FIG. 9 that after the light passes through the optical lens 10 in this implementation, astigmatism field curvatures in a sagittal direction and a meridian direction are small. In other words, an astigmatism field curvature of imaging of the optical lens 10 in this implementation are small. It can be learned from FIG. 10 that distortion of the light passing through the optical lens 10 in this implementation is small. In other words, imaging distortion of the optical lens 10 in this implementation is small. Therefore, in this implementation, the transverse spherical aberration, astigmatism field curvature, distortion, and the like of the light passing through the optical lens 10 in this implementation are small. In other words, the optical lens 10 in this implementation can achieve a good imaging effect. The spherical aberration is a difference between actual light and paraxial light due to a spatial change of the optical lens.

Figure 11A:
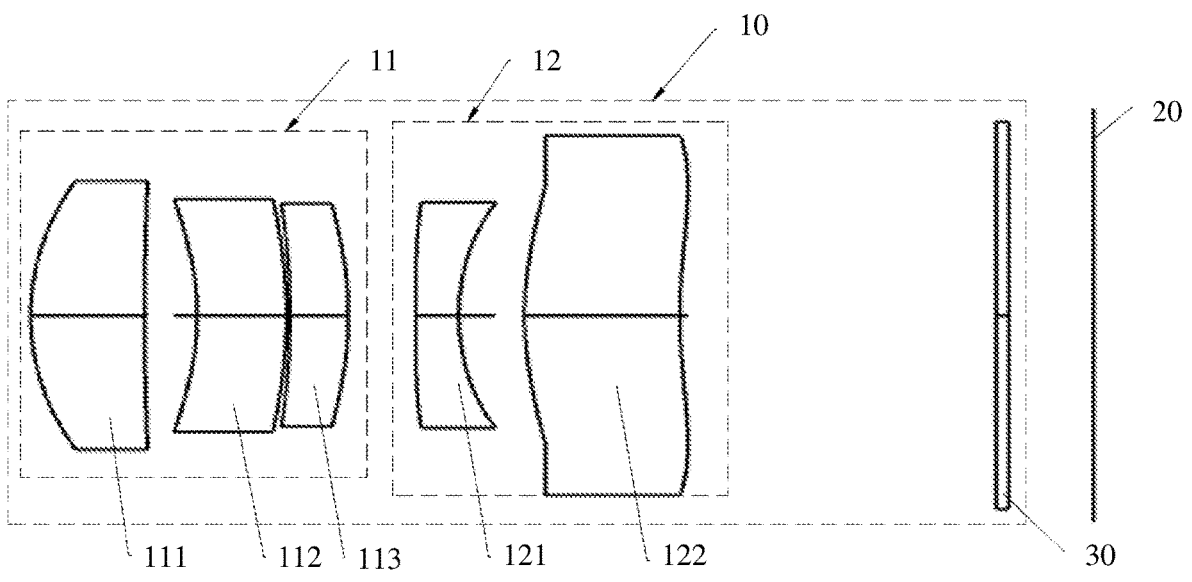
FIG. 11*a* is a schematic diagram of a structure of an optical lens in a second implementation of this application during telephoto shooting.
Figure 11B:
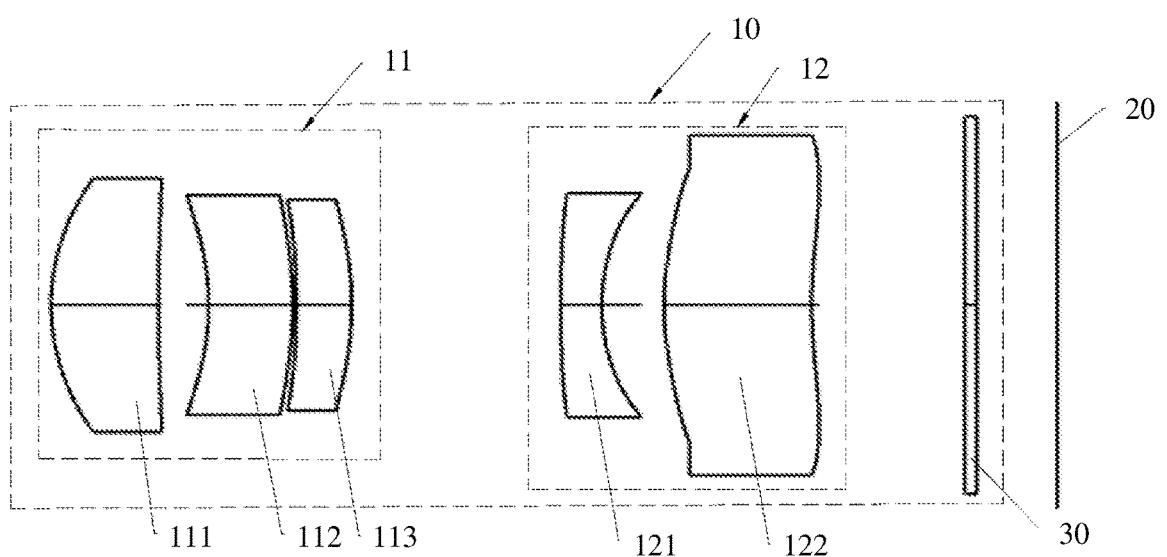
FIG. 11*b* is a schematic diagram of a structure of the optical lens in the second implementation of this application during macro shooting.

Refer to FIG. 11*a* and FIG. 11*b*. FIG. 11*a* is a schematic diagram of a structure of an optical lens 10 in a second implementation of this application during telephoto shooting. FIG. 11*b* is a schematic diagram of a structure of an optical lens 10 in the second implementation of this application during macro shooting. In this implementation, the optical lens 10 includes a first lens element group 11 and a second lens element group 12 that are sequentially arranged from an object side to an image side. The first lens element group 11 has three lens elements: a first lens element 111, a second lens element 112, and a third lens element 113. The first lens element 111, the second lens element 112, and the third lens element 113 are sequentially arranged from the object side to the image side. The second lens element group 12 has two lens elements: a first lens element 121 and a second lens element 122. The first lens element 121 and the second lens element 122 are sequentially arranged from the object side to the image side. In this implementation, the first lens element 111, the second lens element 112, the third lens element 113, the first lens element 121, and the second lens element 122 are coaxially disposed. In this implementation, an axial direction of the first lens element group 11 is an optical axis direction of the first lens element 111, the second lens element 112, and the third lens element 113. An axial direction of the second lens element group 12 is an optical axis direction of the first lens element 121 and the second lens element 122. The first lens element group 11 and the second lens element group 12 are coaxial.

The first lens element group 11 has positive optical power, and the second lens element group 12 has negative optical power. In the first lens element group 11, the first lens element 111 has positive optical power, the second lens element 112 has negative optical power, and the third lens element 113 has positive optical power. The first lens element 121 and the second lens element 122 in the second lens element group 12 both have negative optical power. The first lens element 121 in the second lens element group 12 is a meniscus lens element, and an image side surface of the first lens element 121 is a concave surface.

In this implementation, the first lens element 111 in the first lens element group 11 is a glass lens element. Both an object side surface and the image side surface of the first lens element 111 in the first lens element group 11 are spherical surfaces. Object side surfaces and image side surfaces of the second lens element 112 and the third lens element 113 are high-order aspheric surfaces. Object side surfaces and image side surfaces of the first lens element 121 and the second lens element 122 in the second lens element group 12 are high-order aspheric surfaces. Based on the foregoing relations that the optical lens 10 in this application meets, design parameters of the optical lens 10 in the second implementation of this application are shown in Table 4.

TABLE 4

| Design parameters of the optical lens 10 in the second implementation | | | | | |
|---|---|---|---|---|---|
| Surface number | Surface type | Curvature radius (mm) | Thickness d1 (mm) | Thickness d2 (mm) | Material refractive index | Material Abbe number |
| S11 | Spherical surface | 5.485 | 1.844 | 1.844 | 1.62 | 63.9 |
| S12 | Spherical surface | 70.708 | 0.856 | 0.856 | | |
| S13 | Aspheric surface | −6.231 | 1.448 | 1.448 | 1.66 | 20.4 |
| S14 | Aspheric surface | −10.724 | 0.059 | 0.059 | | |
| S15 | Aspheric surface | −25.810 | 0.952 | 0.952 | 1.54 | 55.9 |
| S16 | Aspheric surface | −9.001 | 1.084 | 3.580 | | |
| S21 | Aspheric surface | 73.624 | 0.704 | 0.704 | 1.54 | 55.9 |
| S22 | Aspheric surface | 5.039 | 1.064 | 1.064 | | |
| S23 | Aspheric surface | 7.648 | 2.529 | 2.529 | 1.54 | 55.9 |
| S24 | Aspheric surface | 12.776 | 5.126 | 2.630 | | |
| S31 | Spherical surface | Infinity | 0.210 | 0.210 | 1.52 | 64.2 |
| S32 | Spherical surface | Infinity | 1.372 | 1.372 | | |

Table 5 shows design parameters of aspheric lens elements of the optical lens 10 in this implementation. In this implementation, the second lens element 112 and the third lens element 113 in the first lens element group 11, and the first lens element 121 and the second lens element 122 in the second lens element group 12 are all aspheric lens elements.

TABLE 5

| Design parameters of the aspheric lens elements of the optical lens 10 in the second implementation | | | | | | | |
|---|---|---|---|---|---|---|---|
| | S13 | | S14 | | S15 | | S16 |
| K | 0.0000E+00 | K | 0.0000E+00 | K | 0.0000E+00 | K | 0.0000E+00 |
| $A_2$ | 0.0000E+00 | $A_2$ | 0.0000E+00 | $A_2$ | 0.0000E+00 | $A_2$ | 0.0000E+00 |
| $A_4$ | 3.7308E−03 | $A_4$ | 2.2305E−03 | $A_4$ | −2.9016E−03 | $A_4$ | −5.7294E−04 |
| $A_6$ | −2.0917E−04 | $A_6$ | −4.8004E−04 | $A_6$ | −4.7801E−04 | $A_6$ | −9.8118E−05 |
| $A_8$ | 1.4703E−05 | $A_8$ | 1.3680E−04 | $A_8$ | 2.7395E−04 | $A_8$ | 1.2754E−04 |

TABLE 5-continued

Design parameters of the aspheric lens elements of
the optical lens 10 in the second implementation

| $A_{10}$ | −8.2788E−07 | $A_{10}$ | −1.4958E−05 | $A_{10}$ | −2.7794E−05 | $A_{10}$ | −1.0823E−05 |
|---|---|---|---|---|---|---|---|
| $A_{12}$ | 0.0000E+00 | $A_{12}$ | 0.0000E+00 | $A_{12}$ | 0.0000E+00 | $A_{12}$ | 0.0000E+00 |

|  | S21 |  | S22 |  | S23 |  | S24 |
|---|---|---|---|---|---|---|---|
| K | 0.0000E+00 | K | 0.0000E+00 | K | 0.0000E+00 | K | 0.0000E+00 |
| $A_2$ | 0.0000E+00 | $A_2$ | 0.0000E+00 | $A_2$ | 0.0000E+00 | $A_2$ | 0.0000E+00 |
| $A_4$ | 2.3751E−03 | $A_4$ | 5.1054E−04 | $A_4$ | −3.7422E−03 | $A_4$ | −2.9382E−03 |
| $A_6$ | −3.5615E−04 | $A_6$ | −1.7099E−04 | $A_6$ | −6.7599E−05 | $A_6$ | −9.7366E−05 |
| $A_8$ | 1.4491E−04 | $A_8$ | 1.9853E−04 | $A_8$ | 6.3427E−05 | $A_8$ | 2.0844E−05 |
| $A_{10}$ | −1.6616E−05 | $A_{10}$ | −2.0738E−05 | $A_{10}$ | −4.4891E−06 | $A_{10}$ | −1.4773E−06 |
| $A_{12}$ | 0.0000E+00 | $A_{12}$ | 0.0000E+00 | $A_{12}$ | 8.8965E−08 | $A_{12}$ | 3.3404E−08 |

In this implementation, all aspheric surfaces may be defined by, but not limited to, the following aspheric surface formula:

$$z = \frac{cr^2}{1 + \sqrt{1 - Kc^2r^2}} + \sum_{i=1}^{N} \alpha_i \rho^i$$

z represents a vector height of the aspheric surface (namely, a relative distance between a point on the aspheric surface and at a distance r from an optical axis of the aspheric surface and a tangent plane of an intersection point tangent to the optical axis of the aspheric surface). r represents a radial coordinate of the aspheric surface (namely, a perpendicular distance between a point on a curve of the aspheric surface and the optical axis). c represents a spherical curvature of a vertex on the aspheric surface. K represents the conic constant. $\alpha_i$ represents an $i^{th}$-order aspheric surface coefficient. ρ represents a normalized axial coordinate.

$$\sum_{i=1}^{N} \alpha_i \rho^i = A_2 r^2 + A_4 r^4 + A_6 r^6 + A_8 r^8 + A_{10} r^{10} + A_{12} r^{12}$$

In this implementation, the second lens element 112, the third lens element 113, the first lens element 121, and the second lens element 122 in the optical lens 10 in this implementation can be designed by substituting the parameters in Table 2 into the foregoing aspheric surface formula.

The optical lens 10 in this implementation is obtained based on the design parameters of the foregoing lens elements. Basic parameters of the optical lens 10 in this implementation are shown in Table 6.

TABLE 6

Basic parameters of the optical lens
10 in the second implementation

| Parameter | Value | Parameter | Value |
|---|---|---|---|
| f1 (mm) | 10.28 | f22 (mm) | 29.8 |
| f2 (mm) | −14.22 | f (mm) | 16.53 |
| f11 (mm) | 9.50 | F# (mm) | 3.00 |
| f12 (mm) | −25.79 | IH (mm) | 4.2 |
| f13 (mm) | 24.88 | β | 1.61 |
| f21 (mm) | −9.97 | \|1 − β^2\| | 1.58 |
| TTL (mm) | 17.248 | | |

In this implementation, the total track length of the optical lens 10 is 17.248 mm. In this implementation, a distance d between an image side surface of a lens element closest to the second lens element group 12 in the first lens element group 11 and an object side surface of a lens element closest to the first lens element group 11 in the second lens element group 12 is a distance between the image side surface S16 of the third lens element 113 and the object side surface S21 of the first lens element 121. In this implementation, when the optical lens 10 is in the telephoto shooting state, the distance between the image side surface S16 of the third lens element 113 and the object side surface S21 of the first lens element 121 is 1.084 mm. When the optical lens 10 is in the macro shooting state, the distance between the image side surface S16 of the third lens element 113 and the object side surface S21 of the first lens element 121 is 3.58 mm.

In this implementation, a distance Δd for which the second lens element group 12 is movable relative to the first lens element group 11 is 2.49 mm. Application requirements in different scenarios of the optical lens 10 can be implemented through a short movement distance, and a requirement for a drive structure that drives the second lens element group 12 to move is low. A ratio of the distance Δd for which the second lens element group 12 is movable relative to the first lens element group 11 to the total track length TTL of the optical lens 10 is 0.144.

In this implementation, a ratio |f1/f2| of the focal length of the first lens element group 11 to the focal length of the second lens element group 12 of the optical lens 10 is 0.72. A ratio |f1/f| of the focal length of the first lens element group 11 of the optical lens 10 to the focal length of the optical lens 10 is 0.62. A ratio |f2/f| of the focal length of the second lens element group 12 of the optical lens 10 to the focal length of the optical lens 10 is 0.86. The focal lengths of the first lens element group 11 and the second lens element group 12 of the optical lens 10 can be properly allocated, so that the optical lens 10 can have a good imaging effect. The second lens element group 12 can cooperate with the first lens element group 11 to correct aberration of the optical lens 10, reduce distortion, and improve imaging quality of the optical lens 10. In addition, in this implementation, an absolute value |f1/f2| of a ratio of the focal length of the first lens element group 11 to the focal length of the second lens element group 12 is less than 1. In other words, the focal length of the first lens element group 11 is less than the focal length of the second lens element group 12. A refraction capability of the first lens element group 11 is stronger than that of the second lens element group 12. The first lens element group 11 has a stronger light adjustment capability. A light adjustment effect of the second lens element group 12 is small. Therefore, a difference between light adjustment effects of the optical lens 10 when the second lens element group 12 moves between different positions is reduced, to ensure that the imaging effect of the optical lens 10 can be always good when the second lens element group 12 is moved to adjust the focal length of the optical lens 10 to implement telephoto shooting and macro shooting.

In this implementation, a ratio |f11/f12| of the focal length of the first lens element 111 to the focal length of the second lens element 112 in the first lens element group 11 is 0.37. The focal lengths of the first lens element 111 and the second lens element 112 in the first lens element group 11 can be properly allocated, so that the optical lens 10 can have a good imaging effect. In addition, in this implementation, optical power of the first lens element 111 is less than optical power of the second lens element 112. That is, the first lens element 111 can have a good light convergence effect to converge more external light into the optical lens 10. This increases an amount of light incident to the optical lens 10, so that the optical lens 10 has a better imaging effect.

In this implementation, a ratio |f21/f2L| of the focal length of the first lens element 121 to a focal length of a lens element closest to the image side (namely, the second lens element 122) in the second lens element group 12 is 0.33. The focal lengths of the first lens element 121 and the lens element closest to the image side (namely, the second lens element 122) in the second lens element group 12 can be properly allocated, so that the second lens element group 12 can have a good light adjustment effect, and the second lens element group 12 can achieve a good focal length adjustment effect, to move in an axial direction to achieve a good effect of adjusting the focal length of the optical lens 10. This ensures that the optical lens 10 can have a good shooting effect for different use requirements. In addition, in this implementation, an absolute value of the focal length of the first lens element 121 is less than an absolute value of the focal length of the lens element closest to the image side (namely, the second lens element 122) in the second lens element group 12. That is, the first lens element 121 in the second lens element group 12 has a high refraction degree. Therefore, during movement of the second lens element group 12 in the axial direction, light incident to the first lens element group 11 and transmitted to the second lens element group 12 can be adjusted as soon as possible after passing through the first lens element 121. This ensures that a good light adjustment effect is achieved in different use scenarios through as few lens elements as possible, to ensure that the optical lens 10 can have a good imaging effect in different use scenarios.

The focal length sensitivity |1−β^2| of the second lens element group 12 is 3.54. The ratio β of the incident angle of the light on the second lens element group 12 to the emergent angle of the light is 2.13. In this implementation, the focal length and the light adjustment capability of the second lens element group 12 fall within an appropriate range. This can achieve a better focal length adjustment effect, so that the optical lens 10 can achieve a good imaging effect in different use scenarios.

Figure 12:
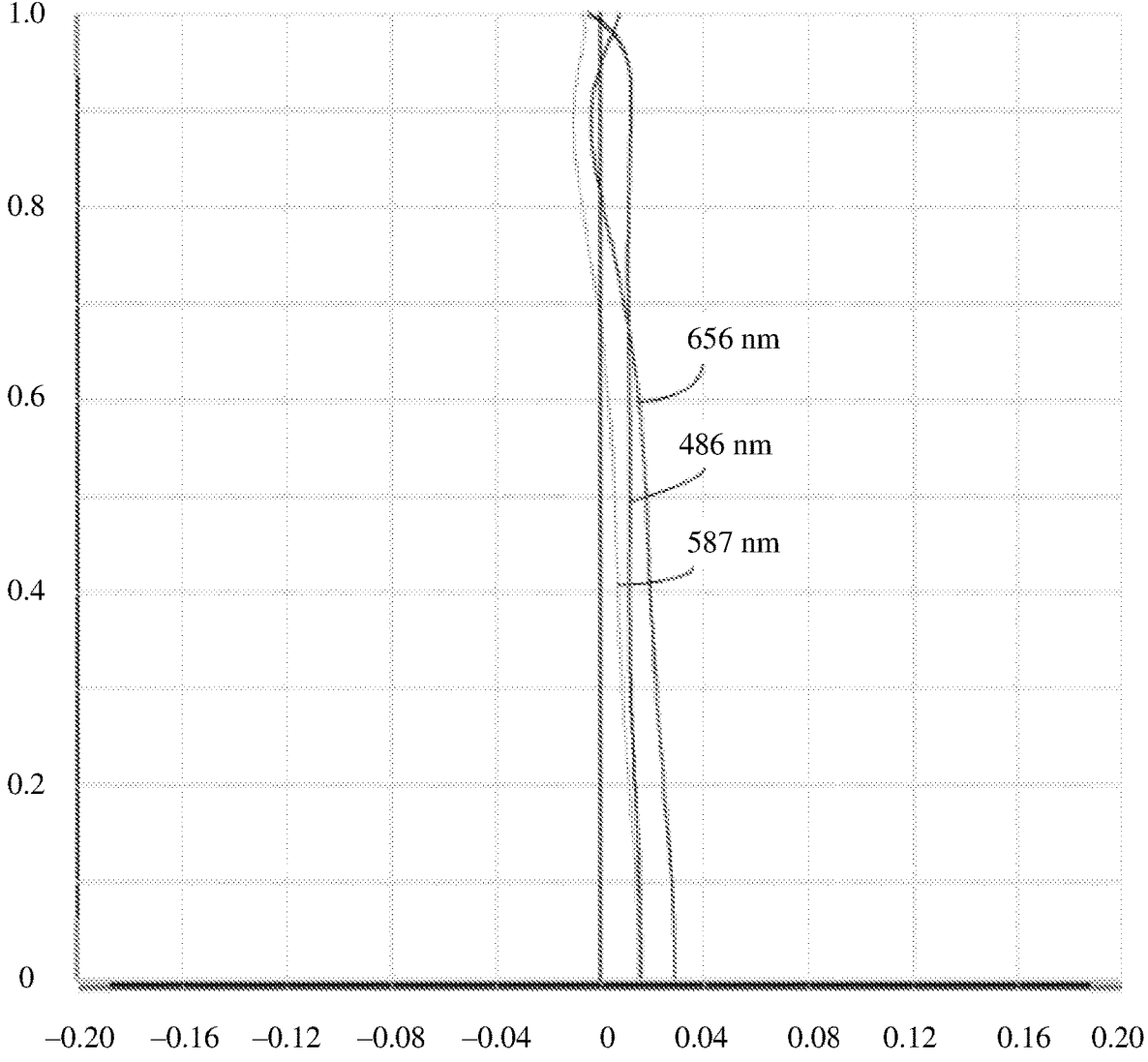
FIG. 12 is a diagram of transverse spherical aberration curves of light with wavelengths of 656 nm, 587 nm, and 486 nm passing through the optical lens in the second implementation of this application.
Figure 13:
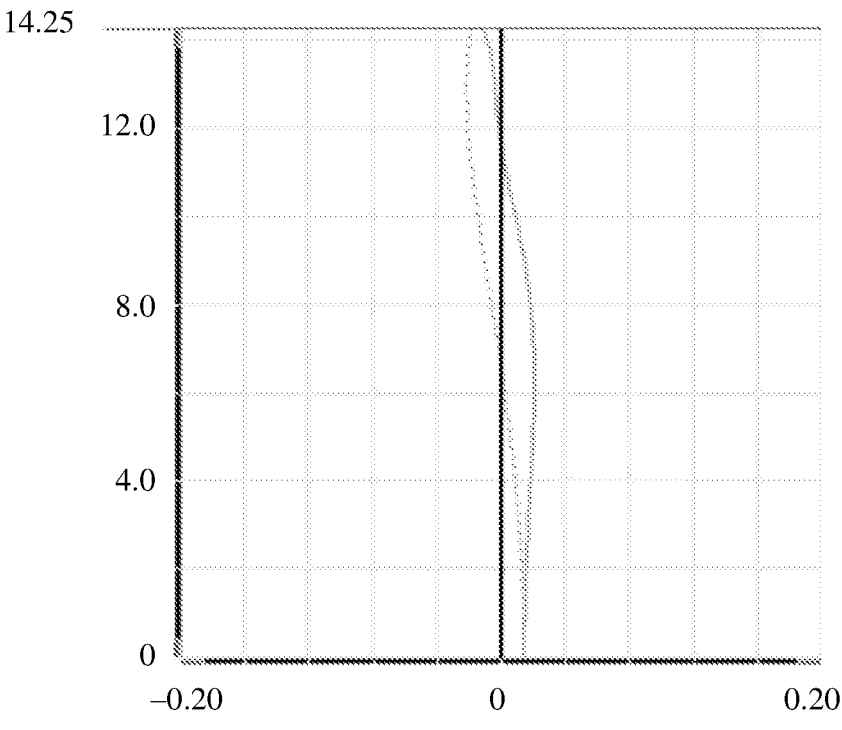
FIG. 13 is a diagram of an astigmatism field curvature of light with a wavelength of 555 nm passing through the optical lens in the second implementation of this application.
Figure 14:
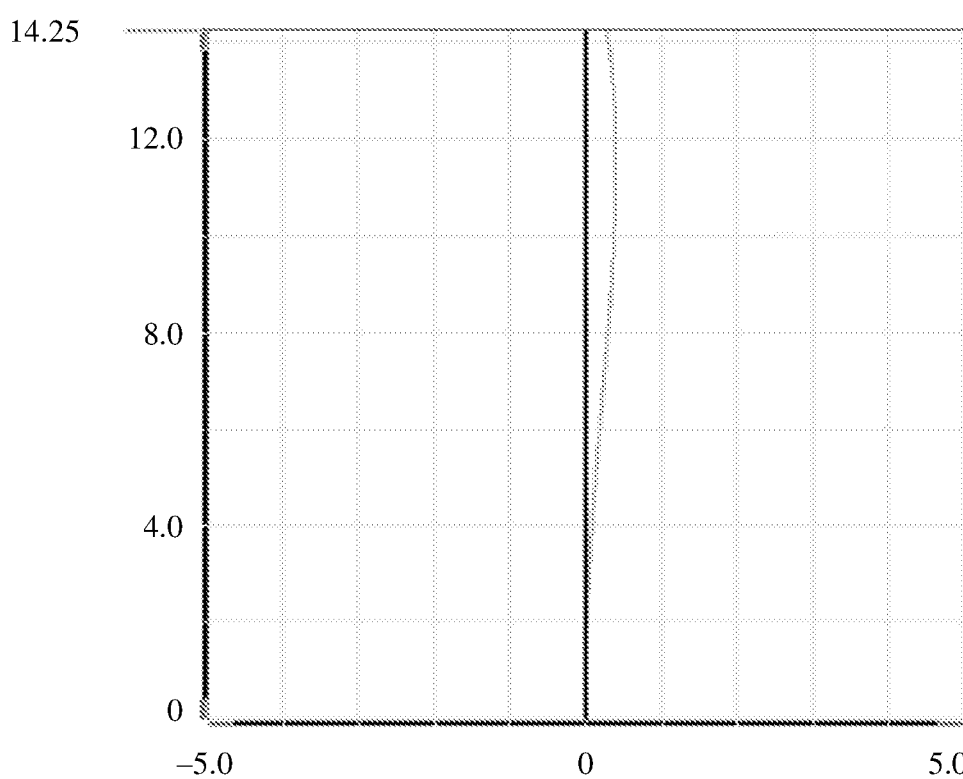
FIG. 14 is a distortion diagram of light with a wavelength of 555 nm passing through the optical lens in the second implementation of this application.

Refer to FIG. 12, FIG. 13, and FIG. 14. FIG. 12 is a diagram of transverse spherical aberration curves of light with wavelengths of 656 nm, 587 nm, and 486 nm passing through the optical lens 10 in the second implementation. In FIG. 12, a vertical coordinate represents an actual image height, in millimeters; and a horizontal coordinate represents chromatic aberration in a transverse direction, in millimeters. FIG. 13 is a diagram of an astigmatism field curvature of light with a wavelength of 555 nm passing through the optical lens 10 in the second implementation. In FIG. 13, a vertical coordinate represents a field of view angle, in degrees (°); and a horizontal coordinate represents an astigmatism field curvature of the optical lens 10, in millimeters (mm). A solid line represents a field curvature of light with a center wavelength (555 nm) on a meridian image plane. A dashed line represents a field curvature of light with a center wavelength (555 nm) on a sagittal image plane. FIG. 14 is a distortion diagram of light with a wavelength of 555 nm passing through the optical lens 10 in the second implementation. In FIG. 14, a vertical coordinate represents a field of view angle, in degrees (°); and a horizontal coordinate represents distortion of the light with a wavelength of 555 nm passing through the optical lens 10 in the second implementation, in %. It can be learned from FIG. 12 that in this implementation, the transverse spherical aberration of the light with different wavelengths passing through the optical lens 10 in this implementation is also controlled within a small range. It can be learned from FIG. 13 that after the light passes through the optical lens 10 in this implementation, astigmatism field curvatures in a sagittal direction and a meridian direction are small. In other words, an astigmatism field curvature of imaging of the optical lens 10 in this implementation are small. It can be learned from FIG. 14 that distortion of the light passing through the optical lens 10 in this implementation is small. In other words, imaging distortion of the optical lens 10 in this implementation is small. Therefore, in this implementation, the transverse spherical aberration, astigmatism field curvature, distortion, and the like of the light passing through the optical lens 10 in this implementation are small. In other words, the optical lens 10 in this implementation can achieve a good imaging effect.

Figure 15A:
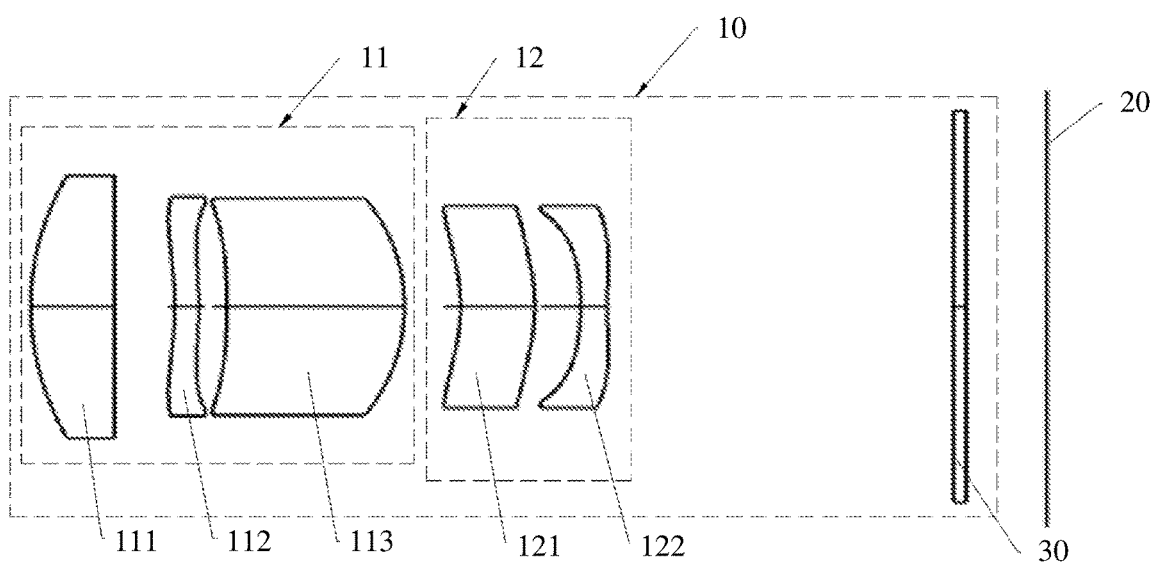
FIG. 15*a* is a schematic diagram of a structure of an optical lens in a third implementation of this application during telephoto shooting.
Figure 15B:
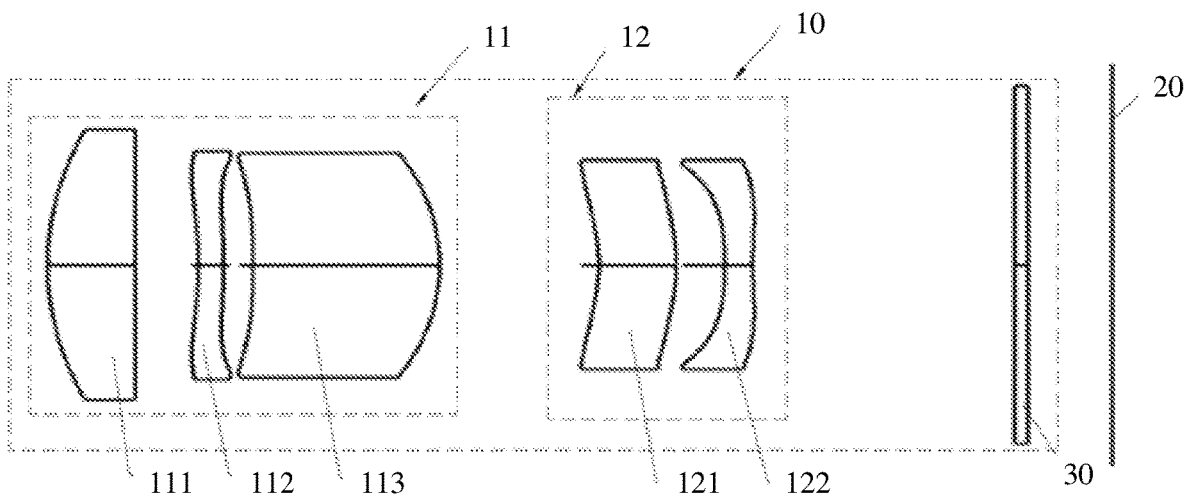
FIG. 15*b* is a schematic diagram of a structure of the optical lens in the third implementation of this application during macro shooting.

Refer to FIG. 15a and FIG. 15b. FIG. 15a is a schematic diagram of a structure of an optical lens 10 in a third implementation of this application during telephoto shooting. FIG. 15b is a schematic diagram of a structure of an optical lens 10 in the third implementation of this application during macro shooting. In this implementation, the optical lens 10 includes a first lens element group 11 and a second lens element group 12 that are sequentially arranged from an object side to an image side. The first lens element group 11 has three lens elements: a first lens element 111, a second lens element 112, and a third lens element 113. The first lens element 111, the second lens element 112, and the third lens element 113 are sequentially arranged from the object side to the image side. The second lens element group 12 has two lens elements: a first lens element 121 and a second lens element 122. The first lens element 121 and the second lens element 122 are sequentially arranged from the object side to the image side. In this implementation, the first lens element 111, the second lens element 112, the third lens element 113, the first lens element 121, and the second lens element 122 are coaxially disposed. In this implementation, an axial direction of the first lens element group 11 is an optical axis direction of the first lens element 111, the second lens element 112, and the third lens element 113. An axial direction of the second lens element group 12 is an optical axis direction of the first lens element 121 and the second lens element 122. The first lens element group 11 and the second lens element group 12 are coaxial.

The first lens element group 11 has positive optical power, and the second lens element group 12 has negative optical power. In the first lens element group 11, the first lens element 111 has positive optical power, the second lens element 112 has negative optical power, and the third lens element 113 has positive optical power. In the second lens element group 12, the first lens element 121 has positive optical power, and the second lens element 122 has negative optical power. The first lens element 121 in the second lens element group 12 is a meniscus lens element, and an image side surface of the first lens element 121 is a convex surface.

In this implementation, the first lens element 111 in the first lens element group 11 is a glass lens element. Both an object side surface and the image side surface of the first lens element 111 in the first lens element group 11 are spherical surfaces. Object side surfaces and image side surfaces of the second lens element 112 and the third lens element 113 are high-order aspheric surfaces. Object side surfaces and image side surfaces of the first lens element 121 and the second lens element 122 in the second lens element group 12 are high-order aspheric surfaces. Based on the foregoing relations that the optical lens 10 in this application meets, design parameters of the optical lens 10 in the third implementation of this application are shown in Table 7.

TABLE 7

| Surface number | Surface type | Curvature radius (mm) | Thickness d1 (mm) | Thickness d2 (mm) | Material refractive index | Material Abbe number |
|---|---|---|---|---|---|---|
| S11 | Spherical surface | 6.361 | 1.415 | 1.415 | 1.62 | 63.9 |
| S12 | Spherical surface | Infinity | 1.022 | 1.022 | | |
| S13 | Aspheric surface | −7.270 | 0.404 | 0.404 | 1.66 | 20.4 |
| S14 | Aspheric surface | −12.706 | 0.482 | 0.482 | | |
| S15 | Aspheric surface | −14.392 | 3.016 | 3.016 | 1.54 | 55.9 |
| S16 | Aspheric surface | −4.282 | 0.950 | 2.030 | | |
| S21 | Aspheric surface | −4.052 | 1.255 | 1.255 | 1.66 | 20.4 |
| S22 | Aspheric surface | −4.191 | 0.785 | 0.785 | | |
| S23 | Aspheric surface | −7.547 | 0.449 | 0.449 | 1.54 | 55.9 |
| S24 | Aspheric surface | 9.822 | 5.870 | 4.790 | | |
| S31 | Spherical surface | Infinity | 0.210 | 0.210 | 1.52 | 64.2 |
| S32 | Spherical surface | Infinity | 1.372 | 1.372 | | |

Table 8 shows design parameters of aspheric lens elements of the optical lens 10 in this implementation. In this implementation, the second lens element 112 and the third lens element 113 in the first lens element group 11, and the first lens element 121 and the second lens element 122 in the second lens element group 12 are all aspheric lens elements.

TABLE 8

Design parameters of the aspheric lens elements of
the optical lens 10 in the third implementation

| | S13 | | S14 | | S15 | | S16 |
|---|---|---|---|---|---|---|---|
| K | 0.0000E+00 | K | 0.0000E+00 | K | 0.0000E+00 | K | 0.0000E+00 |
| $A_2$ | 0.0000E+00 | $A_2$ | 0.0000E+00 | $A_2$ | 0.0000E+00 | $A_2$ | 0.0000E+00 |
| $A_4$ | 1.3673E−02 | $A_4$ | 1.3544E−02 | $A_4$ | −4.2509E−03 | $A_4$ | −1.1762E−03 |
| $A_6$ | −1.4928E−03 | $A_6$ | −1.4123E−03 | $A_6$ | −6.0131E−04 | $A_6$ | 8.2015E−05 |
| $A_8$ | 3.1974E−04 | $A_8$ | 3.6920E−04 | $A_8$ | 1.8802E−04 | $A_8$ | −1.1085E−05 |
| $A_{10}$ | −2.5592E−05 | $A_{10}$ | −8.4843E−06 | $A_{10}$ | −1.0006E−05 | $A_{10}$ | −8.2336E−07 |
| $A_{12}$ | 0.0000E+00 | $A_{12}$ | 0.0000E+00 | $A_{12}$ | 0.0000E+00 | $A_{12}$ | 0.0000E+00 |

| | S21 | | S22 | | S23 | | S24 |
|---|---|---|---|---|---|---|---|
| K | 0.0000E+00 | K | 0.0000E+00 | K | 0.0000E+00 | K | 0.0000E+00 |
| $A_2$ | 0.0000E+00 | $A_2$ | 0.0000E+00 | $A_2$ | 0.0000E+00 | $A_2$ | 0.0000E+00 |
| $A_4$ | 2.0425E−02 | $A_4$ | 2.1541E−02 | $A_4$ | −2.8427E−02 | $A_4$ | −3.8078E−02 |
| $A_6$ | −2.0110E−03 | $A_6$ | −3.0782E−03 | $A_6$ | 1.9818E−03 | $A_6$ | 8.7995E−03 |
| $A_8$ | 4.2352E−04 | $A_8$ | 8.4939E−04 | $A_8$ | 6.1617E−04 | $A_8$ | −1.9050E−03 |
| $A_{10}$ | −1.0909E−04 | $A_{10}$ | −2.6779E−04 | $A_{10}$ | −5.5444E−04 | $A_{10}$ | 2.3169E−04 |
| $A_{12}$ | 1.2406E−05 | $A_{12}$ | 2.8607E−05 | $A_{12}$ | 7.7395E−05 | $A_{12}$ | −1.0164E−05 |

The foregoing parameters are substituted into the following formula:

$$z(x, y) = \frac{cr^2}{1 + \sqrt{1 - Kc^2 r^2}} + \sum_{i=1}^{N} \alpha_i \rho^i$$

The second lens element 112 and the third lens element 113 in the first lens element group 11, and the first lens element 121 and the second lens element 122 in the second lens element group 12 can be designed. In this implementation:

$$\sum_{i=1}^{N} \alpha_i \rho^i = A_2 r^2 + A_4 r^4 + A_6 r^6 + A_8 r^8 + A_{10} r^{10} + A_{12} r^{12}$$

The optical lens 10 in this implementation is obtained based on the design parameters of the foregoing lens elements. Basic parameters of the optical lens 10 in this implementation are shown in Table 9.

TABLE 9

Basic parameters of the optical lens 10 in the third implementation

| Parameter | Value | Parameter | Value |
|---|---|---|---|
| f1 (mm) | 7.94 | f22 (mm) | −7.77 |
| f2 (mm) | −7.76 | f (mm) | 16.55 |
| f11 (mm) | 10.3 | F# (mm) | 3.1 |
| f12 (mm) | −26.48 | IH (mm) | 4 |

TABLE 9-continued

Basic parameters of the optical lens 10 in the third implementation

| Parameter | Value | Parameter | Value |
|---|---|---|---|
| f13 (mm) | 10.13 | β | 2.08 |
| f21 (mm) | −71.14 | $|1 - β^2|$ | 3.34 |
| TTL (mm) | 17.23 | | |

In this implementation, the total track length of the optical lens 10 is 17.23 mm. In this implementation, a distance d between an image side surface of a lens element closest to the second lens element group 12 in the first lens element group 11 and an object side surface of a lens element closest to the first lens element group 11 in the second lens element group 12 is a distance between the image side surface S16 of the third lens element 113 and the object side surface S21 of the first lens element 121. In this implementation, when the optical lens 10 is in the telephoto shooting state, the distance between the image side surface S16 of the third lens element 113 and the object side surface S21 of the first lens element 121 is 0.95 mm. When the optical lens 10 is in the macro shooting state, the distance between the image side surface S16 of the third lens element 113 and the object side surface S21 of the first lens element 121 is 2.03 mm.

In this implementation, a distance Δd for which the second lens element group 12 is movable relative to the first lens element group 11 is 1.08 mm. Application requirements in different scenarios of the optical lens 10 can be implemented through a short movement distance, and a requirement for a drive structure that drives the second lens element group 12 to move is low. A ratio of the distance Δd for which the second lens element group 12 is movable relative to the first lens element group 11 to the total track length TTL of the optical lens 10 is 0.144.

In this implementation, a ratio |f1/f2| of the focal length of the first lens element group 11 to the focal length of the second lens element group 12 of the optical lens 10 is 1.02. A ratio |f1/f| of the focal length of the first lens element group 11 of the optical lens 10 to the focal length of the optical lens 10 is 0.48. A ratio |f2/f| of the focal length of the second lens element group 12 of the optical lens 10 to the focal length of the optical lens 10 is 0.47. The focal lengths of the first lens element group 11 and the second lens element group 12 of the optical lens 10 can be properly allocated, so that the optical lens 10 can have a good imaging effect. The second lens element group 12 can cooperate with the first lens element group 11 to correct aberration of the optical lens 10, reduce distortion, and improve imaging quality of the optical lens 10.

In this implementation, a ratio |f11/f12| of the focal length of the first lens element 111 to the focal length of the second lens element 112 in the first lens element group 11 is 0.39. The focal lengths of the first lens element 111 and the second lens element 112 in the first lens element group 11 can be properly allocated, so that the optical lens 10 can have a good imaging effect. In addition, in this implementation, optical power of the first lens element 111 is less than optical power of the second lens element 112. That is, the first lens element 111 can have a good light convergence effect to converge more external light into the optical lens 10. This increases an amount of light incident to the optical lens 10, so that the optical lens 10 has a better imaging effect.

In this implementation, a ratio |f21/f2L| of the focal length of the first lens element 121 to a focal length of a lens element closest to the image side (namely, the second lens element 122) in the second lens element group 12 is 9.16.

The focal lengths of the first lens element 121 and the lens element closest to the image side in the second lens element group 12 can be properly allocated, so that the second lens element group 12 can have a good light adjustment effect, and the second lens element group 12 can achieve a good focal length adjustment effect, to move in an axial direction to achieve a good effect of adjusting the focal length of the optical lens 10. This ensures that the optical lens 10 can have a good shooting effect for different use requirements.

The focal length sensitivity $|1-β^2|$ of the second lens element group 12 is 3.34. The ratio β of the incident angle of the light on the second lens element group 12 to the emergent angle of the light is 2.08. In this implementation, the focal length and the light adjustment capability of the second lens element group 12 fall within an appropriate range. This can achieve a better focal length adjustment effect, so that the optical lens 10 can achieve a good imaging effect in different use scenarios.

Figure 16:
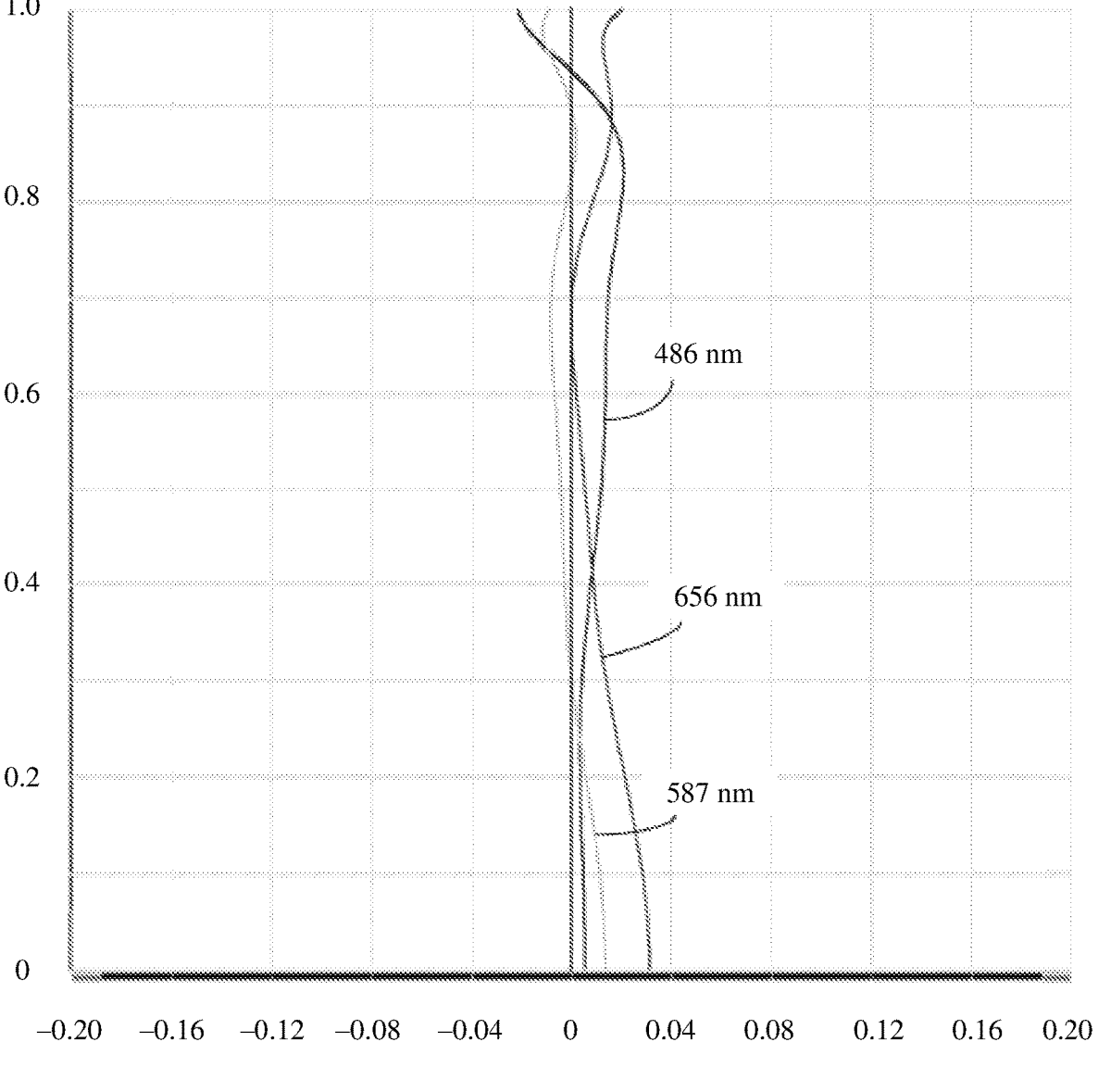
FIG. 16 is a diagram of transverse spherical aberration curves of light with wavelengths of 656 nm, 587 nm, and 486 nm passing through the optical lens in the third implementation of this application.
Figure 17:
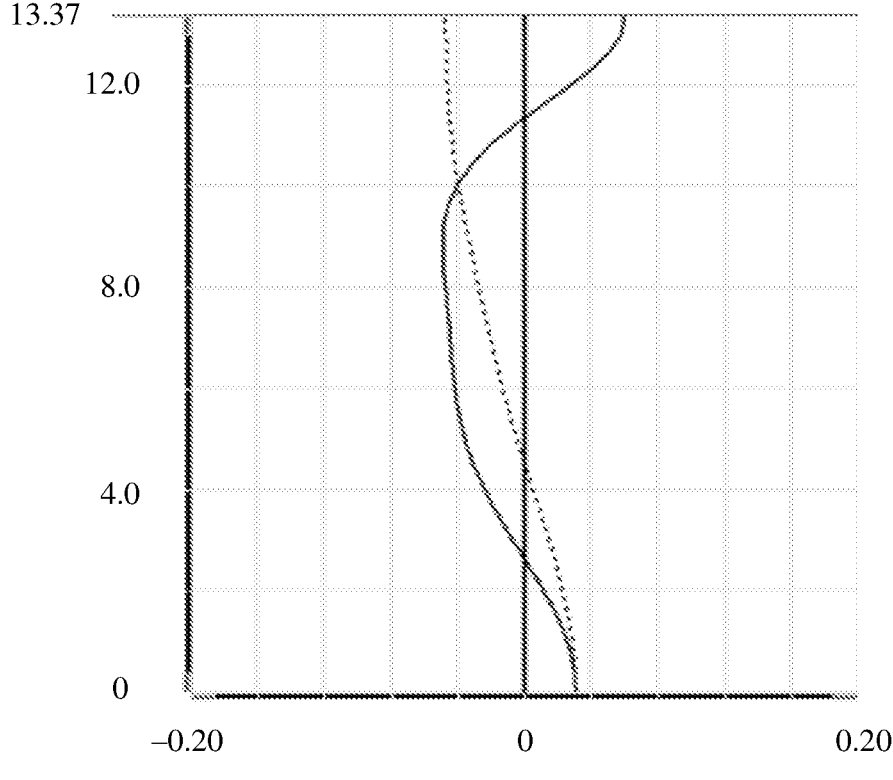
FIG. 17 is a diagram of an astigmatism field curvature of light with a wavelength of 555 nm passing through the optical lens in the third implementation of this application.
Figure 18:
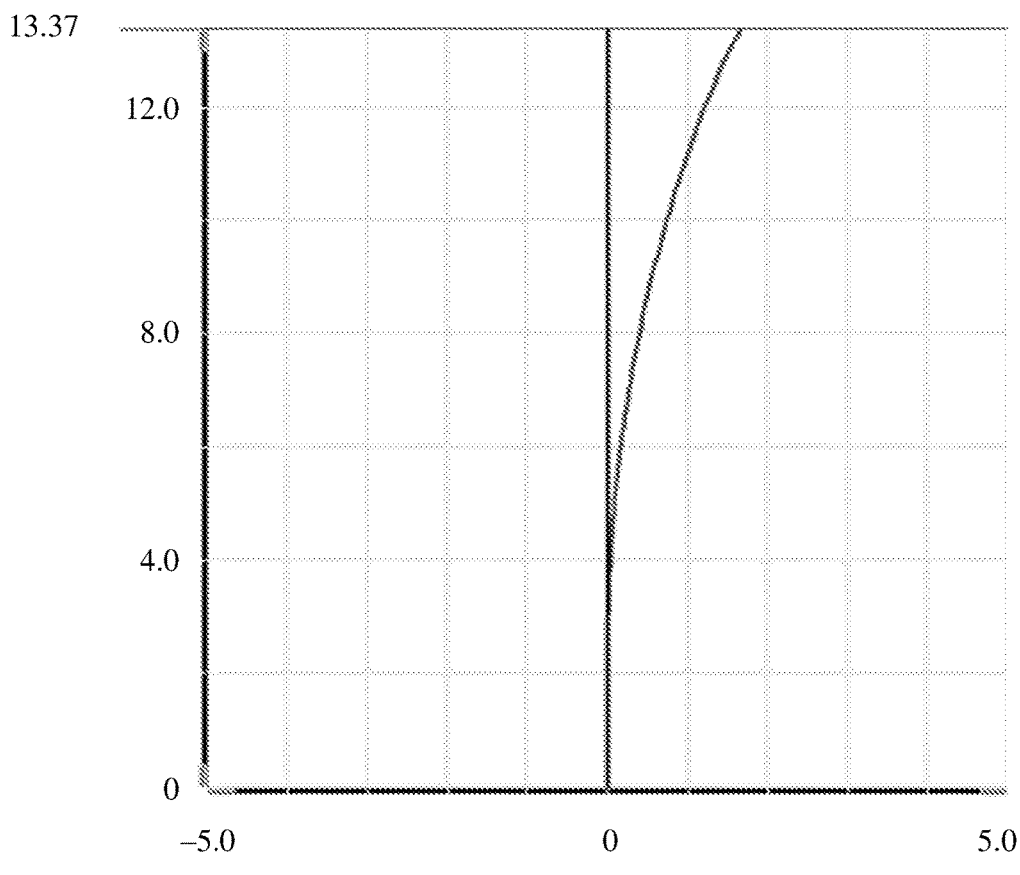
FIG. 18 is a distortion diagram of light with a wavelength of 555 nm passing through the optical lens in the third implementation of this application.

Refer to FIG. 16, FIG. 17, and FIG. 18. FIG. 16 is a diagram of transverse spherical aberration curves of light with wavelengths of 656 nm, 587 nm, and 486 nm passing through the optical lens 10 in the third implementation. In FIG. 16, a vertical coordinate represents an actual image height, in millimeters; and a horizontal coordinate represents chromatic aberration in a transverse direction, in millimeters. FIG. 17 is a diagram of an astigmatism field curvature of light with a wavelength of 555 nm passing through the optical lens 10 in the third implementation. In FIG. 17, a vertical coordinate represents a field of view angle, in degrees (°); and a horizontal coordinate represents an astigmatism field curvature of the optical lens 10, in millimeters (mm). A solid line represents a field curvature of light with a center wavelength (555 nm) on a meridian image plane. A dashed line represents a field curvature of light with a center wavelength (555 nm) on a sagittal image plane. FIG. 18 is a distortion diagram of light with a wavelength of 555 nm passing through the optical lens 10 in the third implementation. In FIG. 18, a vertical coordinate represents a field of view angle, in degrees (°); and a horizontal coordinate represents distortion of the light with a wavelength of 555 nm passing through the optical lens 10 in the third implementation, in %. It can be learned from FIG. 16 that in this implementation, the transverse spherical aberration after the light with different wavelengths passes through the optical lens 10 in this implementation is also controlled within a small range. It can be learned from FIG. 17 that after the light passes through the optical lens 10 in this implementation, astigmatism field curvatures in a sagittal direction and a meridian direction are small. In other words, an astigmatism field curvature of imaging of the optical lens 10 in this implementation are small. It can be learned from FIG. 18 that distortion of the light passing through the optical lens 10 in this implementation is small. In other words, imaging distortion of the optical lens 10 in this implementation is small. Therefore, in this implementation, the transverse spherical aberration, astigmatism field curvature, distortion, and the like of the light passing through the optical lens 10 in this implementation are small. In other words, the optical lens 10 in this implementation can achieve a good imaging effect.

Figure 19A:
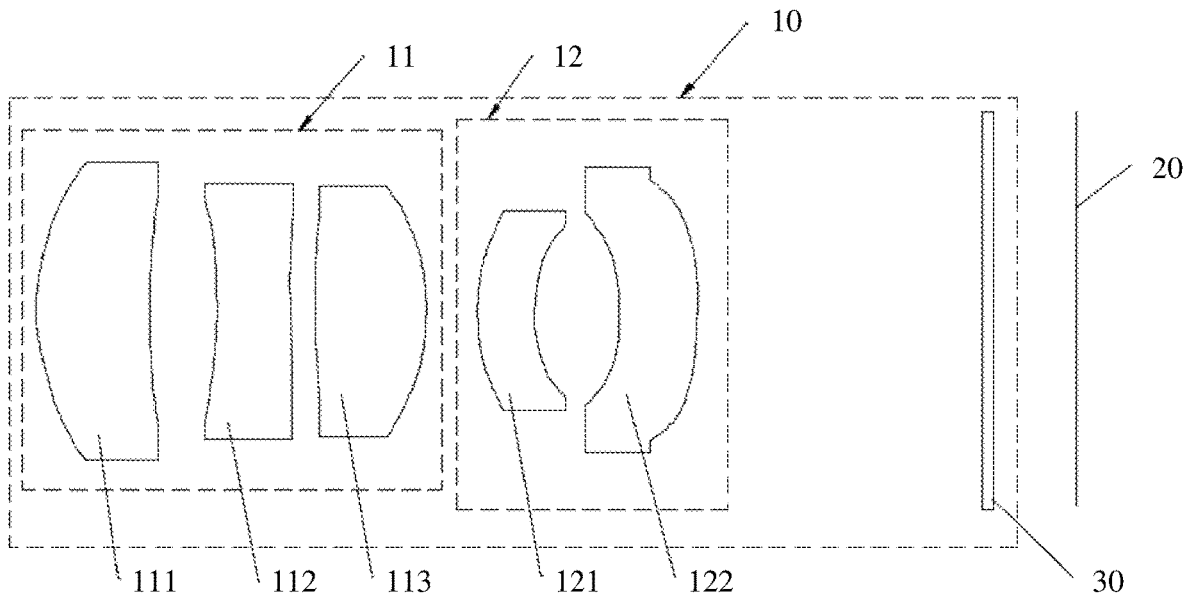
FIG. 19*a* is a schematic diagram of a structure of an optical lens in a fourth implementation of this application during telephoto shooting.
Figure 19B:
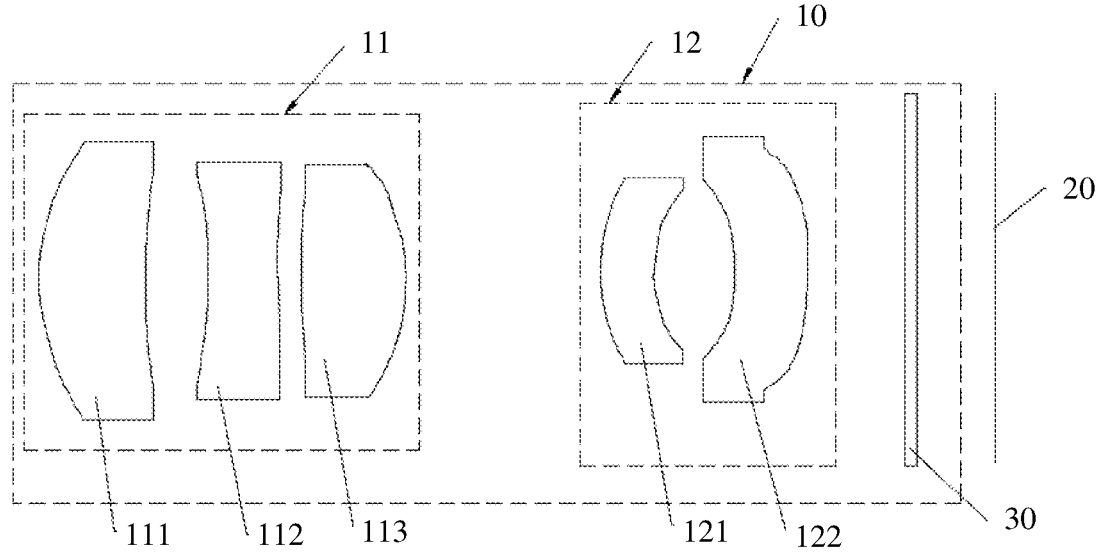
FIG. 19*b* is a schematic diagram of a structure of the optical lens in the fourth implementation of this application during macro shooting.

Refer to FIG. 19a and FIG. 19b. FIG. 19a is a schematic diagram of a structure of an optical lens 10 in a fourth implementation of this application during telephoto shooting. FIG. 19b is a schematic diagram of a structure of an optical lens 10 in the fourth implementation of this application during macro shooting. In this implementation, the optical lens 10 includes a first lens element group 11 and a second lens element group 12 that are sequentially arranged from an object side to an image side. The first lens element group 11 has three lens elements: a first lens element 111, a second lens element 112, and a third lens element 113. The first lens element 111, the second lens element 112, and the third lens element 113 are sequentially arranged from the object side to the image side. The second lens element group 12 has two lens elements: a first lens element 121 and a second lens element 122. The first lens element 121 and the second lens element 122 are sequentially arranged from the object side to the image side. In this implementation, the first lens element 111, the second lens element 112, the third lens element 113, the first lens element 121, and the second lens element 122 are coaxially disposed. In this implementation, an axial direction of the first lens element group 11 is an optical axis direction of the first lens element 111, the second lens element 112, and the third lens element 113. An axial direction of the second lens element group 12 is an optical axis direction of the first lens element 121 and the second lens element 122. The first lens element group 11 and the second lens element group 12 are coaxial.

The first lens element group 11 has positive optical power, and the second lens element group 12 has negative optical power. In the first lens element group 11, the first lens element 111 has positive optical power, the second lens element 112 has negative optical power, and the third lens element 113 has positive optical power. The first lens element 121 and the second lens element 122 in the second lens element group 12 both have negative optical power. The first lens element 121 in the second lens element group 12 is a meniscus lens element, and an image side surface of the first lens element 121 is a concave surface.

In this implementation, the first lens element 111 in the first lens element group 11 is a glass lens element. Both an object side surface and the image side surface of the first lens element 111 in the first lens element group 11 are spherical surfaces. Object side surfaces and image side surfaces of the second lens element 112 and the third lens element 113 are high-order aspheric surfaces. Object side surfaces and image side surfaces of the first lens element 121 and the second lens element 122 in the second lens element group 12 are high-order aspheric surfaces. Based on the foregoing relations that the optical lens 10 in this application meets, design parameters of the optical lens 10 in the fourth implementation of this application are shown in Table 10.

TABLE 10

| Surface number | Surface type | Curvature radius (mm) | Thickness d1 (mm) | Thickness d2 (mm) | Material refractive index | Material Abbe number |
|---|---|---|---|---|---|---|
| S11 | Spherical surface | 6.279 | 1.876 | 1.876 | 1.62 | 63.9 |
| S12 | Spherical surface | 26.550 | 1.100 | 1.100 | | |
| S13 | Aspheric surface | −14.375 | 1.231 | 1.231 | 1.64 | 23.5 |
| S14 | Aspheric surface | 27.357 | 0.410 | 0.410 | | |
| S15 | Aspheric surface | 14.350 | 1.851 | 1.851 | 1.54 | 55.9 |
| S16 | Aspheric surface | −5.647 | 0.880 | 3.361 | | |
| S21 | Aspheric surface | 7.611 | 0.912 | 0.912 | 1.54 | 55.9 |
| S22 | Aspheric surface | 4.037 | 1.441 | 1.441 | | |
| S23 | Aspheric surface | −4.623 | 1.300 | 1.300 | 1.54 | 55.9 |
| S24 | Aspheric surface | −9.727 | 4.709 | 2.228 | | |
| S31 | Spherical surface | Infinity | 0.210 | 0.210 | 1.52 | 64.2 |
| S32 | Spherical surface | Infinity | 1.380 | 1.380 | | |

Table 11 shows design parameters of aspheric lens elements of the optical lens 10 in this implementation. In this implementation, the second lens element 112 and the third lens element 113 in the first lens element group 11, and the first lens element 121 and the second lens element 122 in the second lens element group 12 are all aspheric lens elements.

TABLE 11

Design parameters of the aspheric lens elements of
the optical lens 10 in the fourth implementation

| | S13 | | S14 | | S15 | | S16 |
|---|---|---|---|---|---|---|---|
| K | 0.0000E+00 | K | 0.0000E+00 | K | 0.0000E+00 | K | 0.0000E+00 |
| $A_2$ | 0.0000E+00 | $A_2$ | 0.0000E+00 | $A_2$ | 0.0000E+00 | $A_2$ | 0.0000E+00 |
| $A_4$ | −1.4190E−03 | $A_4$ | −3.0223E−03 | $A_4$ | −5.0375E−03 | $A_4$ | −1.3843E−03 |
| $A_6$ | −2.7144E−03 | $A_6$ | −8.0688E−03 | $A_6$ | −2.6958E−03 | $A_6$ | 2.0099E−03 |
| $A_8$ | 6.0822E−03 | $A_8$ | 2.5084E−02 | $A_8$ | 6.0035E−03 | $A_8$ | −4.6125E−03 |
| $A_{10}$ | −8.5665E−03 | $A_{10}$ | −4.3017E−02 | $A_{10}$ | −6.8633E−03 | $A_{10}$ | 6.9812E−03 |
| $A_{12}$ | 8.7673E−03 | $A_{12}$ | 4.8815E−02 | $A_{12}$ | 5.4768E−03 | $A_{12}$ | −7.3468E−03 |
| $A_{14}$ | −6.5962E−03 | $A_{14}$ | −3.8407E−02 | $A_{14}$ | −3.3510E−03 | $A_{14}$ | 5.5041E−03 |
| $A_{16}$ | 3.6314E−03 | $A_{16}$ | 2.1477E−02 | $A_{16}$ | 1.6335E−03 | $A_{16}$ | −2.9882E−03 |
| $A_{18}$ | −1.4553E−03 | $A_{18}$ | −8.6441E−03 | $A_{18}$ | −6.3183E−04 | $A_{18}$ | 1.1865E−03 |
| $A_{20}$ | 4.2166E−04 | $A_{20}$ | 2.5091E−03 | $A_{20}$ | 1.8815E−04 | $A_{20}$ | −3.4452E−04 |
| $A_{22}$ | −8.7127E−05 | $A_{22}$ | −5.2020E−04 | $A_{22}$ | −4.1480E−05 | $A_{22}$ | 7.2285E−05 |
| $A_{24}$ | 1.2498E−05 | $A_{24}$ | 7.5100E−05 | $A_{24}$ | 6.4709E−06 | $A_{24}$ | −1.0660E−05 |
| $A_{26}$ | −1.1814E−06 | $A_{26}$ | −7.1701E−06 | $A_{26}$ | −6.7089E−07 | $A_{26}$ | 1.0468E−06 |

TABLE 11-continued

Design parameters of the aspheric lens elements of
the optical lens 10 in the fourth implementation

| $A_{28}$ | 6.6152E−08 | $A_{28}$ | 4.0687E−07 | $A_{28}$ | 4.1308E−08 | $A_{28}$ | −6.1383E−08 |
|---|---|---|---|---|---|---|---|
| $A_{30}$ | −1.6615E−09 | $A_{30}$ | −1.0389E−08 | $A_{30}$ | −1.1405E−09 | $A_{30}$ | 1.6242E−09 |

| | S21 | | S22 | | S23 | | S24 |
|---|---|---|---|---|---|---|---|
| K | 0.0000E+00 | K | 0.0000E+00 | K | 0.0000E+00 | K | 0.0000E+00 |
| $A_2$ | 0.0000E+00 | $A_2$ | 0.0000E+00 | $A_2$ | 0.0000E+00 | $A_2$ | 0.0000E+00 |
| $A_4$ | 4.0429E−03 | $A_4$ | 1.0524E−02 | $A_4$ | −5.1965E−04 | $A_4$ | −3.6144E−03 |
| $A_6$ | 1.7369E−02 | $A_6$ | −8.0056E−03 | $A_6$ | −7.7822E−03 | $A_6$ | −5.2482E−03 |
| $A_8$ | −6.0733E−02 | $A_8$ | 5.4516E−02 | $A_8$ | 3.5680E−02 | $A_8$ | 7.7779E−03 |
| $A_{10}$ | 1.3053E−01 | $A_{10}$ | −1.8986E−01 | $A_{10}$ | −1.1094E−01 | $A_{10}$ | −7.7837E−03 |
| $A_{12}$ | −1.8298E−01 | $A_{12}$ | 4.0892E−01 | $A_{12}$ | 2.2250E−01 | $A_{12}$ | 5.0354E−03 |
| $A_{14}$ | 1.7270E−01 | $A_{14}$ | −5.8366E−01 | $A_{14}$ | −2.9867E−01 | $A_{14}$ | −2.0702E−03 |
| $A_{16}$ | −1.1076E−01 | $A_{16}$ | 5.7531E−01 | $A_{16}$ | 2.7703E−01 | $A_{16}$ | 4.8113E−04 |
| $A_{18}$ | 4.7471E−02 | $A_{18}$ | −4.0024E−01 | $A_{18}$ | −1.8104E−01 | $A_{18}$ | −2.1271E−05 |
| $A_{20}$ | −1.2705E−02 | $A_{20}$ | 1.9791E−01 | $A_{20}$ | 8.3919E−02 | $A_{20}$ | −2.4662E−05 |
| $A_{22}$ | 1.6166E−03 | $A_{22}$ | −6.9060E−02 | $A_{22}$ | −2.7413E−02 | $A_{22}$ | 8.8576E−06 |
| $A_{24}$ | 1.2545E−04 | $A_{24}$ | 1.6593E−02 | $A_{24}$ | 6.1646E−03 | $A_{24}$ | −1.5655E−06 |
| $A_{26}$ | −8.1780E−05 | $A_{26}$ | −2.6062E−03 | $A_{26}$ | −9.0752E−04 | $A_{26}$ | 1.6088E−07 |
| $A_{28}$ | 1.2023E−05 | $A_{28}$ | 2.4019E−04 | $A_{28}$ | 7.8673E−05 | $A_{28}$ | −9.1908E−09 |
| $A_{30}$ | −6.3999E−07 | $A_{30}$ | −9.8128E−06 | $A_{30}$ | −3.0422E−06 | $A_{30}$ | 2.2684E−10 |

The foregoing parameters are substituted into the following formula:

$$z(x, y) = \frac{cr^2}{1 + \sqrt{1 - Kc^2r^2}} + \sum_{i=1}^{N} \alpha_i \rho^i$$

The second lens element 112 and the third lens element 113 in the first lens element group 11, and the first lens element 121 and the second lens element 122 in the second lens element group 12 can be designed. In this implementation:

$$\sum_{i=1}^{N} \alpha_i \rho^i = A_4 r^4 + A_6 r^6 + \dots + A_{28} r^{28} + A_{30} r^{30}$$

The optical lens 10 in this implementation is obtained based on the design parameters of the foregoing lens elements. Basic parameters of the optical lens 10 in this implementation are shown in Table 12.

TABLE 12

Basic parameters of the optical lens
10 in the fourth implementation

| Parameter | Value | Parameter | Value |
|---|---|---|---|
| f1 (mm) | 8.68 | f22 (mm) | −17.72 |
| f2 (mm) | −8.78 | f (mm) | 16.50 |
| f11 (mm) | 14.4 | F# (mm) | 3 |
| f12 (mm) | −14.45 | IH (mm) | 4 |
| f13 (mm) | 7.67 | β | 1.90 |
| f21 (mm) | −17.29 | |1 − β^2| | 2.61 |
| TTL (mm) | 17.23 | | |

In this implementation, the total track length of the optical lens 10 is 17.23 mm. In this implementation, a distance d between an image side surface of a lens element closest to the second lens element group 12 in the first lens element group 11 and an object side surface of a lens element closest to the first lens element group 11 in the second lens element group 12 is a distance between the image side surface S16 of the third lens element 113 and the object side surface S21 of the first lens element 121. In this implementation, when the optical lens 10 is in the telephoto shooting state, the distance between the image side surface S16 of the third lens element 113 and the object side surface S21 of the first lens element 121 is 0.88 mm. When the optical lens 10 is in the macro shooting state, the distance between the image side surface S16 of the third lens element 113 and the object side surface S21 of the first lens element 121 is 3.361 mm.

In this implementation, a distance Δd for which the second lens element group 12 is movable relative to the first lens element group 11 is 2.48 mm. Application requirements in different scenarios of the optical lens 10 can be implemented through a short movement distance, and a requirement for a drive structure that drives the second lens element group 12 to move is low. A ratio of the distance Δd for which the second lens element group 12 is movable relative to the first lens element group 11 to the total track length TTL of the optical lens 10 is 0.144.

In this implementation, a ratio |f1/f2| of the focal length of the first lens element group 11 to the focal length of the second lens element group 12 of the optical lens 10 is 0.99. A ratio |f1/f| of the focal length of the first lens element group 11 of the optical lens 10 to the focal length of the optical lens 10 is 0.53. A ratio |f2/f| of the focal length of the second lens element group 12 of the optical lens 10 to the focal length of the optical lens 10 is 0.53. The focal lengths of the first lens element group 11 and the second lens element group 12 of the optical lens 10 can be properly allocated, so that the optical lens 10 can have a good imaging effect. The second lens element group 12 can cooperate with the first lens element group 11 to correct aberration of the optical lens 10, reduce distortion, and improve imaging quality of the optical lens 10. In addition, in this implementation, an absolute value |f1/f2| of the ratio of the focal length of the first lens element group 11 to the focal length of the second lens element group 12 is less than 1. That is, a refraction capability of the first lens element group 11 is stronger than that of the second lens element group 12. The first lens element group 11 has a stronger light adjustment capability. A light adjustment effect of the second lens element group 12 is small. Therefore, a difference between light adjustment effects of the optical lens 10 when the second lens element group 12 moves between different positions is reduced, to ensure that the imaging effect of the optical lens 10 can be always good when the second lens element group 12 is moved to adjust the focal length of the optical lens 10 to implement telephoto shooting and macro shooting.

In this implementation, a ratio |f11/f12| of the focal length of the first lens element 111 to the focal length of the second lens element 112 in the first lens element group 11 is 0.99. The focal lengths of the first lens element 111 and the second lens element 112 in the first lens element group 11 can be properly allocated, so that the optical lens 10 can have a good imaging effect. In addition, in this implementation, optical power of the first lens element 111 is less than optical power of the second lens element 112. That is, the first lens element 111 can have a good light convergence effect to converge more external light into the optical lens 10. This increases an amount of light incident to the optical lens 10, so that the optical lens 10 has a better imaging effect.

In this implementation, a ratio |f21/f2L| of the focal length of the first lens element 121 to a focal length of a lens element closest to the image side (namely, the second lens element 122) in the second lens element group 12 is 0.98. The focal lengths of the first lens element 121 and the lens element closest to the image side (namely, the second lens element 122) in the second lens element group 12 can be properly allocated, so that the second lens element group 12 can have a good light adjustment effect, and the second lens element group 12 can achieve a good focal length adjustment effect, to move in an axial direction to achieve a good effect of adjusting the focal length of the optical lens 10. This ensures that the optical lens 10 can have a good shooting effect for different use requirements. In addition, in this implementation, an absolute value of the focal length of the first lens element 121 is less than an absolute value of the focal length of the lens element closest to the image side (namely, the second lens element 122) in the second lens element group 12. That is, the first lens element 121 in the second lens element group 12 has a high refraction degree. Therefore, during movement of the second lens element group 12 in the axial direction, light incident to the first lens element group 11 and transmitted to the second lens element group 12 can be adjusted as soon as possible after passing through the first lens element 121. This ensures that a good light adjustment effect is achieved in different use scenarios through as few lens elements as possible, to ensure that the optical lens 10 can have a good imaging effect in different use scenarios.

The focal length sensitivity |1−β^2| of the second lens element group 12 is 2.61. The ratio β of the incident angle of the light on the second lens element group 12 to the emergent angle of the light is 1.90. In this implementation, the focal length and the light adjustment capability of the second lens element group 12 fall within an appropriate range. This can achieve a better focal length adjustment effect, so that the optical lens 10 can achieve a good imaging effect in different use scenarios.

Figure 20:
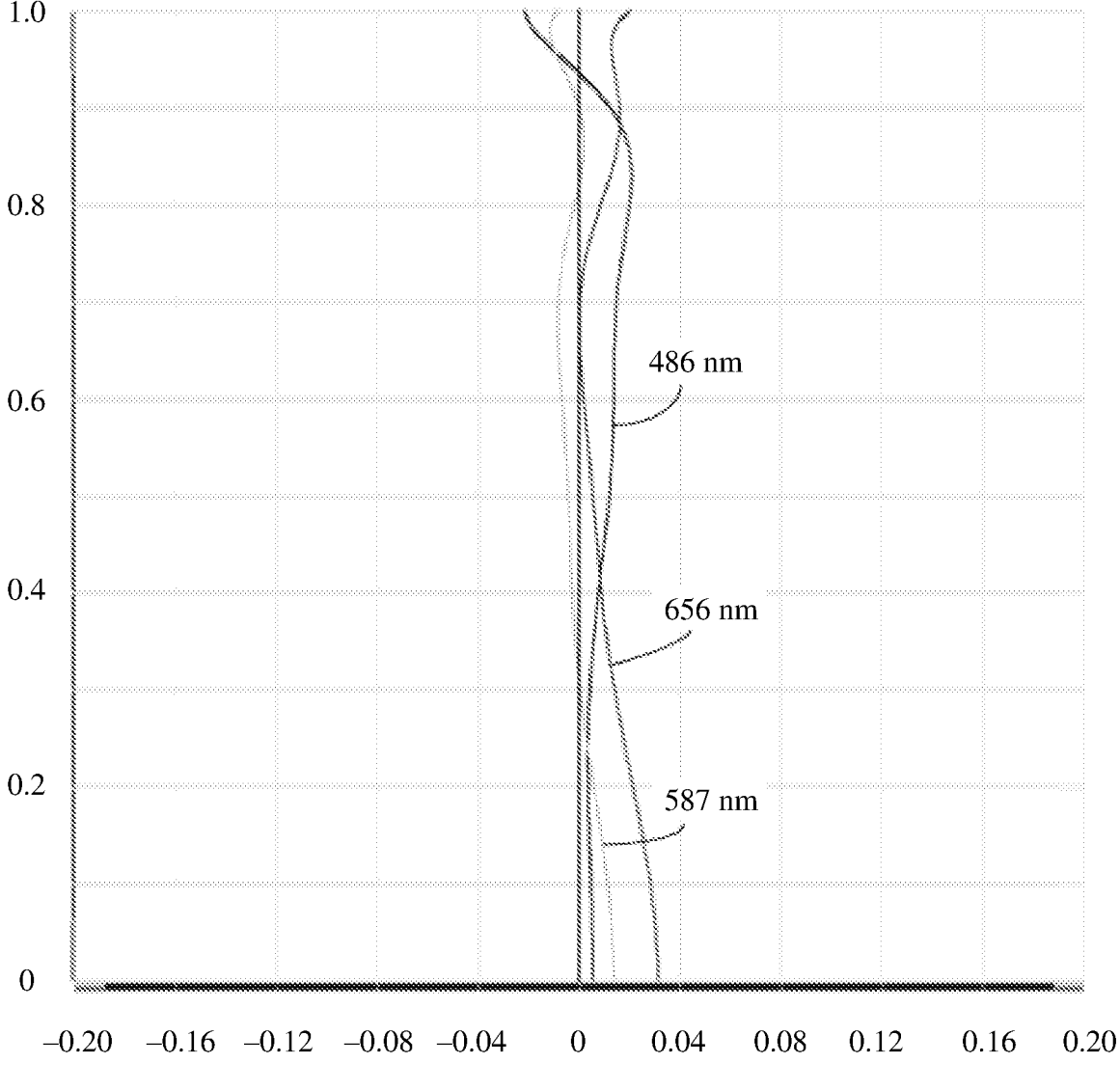
FIG. 20 is a diagram of transverse spherical aberration curves of light with wavelengths of 656 nm, 587 nm, and 486 nm passing through the optical lens in the fourth implementation of this application.
Figure 21:
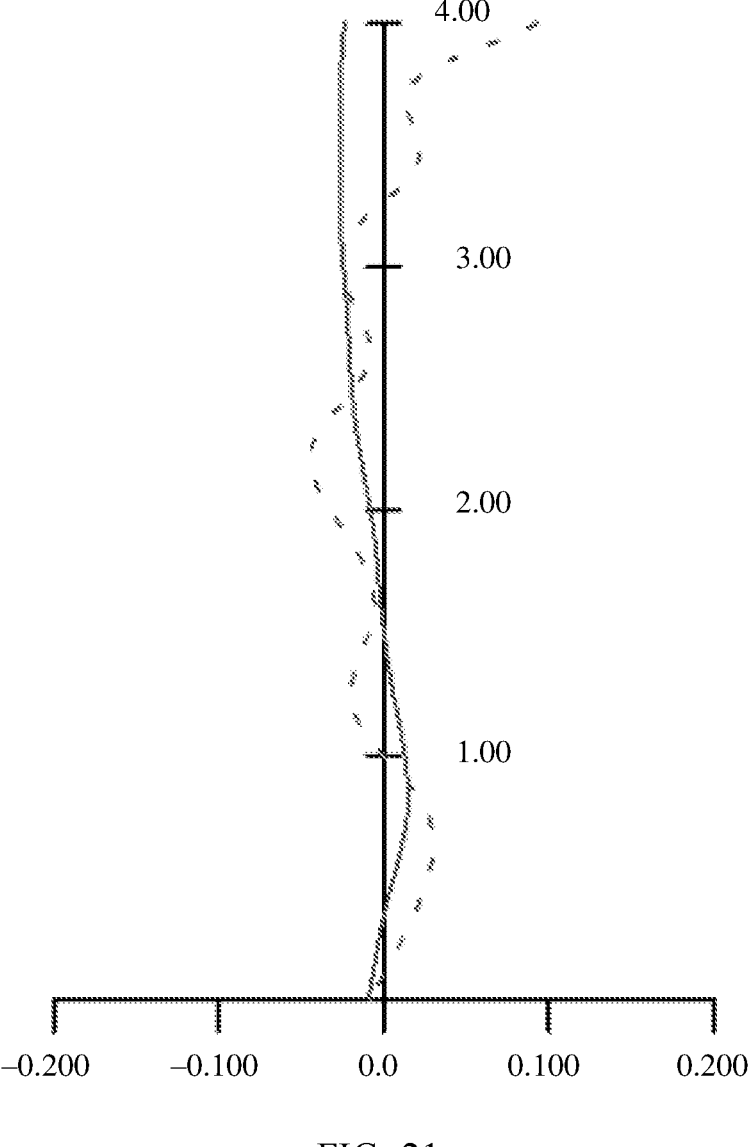
FIG. 21 is a diagram of an astigmatism field curvature of light with a wavelength of 555 nm passing through the optical lens in the fourth implementation of this application.
Figure 22:
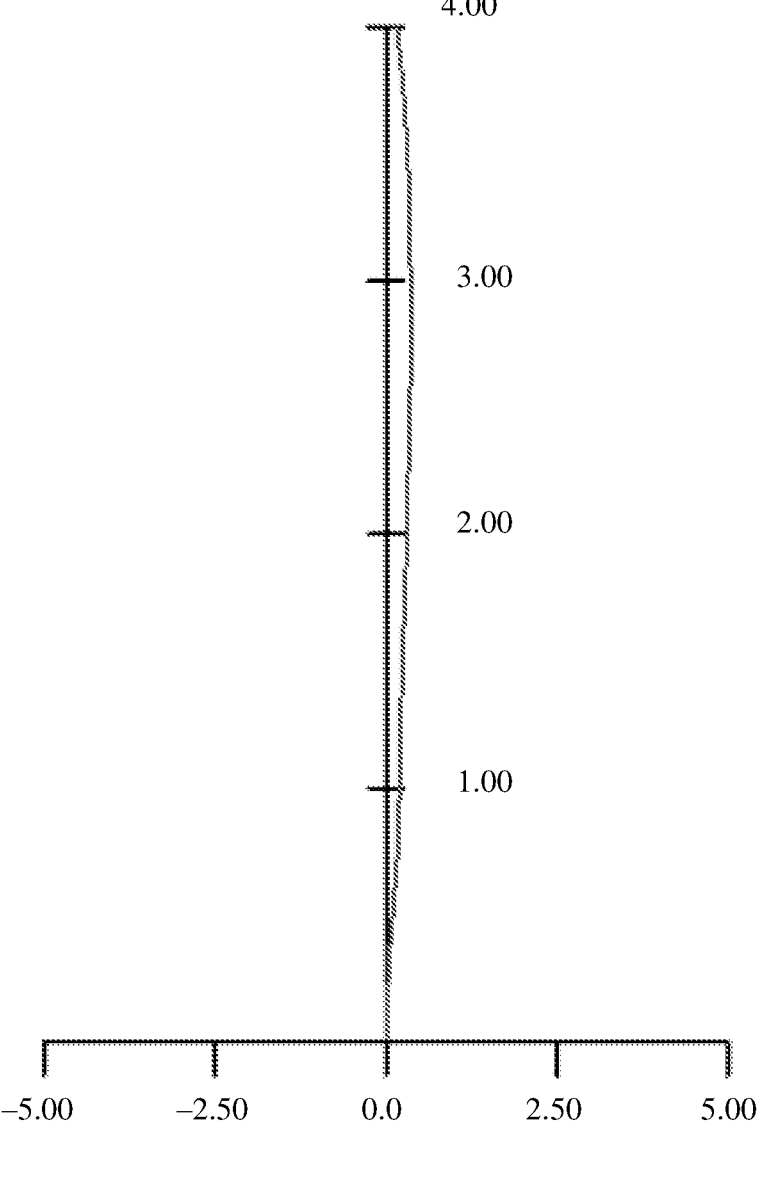
FIG. 22 is a distortion diagram of light with a wavelength of 555 nm passing through the optical lens in the fourth implementation of this application.

Refer to FIG. 20, FIG. 21, and FIG. 22. FIG. 20 is a diagram of transverse spherical aberration curves of light with wavelengths of 656 nm, 587 nm, and 486 nm passing through the optical lens 10 in the fourth implementation. In FIG. 20, a vertical coordinate represents an actual image height, in millimeters; and a horizontal coordinate represents chromatic aberration in a transverse direction, in millimeters. FIG. 21 is a diagram of an astigmatism field curvature of light with a wavelength of 555 nm passing through the optical lens 10 in the fourth implementation. In FIG. 21, a vertical coordinate represents a field of view angle, in degrees (°); and a horizontal coordinate represents an astigmatism field curvature of the optical lens 10, in millimeters (mm). A solid line represents a field curvature of light with a center wavelength (555 nm) on a meridian image plane. A dashed line represents a field curvature of light with a center wavelength (555 nm) on a sagittal image plane. FIG. 22 is a distortion diagram of light with a wavelength of 555 nm passing through the optical lens 10 in the fourth implementation. In FIG. 22, a vertical coordinate represents a field of view angle, in degrees (°); and a horizontal coordinate represents distortion of the light with a wavelength of 555 nm passing through the optical lens 10 in the fourth implementation, in %. It can be learned from FIG. 20 that in this implementation, the transverse spherical aberration after the light with different wavelengths passes through the optical lens 10 in this implementation is also controlled within a small range. It can be learned from FIG. 21 that after the light passes through the optical lens 10 in this implementation, astigmatism field curvatures in a sagittal direction and a meridian direction are small. In other words, an astigmatism field curvature of imaging of the optical lens 10 in this implementation are small. It can be learned from FIG. 22 that distortion of the light passing through the optical lens 10 in this implementation is small. In other words, imaging distortion of the optical lens 10 in this implementation is small. Therefore, in this implementation, the transverse spherical aberration, astigmatism field curvature, distortion, and the like of the light passing through the optical lens 10 in this implementation are small. In other words, the optical lens 10 in this implementation can achieve a good imaging effect.

Figure 23A:
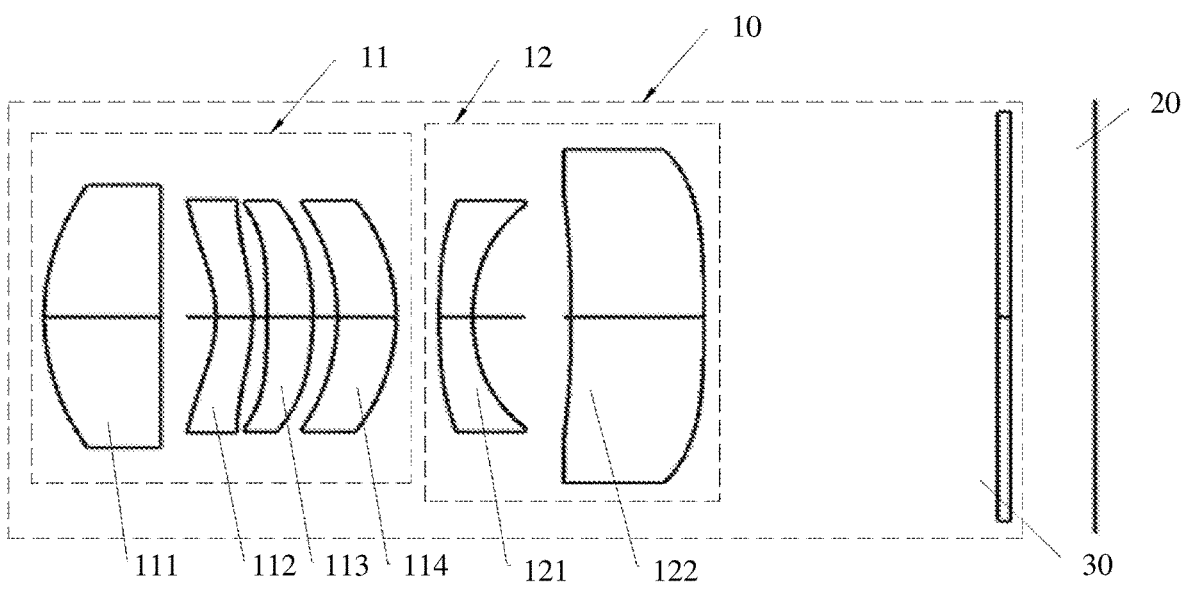
FIG. 23*a* is a schematic diagram of a structure of an optical lens in a fifth implementation of this application during telephoto shooting.
Figure 23B:
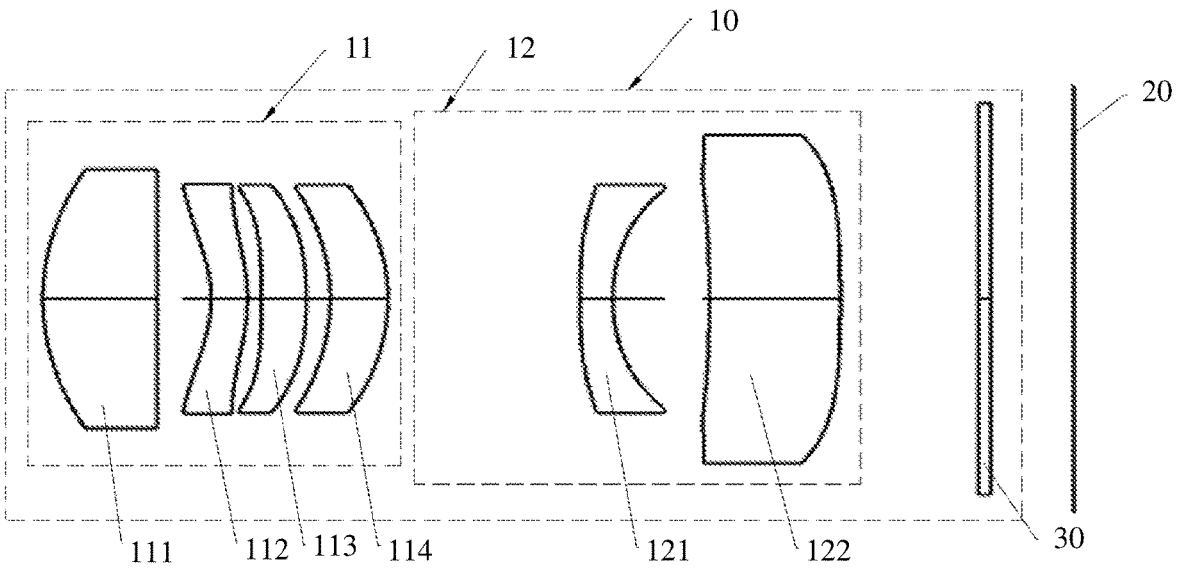
FIG. 23*b* is a schematic diagram of a structure of the optical lens in the fifth implementation of this application during macro shooting.

Refer to FIG. 23a and FIG. 23b. FIG. 23a is a schematic diagram of a structure of an optical lens 10 in a fifth implementation of this application during telephoto shooting. FIG. 23b is a schematic diagram of a structure of an optical lens 10 in the fifth implementation of this application during macro shooting. In this implementation, the optical lens 10 includes a first lens element group 11 and a second lens element group 12 that are sequentially arranged from an object side to an image side. The first lens element group 11 has four lens elements: a first lens element 111, a second lens element 112, a third lens element 113, and a fourth lens element 114. The first lens element 111, the second lens element 112, the third lens element 113, and the fourth lens element 114 are sequentially arranged from the object side to the image side. The second lens element group 12 has two lens elements: a first lens element 121 and a second lens element 122. The first lens element 121 and the second lens element 122 are sequentially arranged from the object side to the image side. In this implementation, the first lens element 111, the second lens element 112, the third lens element 113, the fourth lens element 114, the first lens element 121, and the second lens element 122 are coaxially disposed. In this implementation, an axial direction of the first lens element group 11 is an optical axis direction of the first lens element 111, the second lens element 112, the third lens element 113, and the fourth lens element 114. An axial direction of the second lens element group 12 is an optical axis direction of the first lens element 121 and the second lens element 122. The first lens element group 11 and the second lens element group 12 are coaxial.

The first lens element group 11 has positive optical power, and the second lens element group 12 has negative optical power. In the first lens element group 11, the first lens element 111 has positive optical power, the second lens element 112 has negative optical power, and the third lens element 113 and the fourth lens element 114 both have positive optical power. In the second lens element group 12, the first lens element 121 has negative optical power, and the second lens element 122 has positive optical power. The first lens element 121 in the second lens element group 12 is a meniscus lens element, and an image side surface of the first lens element 121 is a concave surface.

In this implementation, the first lens element 111 in the first lens element group 11 is a glass lens element. Both an object side surface and the image side surface of the first lens element 111 in the first lens element group 11 are spherical surfaces. Object side surfaces and image side surfaces of the second lens element 112 and the third lens element 113 are high-order aspheric surfaces. Object side surfaces and image side surfaces of the first lens element 121 and the second lens element 122 in the second lens element group 12 are high-order aspheric surfaces. Based on the foregoing relations that the optical lens 10 in this application meets, design parameters of the optical lens 10 in the fifth implementation of this application are shown in Table 13.

TABLE 13

Design parameters of the optical lens 10 in the fifth implementation

| Surface number | Surface type | Curvature radius (mm) | Thickness d1 (mm) | Thickness d2 (mm) | Material refractive index | Material Abbe number |
|---|---|---|---|---|---|---|
| S11 | Spherical surface | 5.599 | 1.900 | 6.600 | 1.62 | 63.9 |
| S12 | Spherical surface | Infinity | 0.900 | 0.850 | | |
| S13 | Aspheric surface | −3.123 | 0.600 | 0.000 | 1.66 | 20.4 |
| S14 | Aspheric surface | −4.506 | 0.230 | 1.900 | | |
| S15 | Aspheric surface | −126.212 | 0.760 | 0.900 | 1.54 | 55.9 |
| S16 | Aspheric surface | −8.462 | 0.400 | 0.600 | | |
| S17 | Spherical surface | −5.000 | 0.960 | 0.230 | 1.58 | 59.5 |
| S18 | Spherical surface | −4.654 | 0.700 | 0.760 | | |
| S21 | Aspheric surface | 20.630 | 0.550 | 0.400 | 1.54 | 55.9 |
| S22 | Aspheric surface | 4.591 | 1.600 | 0.960 | | |
| S23 | Aspheric surface | −60.971 | 2.180 | 3.200 | 1.54 | 55.9 |
| S24 | Aspheric surface | −61.439 | 4.800 | 0.550 | | |
| S31 | Spherical surface | Infinity | 0.210 | 0.210 | 1.52 | 64.17 |
| S32 | Spherical surface | Infinity | 1.380 | 1.380 | | |

S17 represents an object side surface of the fourth lens element 114. S18 represents an image side surface of the fourth lens element 114. It should be noted that meanings of S17, S18, and the like are the same in this application. When the symbols appear again subsequently, their meanings are not described again.

Table 14 shows design parameters of aspheric lens elements of the optical lens 10 in this implementation. In this implementation, the second lens element 112, the third lens element 113, and the fourth lens element 114 in the first lens element group 11, and the first lens element 121 and the second lens element 122 in the second lens element group 12 are all aspheric lens elements.

TABLE 14

Design parameters of the aspheric lens elements of the optical lens 10 in the fifth implementation

| | S13 | | S14 | | S15 | | S16 |
|---|---|---|---|---|---|---|---|
| K | 0.0000E+00 | K | 0.0000E+00 | K | 0.0000E+00 | K | 0.0000E+00 |
| $A_2$ | 0.0000E+00 | $A_2$ | 0.0000E+00 | $A_2$ | 0.0000E+00 | $A_2$ | 0.0000E+00 |
| $A_4$ | 2.7372E−02 | $A_4$ | 1.7646E−02 | $A_4$ | −1.4971E−02 | $A_4$ | −9.5175E−03 |
| $A_6$ | −2.3665E−03 | $A_6$ | −5.2546E−04 | $A_6$ | 1.0281E−03 | $A_6$ | 4.1025E−04 |
| $A_8$ | 1.9016E−04 | $A_8$ | −1.6859E−04 | $A_8$ | −1.9081E−04 | $A_8$ | −3.4837E−06 |
| $A_{10}$ | −1.5859E−06 | $A_{10}$ | 2.3281E−05 | $A_{10}$ | 1.8591E−05 | $A_{10}$ | −1.1854E−06 |
| $A_{12}$ | 0.0000E+00 | $A_{12}$ | 0.0000E+00 | $A_{12}$ | 0.0000E+00 | $A_{12}$ | 0.0000E+00 |

TABLE 14-continued

| Design parameters of the aspheric lens elements of the optical lens 10 in the fifth implementation | | | | | | | |
|---|---|---|---|---|---|---|---|
| S21 | | S22 | | S23 | | S24 | |
| K | 0.0000E+00 | K | 0.0000E+00 | K | 0.0000E+00 | K | 0.0000E+00 |
| $A_2$ | 0.0000E+00 | $A_2$ | 0.0000E+00 | $A_2$ | 0.0000E+00 | $A_2$ | 0.0000E+00 |
| $A_4$ | 6.7463E−03 | $A_4$ | 8.0917E−03 | $A_4$ | −2.7462E−03 | $A_4$ | −3.3316E−03 |
| $A_6$ | −6.6139E−04 | $A_6$ | −3.9108E−04 | $A_6$ | −1.8976E−04 | $A_6$ | −8.5279E−05 |
| $A_8$ | 1.3349E−04 | $A_8$ | 2.2780E−04 | $A_8$ | 1.2705E−04 | $A_8$ | 2.0906E−05 |
| $A_{10}$ | −1.7000E−05 | $A_{10}$ | −3.0005E−05 | $A_{10}$ | −1.6365E−05 | $A_{10}$ | −2.3256E−06 |
| $A_{12}$ | 0.0000E+00 | $A_{12}$ | 0.0000E+00 | $A_{12}$ | 9.6198E−07 | $A_{12}$ | 7.2417E−08 |

The foregoing parameters are substituted into the following formula $$z(x, y) = \frac{cr^2}{1 + \sqrt{1 - Kc^2 r^2}} + \sum_{i=1}^{N} \alpha_i \rho^i$$

The second lens element 112 and the third lens element 113 in the first lens element group 11, and the first lens element 121 and the second lens element 122 in the second lens element group 12 can be designed. In this implementation:

$$\sum_{i=1}^{N} \alpha_i \rho^i = A_2 r^2 + A_4 r^4 + A_6 r^6 + A_8 r^8 + A_{10} r^{10} + A_{12} r^{12}$$

The optical lens 10 in this implementation is obtained based on the design parameters of the foregoing lens elements. Basic parameters of the optical lens 10 in this implementation are shown in Table 15.

TABLE 15

| Basic parameters of the optical lens 10 in the fifth implementation | | | |
|---|---|---|---|
| Parameter | Value | Parameter | Value |
| f1 (mm) | 8.92 | f22 (mm) | 22890.06 |
| f2 (mm) | −11.12 | f (mm) | 16.46 |
| f11 (mm) | 9.0 | F# (mm) | 3.00 |
| f12 (mm) | −18.59 | IH (mm) | 4.5 |
| f13 (mm) | 16.62 | β | 1.84 |
| f14 (mm) | 57.05 | $|1 - \beta^2|$ | 2.38 |
| f21 (mm) | −10.98 | TTL (mm) | 17.17 | f14 represents a focal length of the fourth lens element 114 in the first lens element group 11. It should be noted that meanings of f14 and the like are the same in this application. When the symbols appear again subsequently, their meanings are not described again.

In this implementation, the total track length of the optical lens 10 is 17.17 mm. In this implementation, a distance d between an image side surface of a lens element closest to the second lens element group 12 in the first lens element group 11 and an object side surface of a lens element closest to the first lens element group 11 in the second lens element group 12 is a distance between the image side surface S16 of the third lens element 113 and the object side surface S21 of the first lens element 121. In this implementation, when the optical lens 10 is in the telephoto shooting state, the distance between the image side surface S16 of the third lens element 113 and the object side surface S21 of the first lens element 121 is 0.7 mm. When the optical lens 10 is in the macro shooting state, the distance between the image side surface S16 of the third lens element 113 and the object side surface S21 of the first lens element 121 is 3.2 mm.

In this implementation, a distance Δd for which the second lens element group 12 is movable relative to the first lens element group 11 is 2.5 mm. Application requirements in different scenarios of the optical lens 10 can be implemented through a short movement distance, and a requirement for a drive structure that drives the second lens element group 12 to move is low. A ratio of the distance Δd for which the second lens element group 12 is movable relative to the first lens element group 11 to the total track length TTL of the optical lens 10 is 0.146.

In this implementation, a ratio |f1/f2| of the focal length of the first lens element group 11 to the focal length of the second lens element group 12 of the optical lens 10 is 0.8. A ratio |f1/f| of the focal length of the first lens element group 11 of the optical lens 10 to the focal length of the optical lens 10 is 0.54. A ratio |f2/f| of the focal length of the second lens element group 12 of the optical lens 10 to the focal length of the optical lens 10 is 0.68. The focal lengths of the first lens element group 11 and the second lens element group 12 of the optical lens 10 can be properly allocated, so that the optical lens 10 can have a good imaging effect. The second lens element group 12 can cooperate with the first lens element group 11 to correct aberration of the optical lens 10, reduce distortion, and improve imaging quality of the optical lens 10. In addition, in this implementation, an absolute value |f1/f2| of the ratio of the focal length of the first lens element group 11 to the focal length of the second lens element group 12 is less than 1. That is, a refraction capability of the first lens element group 11 is stronger than that of the second lens element group 12. The first lens element group 11 has a stronger light adjustment capability. A light adjustment effect of the second lens element group 12 is small. Therefore, a difference between light adjustment effects of the optical lens 10 when the second lens element group 12 moves between different positions is reduced, to ensure that the imaging effect of the optical lens 10 can be always good when the second lens element group 12 is moved to adjust the focal length of the optical lens 10 to implement telephoto shooting and macro shooting.

In this implementation, a ratio |f11/f12| of the focal length of the first lens element 111 to the focal length of the second lens element 112 in the first lens element group 11 is 0.49. The focal lengths of the first lens element 111 and the second lens element 112 in the first lens element group 11 can be properly allocated, so that the optical lens 10 can have a good imaging effect. In addition, in this implementation, optical power of the first lens element 111 is less than optical power of the second lens element 112. That is, the first lens element 111 can have a good light convergence effect to converge more external light into the optical lens 10. This increases an amount of light incident to the optical lens 10, so that the optical lens 10 has a better imaging effect.

In this implementation, a ratio |f21/f2L| of the focal length of the first lens element 121 to a focal length of a lens element closest to the image side (namely, the second lens element 122) in the second lens element group 12 is 0.0005. The focal lengths of the first lens element 121 and the lens element closest to the image side (namely, the second lens element 122) in the second lens element group 12 can be properly allocated, so that the second lens element group 12 can have a good light adjustment effect, and the second lens element group 12 can achieve a good focal length adjustment effect, to move in an axial direction to achieve a good effect of adjusting the focal length of the optical lens 10. This ensures that the optical lens 10 can have a good shooting effect for different use requirements. In addition, in this implementation, an absolute value of the focal length of the first lens element 121 is less than an absolute value of the focal length of the lens element closest to the image side (namely, the second lens element 122) in the second lens element group 12. That is, the first lens element 121 in the second lens element group 12 has a high refraction degree. Therefore, during movement of the second lens element group 12 in the axial direction, light incident to the first lens element group 11 and transmitted to the second lens element group 12 can be adjusted as soon as possible after passing through the first lens element 121. This ensures that a good light adjustment effect is achieved in different use scenarios through as few lens elements as possible, to ensure that the optical lens 10 can have a good imaging effect in different use scenarios.

The focal length sensitivity |1−β^2| of the second lens element group 12 is 2.38. The ratio β of the incident angle of the light on the second lens element group 12 to the emergent angle of the light is 1.84. In this implementation, the focal length and the light adjustment capability of the second lens element group 12 fall within an appropriate range. This can achieve a better focal length adjustment effect, so that the optical lens 10 can achieve a good imaging effect in different use scenarios.

Figure 24:
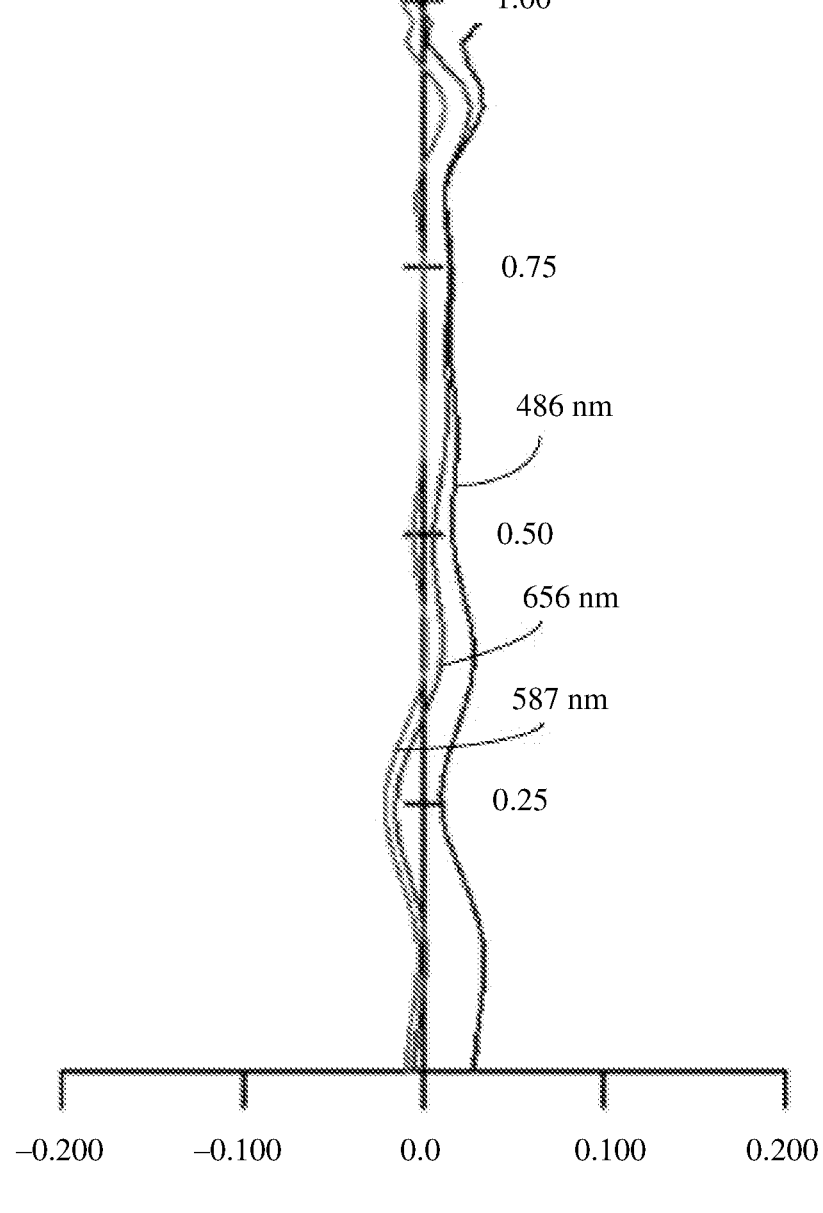
FIG. 24 is a diagram of transverse spherical aberration curves of light with wavelengths of 656 nm, 587 nm, and 486 nm passing through the optical lens in the fifth implementation of this application.
Figure 25:
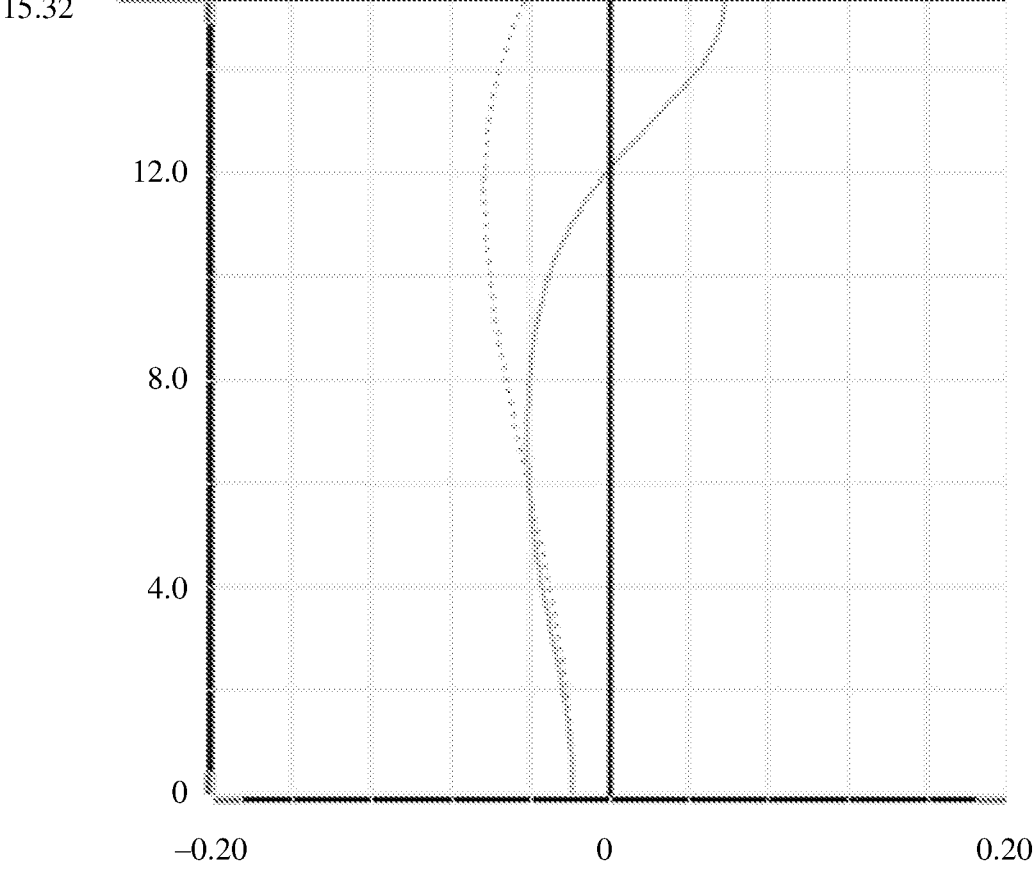
FIG. 25 is a diagram of an astigmatism field curvature of light with a wavelength of 555 nm passing through the optical lens in the fifth implementation of this application.
Figure 26:
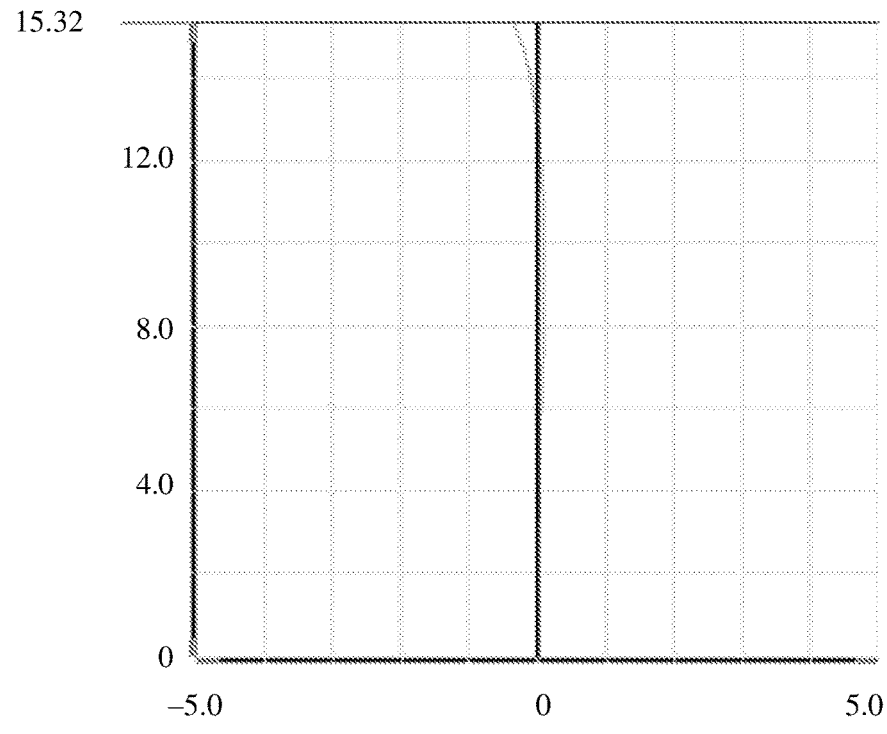
FIG. 26 is a distortion diagram of light with a wavelength of 555 nm passing through the optical lens in the fifth implementation of this application.

Refer to FIG. 24, FIG. 25, and FIG. 26. FIG. 24 is a diagram of transverse spherical aberration curves of light with wavelengths of 656 nm, 587 nm, and 486 nm passing through the optical lens 10 in the fifth implementation. In FIG. 24, a vertical coordinate represents an actual image height, in millimeters; and a horizontal coordinate represents chromatic aberration in a transverse direction, in millimeters. FIG. 25 is a diagram of an astigmatism field curvature of light with a wavelength of 555 nm passing through the optical lens 10 in the fifth implementation. In FIG. 25, a vertical coordinate represents a field of view angle, in degrees (°); and a horizontal coordinate represents an astigmatism field curvature of the optical lens 10, in millimeters (mm). A solid line represents a field curvature of light with a center wavelength (555 nm) on a meridian image plane. A dashed line represents a field curvature of light with a center wavelength (555 nm) on a sagittal image plane. FIG. 26 is a distortion diagram of light with a wavelength of 555 nm passing through the optical lens 10 in the fifth implementation. In FIG. 26, a vertical coordinate represents a field of view angle, in degrees (°); and a horizontal coordinate represents distortion of the light with a wavelength of 555 nm passing through the optical lens 10 in the fifth implementation, in %. It can be learned from FIG. 24 that in this implementation, the transverse spherical aberration of the light with different wavelengths passing through the optical lens 10 in this implementation is also controlled within a small range. It can be learned from FIG. 25 that after the light passes through the optical lens 10 in this implementation, astigmatism field curvatures in a sagittal direction and a meridian direction are small. In other words, an astigmatism field curvature of imaging of the optical lens 10 in this implementation are small. It can be learned from FIG. 26 that distortion of the light passing through the optical lens 10 in this implementation is small. In other words, imaging distortion of the optical lens 10 in this implementation is small. Therefore, in this implementation, the transverse spherical aberration, astigmatism field curvature, distortion, and the like of the light passing through the optical lens 10 in this implementation are small. In other words, the optical lens 10 in this implementation can achieve a good imaging effect.

Figure 27A:
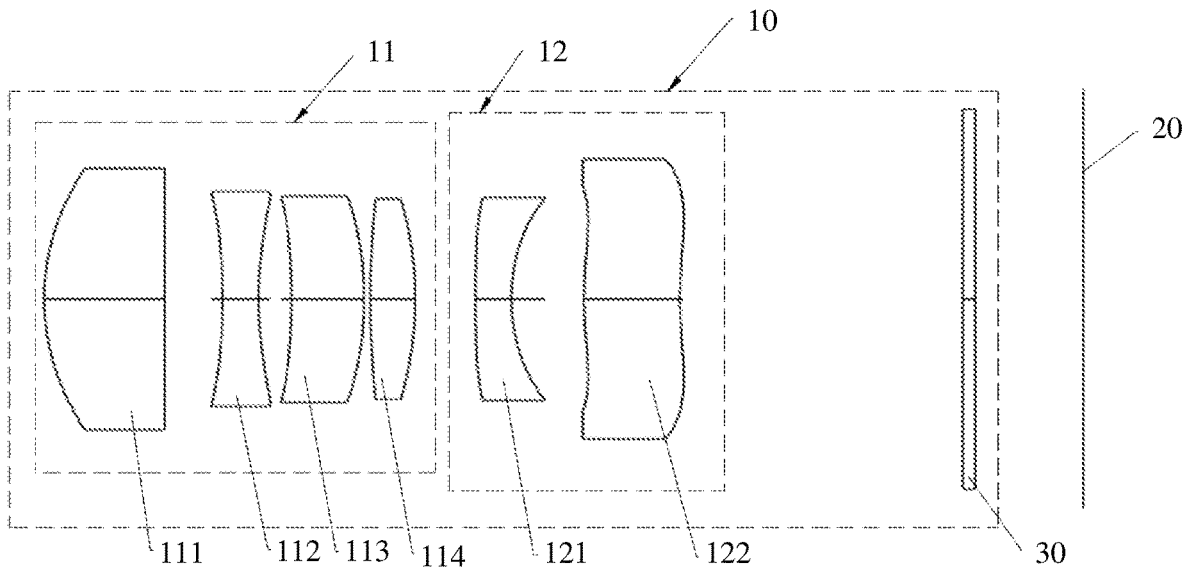
FIG. 27*a* is a schematic diagram of a structure of an optical lens in a sixth implementation of this application during telephoto shooting.
Figure 27B:
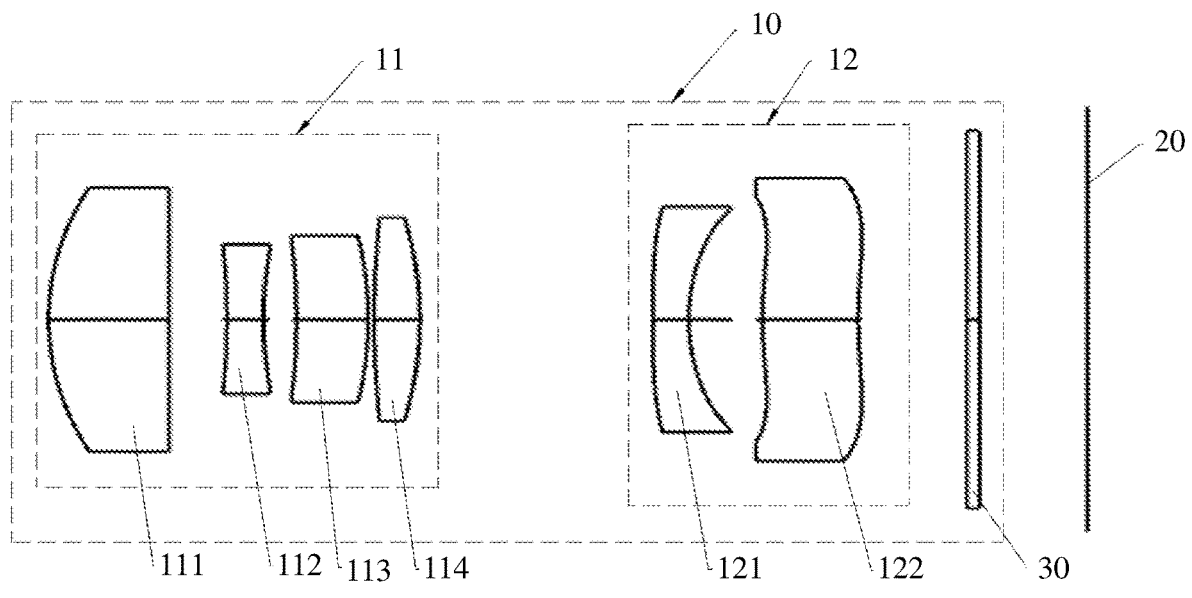
FIG. 27*b* is a schematic diagram of a structure of the optical lens in the sixth implementation of this application during macro shooting.

Refer to FIG. 27a and FIG. 27b. FIG. 27a is a schematic diagram of a structure of an optical lens 10 in a sixth implementation of this application during telephoto shooting. FIG. 27b is a schematic diagram of a structure of an optical lens 10 in the sixth implementation of this application during macro shooting. In this implementation, the optical lens 10 includes a first lens element group 11 and a second lens element group 12 that are sequentially arranged from an object side to an image side. The first lens element group 11 has four lens elements: a first lens element 111, a second lens element 112, a third lens element 113, and a fourth lens element 114. The first lens element 111, the second lens element 112, the third lens element 113, and the fourth lens element 114 are sequentially arranged from the object side to the image side. The second lens element group 12 has two lens elements: a first lens element 121 and a second lens element 122. The first lens element 121 and the second lens element 122 are sequentially arranged from the object side to the image side. In this implementation, the first lens element 111, the second lens element 112, the third lens element 113, the fourth lens element 114, the first lens element 121, and the second lens element 122 are coaxially disposed. In this implementation, an axial direction of the first lens element group 11 is an optical axis direction of the first lens element 111, the second lens element 112, the third lens element 113, and the fourth lens element 114. An axial direction of the second lens element group 12 is an optical axis direction of the first lens element 121 and the second lens element 122. The first lens element group 11 and the second lens element group 12 are coaxial.

The first lens element group 11 has positive optical power, and the second lens element group 12 has negative optical power. In the first lens element group 11, the first lens element 111 has positive optical power, the second lens element 112 has negative optical power, and a combination of the third lens element 113 and the fourth lens element 114 has positive optical power. The first lens element 121 and the second lens element 122 in the second lens element group 12 both have negative optical power. The first lens element 121 in the second lens element group 12 is a meniscus lens element, and an image side surface of the first lens element 121 is a concave surface.

In this implementation, the first lens element 111 in the first lens element group 11 is a glass lens element. Both an object side surface and the image side surface of the first lens element 111 in the first lens element group 11 are spherical surfaces. Object side surfaces and image side surfaces of the second lens element 112 and the third lens element 113 are high-order aspheric surfaces. Object side surfaces and image side surfaces of the first lens element 121 and the second lens element 122 in the second lens element group 12 are high-order aspheric surfaces. Based on the foregoing relations that the optical lens 10 in this application meets, design parameters of the optical lens 10 in the sixth implementation of this application are shown in Table 16.

TABLE 16

| | Design parameters of the optical lens 10 in the sixth implementation | | | | | |
|---|---|---|---|---|---|---|
| Surface number | Surface type | Curvature radius (mm) | Thickness d1 (mm) | Thickness d2 (mm) | Material refractive index | Material Abbe number |
| S11 | Spherical surface | 6.160 | 1.900 | 1.900 | 1.62 | 63.9 |
| S12 | Spherical surface | Infinity | 0.900 | 0.900 | | |
| S13 | Aspheric surface | −22.056 | 0.600 | 0.600 | 1.64 | 23.5 |
| S14 | Aspheric surface | 8.939 | 0.230 | 0.230 | | |
| S15 | Aspheric surface | −20.806 | 0.760 | 0.760 | 1.64 | 23.5 |
| S16 | Aspheric surface | −9.300 | 0.100 | 0.100 | | |
| S17 | Aspheric surface | 24.704 | 0.660 | 0.660 | 1.54 | 55.9 |
| S18 | Aspheric surface | −9.690 | 1.000 | 2.680 | | |
| S21 | Aspheric surface | 52.815 | 0.600 | 0.600 | 1.54 | 55.9 |
| S22 | Aspheric surface | 4.829 | 1.218 | 1.218 | | |
| S23 | Aspheric surface | 9.677 | 1.600 | 1.600 | 1.54 | 55.9 |
| S24 | Aspheric surface | 11.431 | 4.700 | 3.020 | | |
| S31 | Spherical surface | Infinity | 0.210 | 0.210 | 1.5168 | 64.17 |
| S32 | Spherical surface | Infinity | 1.800 | 1.800 | | |

Table 17 shows design parameters of aspheric lens elements of the optical lens 10 in this implementation. In this implementation, the second lens element 112, the third lens element 113, and the fourth lens element 114 in the first lens element group 11, and the first lens element 121 and the second lens element 122 in the second lens element group 12 are all aspheric lens elements.

TABLE 17

| | Design parameters of the aspheric lens elements of the optical lens 10 in the sixth implementation | | | | | | |
|---|---|---|---|---|---|---|---|
| | S13 | | S14 | | S15 | | S16 |
| K | 0.0000E+00 | K | 0.0000E+00 | K | 0.0000E+00 | K | 0.0000E+00 |
| $A_2$ | 0.0000E+00 | $A_2$ | 0.0000E+00 | $A_2$ | 0.0000E+00 | $A_2$ | 0.0000E+00 |
| $A_4$ | −4.7093E−03 | $A_4$ | −5.8929E−03 | $A_4$ | −3.2524E−03 | $A_4$ | −6.0857E−04 |
| $A_6$ | 7.8282E−04 | $A_6$ | 8.6173E−04 | $A_6$ | 1.6527E−04 | $A_6$ | 7.8775E−05 |
| $A_8$ | −8.3305E−05 | $A_8$ | −5.9728E−05 | $A_8$ | 3.4429E−05 | $A_8$ | −2.4361E−05 |
| $A_{10}$ | 4.3869E−06 | $A_{10}$ | 5.1265E−07 | $A_{10}$ | −7.8523E−06 | $A_{10}$ | 2.8294E−07 |
| $A_{12}$ | 0.0000E+00 | $A_{12}$ | 0.0000E+00 | $A_{12}$ | 0.0000E+00 | $A_{12}$ | 0.0000E+00 |
| | S17 | | S18 | | S21 | | S22 |
| K | 0.0000E+00 | K | 0.0000E+00 | K | 0.0000E+00 | K | 0.0000E+00 |
| $A_2$ | 0.0000E+00 | $A_2$ | 0.0000E+00 | $A_2$ | 0.0000E+00 | $A_2$ | 0.0000E+00 |
| $A_4$ | 4.6675E−04 | $A_4$ | 7.2270E−05 | $A_4$ | 2.6657E−03 | $A_4$ | −7.1236E−04 |
| $A_6$ | −1.3474E−04 | $A_6$ | −9.4840E−05 | $A_6$ | 2.5105E−04 | $A_6$ | 8.7045E−04 |
| $A_8$ | −1.8615E−05 | $A_8$ | 1.8009E−05 | $A_8$ | −1.4572E−05 | $A_8$ | −9.4282E−05 |
| $A_{10}$ | 2.1732E−06 | $A_{10}$ | −1.4431E−06 | $A_{10}$ | 2.1888E−06 | $A_{10}$ | 1.9919E−05 |
| $A_{12}$ | 0.0000E+00 | $A_{12}$ | 0.0000E+00 | $A_{12}$ | −6.7399E−07 | $A_{12}$ | −2.2227E−06 |
| | S23 | | | | S24 | | |
| K | | 0.0000E+00 | | K | | 0.0000E+00 | |
| $A_2$ | | 0.0000E+00 | | $A_2$ | | 0.0000E+00 | |
| $A_4$ | | −1.0258E−02 | | $A_4$ | | −8.2191E−03 | |
| $A_6$ | | 5.5860E−04 | | $A_6$ | | 2.4553E−04 | |
| $A_8$ | | −1.9594E−04 | | $A_8$ | | −4.5867E−05 | |
| $A_{10}$ | | 3.6209E−05 | | $A_{10}$ | | 5.0715E−06 | |
| $A_{12}$ | | −2.8852E−06 | | $A_{12}$ | | −2.9934E−07 | |

The foregoing parameters are substituted into the following formula:

$$z(x, y) = \frac{cr^2}{1 + \sqrt{1 - Kc^2 r^2}} + \sum_{i=1}^{N} \alpha_i \rho^i$$

The second lens element 112, the third lens element 113, and the fourth lens element 114 in the first lens element group 11, and the first lens element 121 and the second lens element 122 in the second lens element group 12 can be designed. In this implementation:

$$\sum_{i=1}^{N} \alpha_i \rho^i = A_2 r^2 + A_4 r^4 + A_6 r^6 + A_8 r^8 + A_{10} r^{10} + A_{12} r^{12}$$

The optical lens 10 in this implementation is obtained based on the design parameters of the foregoing lens elements. Basic parameters of the optical lens 10 in this implementation are shown in Table 18.

TABLE 18

| Basic parameters of the optical lens 10 in the sixth implementation | | | |
| --- | --- | --- | --- |
| Parameter | Value | Parameter | Value |
| f1 (mm) | 9.30 | f22 (mm) | 87.76 |
| f2 (mm) | −10.62 | f (mm) | 16.61 |
| f11 (mm) | 9.9 | F# (mm) | 3.00 |
| f12 (mm) | −9.87 | IH (mm) | 4.5 |
| f13 (mm) | 25.26 | β | 1.79 |
| f14 (mm) | 12.89 | $|1 - \beta^{\wedge}2|$ | 2.19 |
| f21 (mm) | −9.82 | TTL (mm) | 16.278 |

In this implementation, the total track length of the optical lens 10 is 16.278 mm. In this implementation, a distance d between an image side surface of a lens element closest to the second lens element group 12 in the first lens element group 11 and an object side surface of a lens element closest to the first lens element group 11 in the second lens element group 12 is a distance between the image side surface S16 of the third lens element 113 and the object side surface S21 of the first lens element 121. In this implementation, when the optical lens 10 is in the telephoto shooting state, the distance between the image side surface S16 of the third lens element 113 and the object side surface S21 of the first lens element 121 is 1 mm. When the optical lens 10 is in the macro shooting state, the distance between the image side surface S16 of the third lens element 113 and the object side surface S21 of the first lens element 121 is 2.68 mm.

In this implementation, a distance Δd for which the second lens element group 12 is movable relative to the first lens element group 11 is 1.68 mm. Application requirements in different scenarios of the optical lens 10 can be implemented through a short movement distance, and a requirement for a drive structure that drives the second lens element group 12 to move is low. A ratio of the distance Δd for which the second lens element group 12 is movable relative to the first lens element group 11 to the total track length TTL of the optical lens 10 is 0.1.

In this implementation, a ratio |f1/f2| of the focal length of the first lens element group 11 to the focal length of the second lens element group 12 of the optical lens 10 is 0.88. A ratio |f1/f| of the focal length of the first lens element group 11 of the optical lens 10 to the focal length of the optical lens 10 is 0.56. A ratio |f2/f| of the focal length of the second lens element group 12 of the optical lens 10 to the focal length of the optical lens 10 is 0.64. The focal lengths of the first lens element group 11 and the second lens element group 12 of the optical lens 10 can be properly allocated, so that the optical lens 10 can have a good imaging effect. The second lens element group 12 can cooperate with the first lens element group 11 to correct aberration of the optical lens 10, reduce distortion, and improve imaging quality of the optical lens 10. In addition, in this implementation, an absolute value of the focal length of the first lens element group 11 is less than an absolute value of the focal length of the second lens element group 12. That is, a refraction capability of the first lens element group 11 is stronger than that of the second lens element group 12. The first lens element group 11 has a stronger light adjustment capability. A light adjustment effect of the second lens element group 12 is small. Therefore, a difference between light adjustment effects of the optical lens 10 when the second lens element group 12 moves between different positions is reduced, to ensure that the imaging effect of the optical lens 10 can be always good when the second lens element group 12 is moved to adjust the focal length of the optical lens 10 to implement telephoto shooting and macro shooting.

In this implementation, a ratio |f11/f12| of the focal length of the first lens element 111 to the focal length of the second lens element 112 in the first lens element group 11 is 1.01. The focal lengths of the first lens element 111 and the second lens element 112 in the first lens element group 11 can be properly allocated, so that the optical lens 10 can have a good imaging effect.

In this implementation, a ratio |f21/f2L| of the focal length of the first lens element 121 to a focal length of a lens element closest to the image side (namely, the second lens element 122) in the second lens element group 12 is 0.11. The focal lengths of the first lens element 121 and the lens element closest to the image side (namely, the second lens element 122) in the second lens element group 12 can be properly allocated, so that the second lens element group 12 can have a good light adjustment effect, and the second lens element group 12 can achieve a good focal length adjustment effect, to move in an axial direction to achieve a good effect of adjusting the focal length of the optical lens 10. This ensures that the optical lens 10 can have a good shooting effect for different use requirements. In addition, in this implementation, an absolute value of the focal length of the first lens element 121 is less than an absolute value of the focal length of the lens element closest to the image side (namely, the second lens element 122) in the second lens element group 12. That is, the first lens element 121 in the second lens element group 12 has a high refraction degree. Therefore, during movement of the second lens element group 12 in the axial direction, light incident to the first lens element group 11 and transmitted to the second lens element group 12 can be adjusted as soon as possible after passing through the first lens element 121. This ensures that a good light adjustment effect is achieved in different use scenarios through as few lens elements as possible, to ensure that the optical lens 10 can have a good imaging effect in different use scenarios.

The focal length sensitivity |1−β^2| of the second lens element group 12 is 2.19. The ratio β of the incident angle of the light on the second lens element group 12 to the emergent angle of the light is 1.79. In this implementation, the focal length and the light adjustment capability of the second lens element group 12 fall within an appropriate range. This can achieve a better focal length adjustment effect, so that the optical lens 10 can achieve a good imaging effect in different use scenarios.

Figure 28:
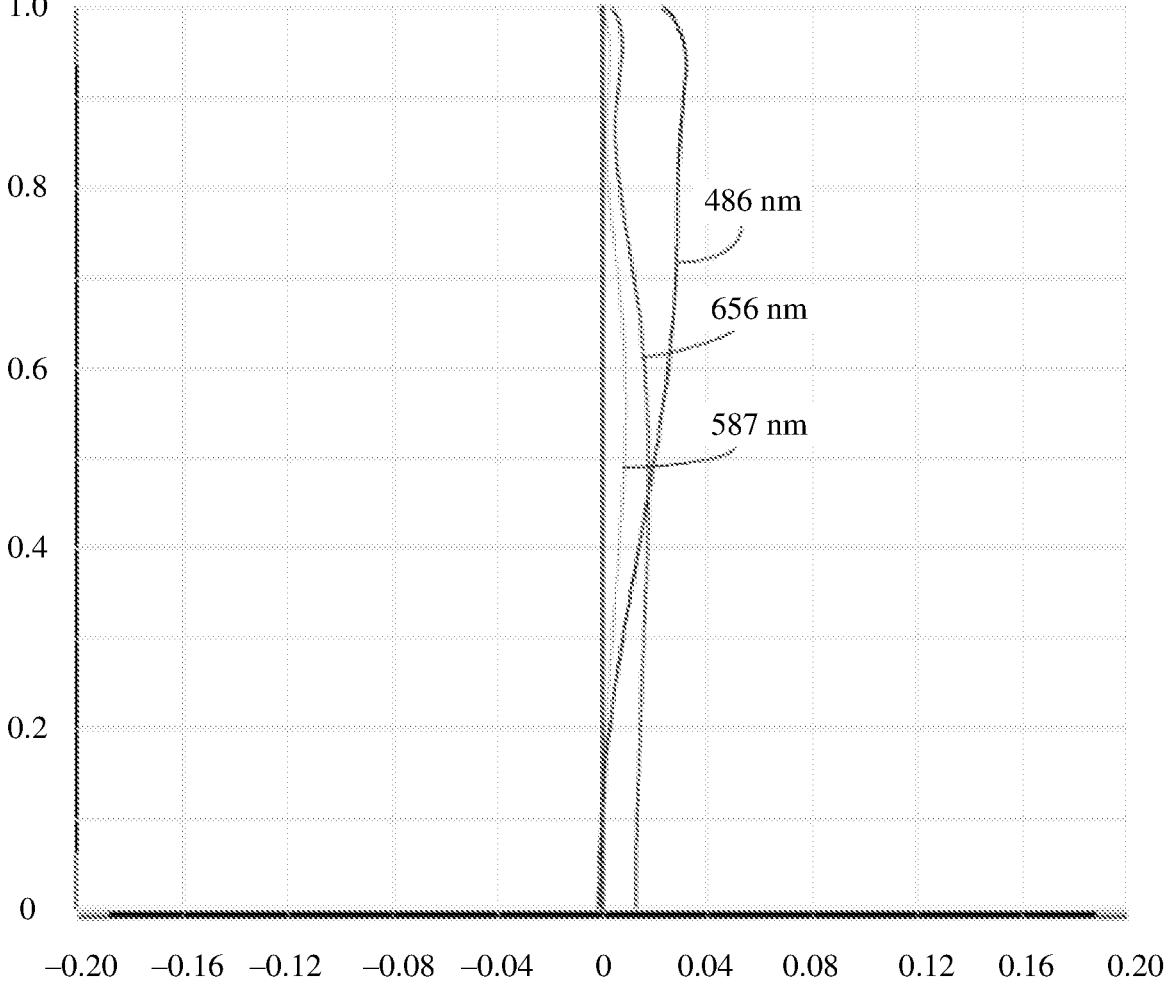
FIG. 28 is a diagram of transverse spherical aberration curves of light with wavelengths of 656 nm, 587 nm, and 486 nm passing through the optical lens in the sixth implementation of this application.
Figure 29:
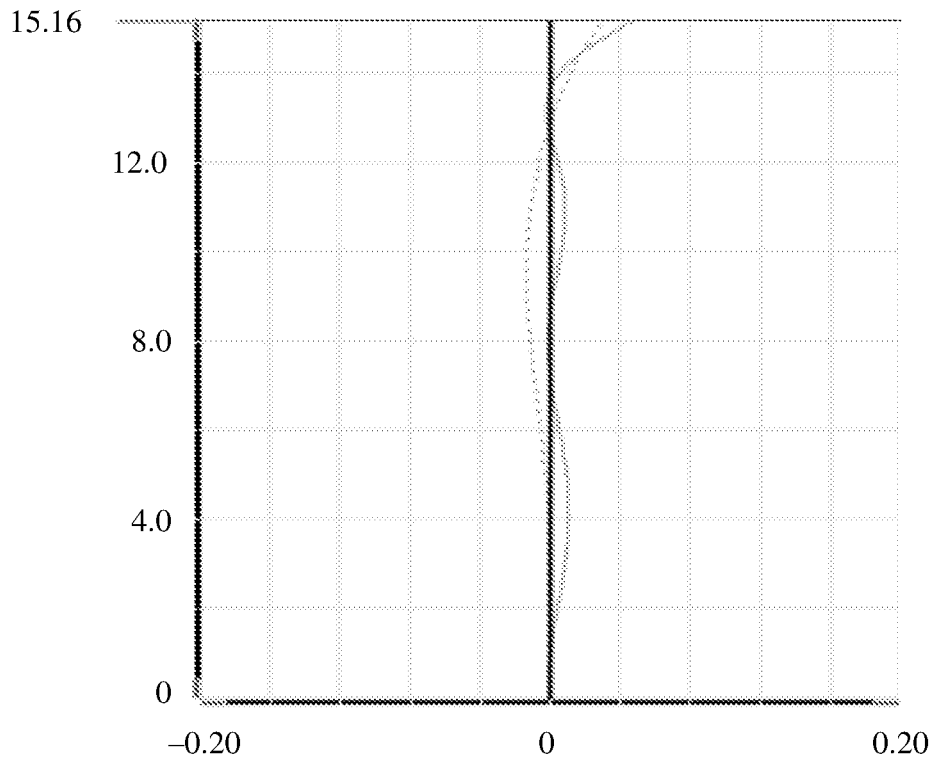
FIG. 29 is a diagram of an astigmatism field curvature of light with a wavelength of 555 nm passing through the optical lens in the sixth implementation of this application.
Figure 30:
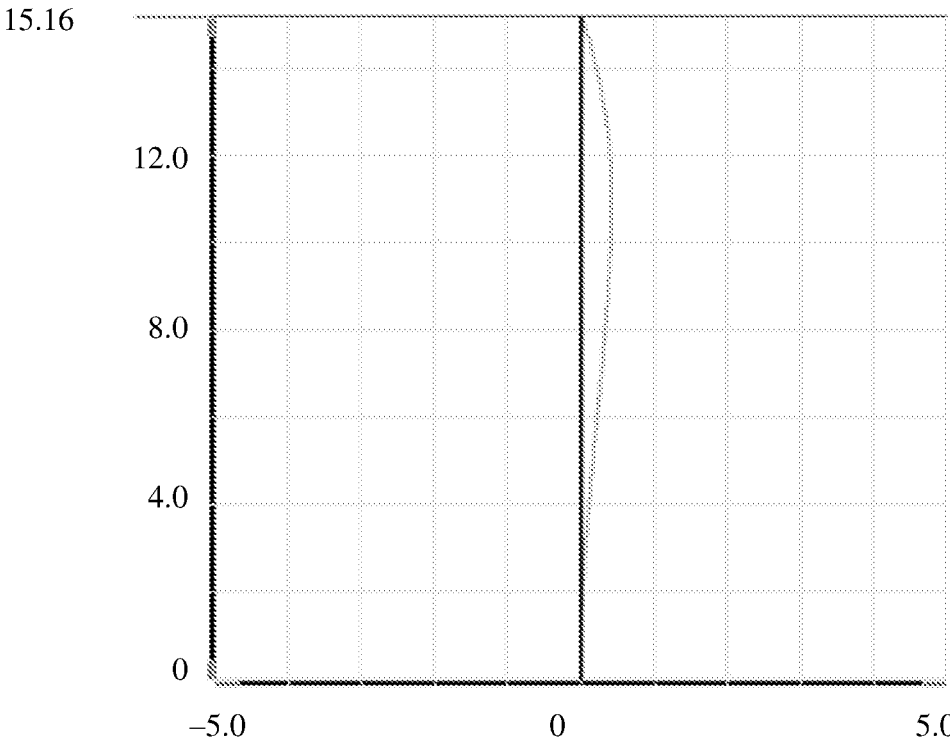
FIG. 30 is a distortion diagram of light with a wavelength of 555 nm passing through the optical lens in the sixth implementation of this application.

Refer to FIG. 28, FIG. 29, and FIG. 30. FIG. 28 is a diagram of transverse spherical aberration curves of light with wavelengths of 656 nm, 587 nm, and 486 nm passing through the optical lens 10 in the sixth implementation. In FIG. 28, a vertical coordinate represents an actual image height, in millimeters; and a horizontal coordinate represents chromatic aberration in a transverse direction, in millimeters. FIG. 29 is a diagram of an astigmatism field curvature of light with a wavelength of 555 nm passing through the optical lens 10 in the sixth implementation. In FIG. 29, a vertical coordinate represents a field of view angle, in degrees (°); and a horizontal coordinate represents an astigmatism field curvature of the optical lens 10, in millimeters (mm). A solid line represents a field curvature of light with a center wavelength (555 nm) on a meridian image plane. A dashed line represents a field curvature of light with a center wavelength (555 nm) on a sagittal image plane. FIG. 30 is a distortion diagram of light with a wavelength of 555 nm passing through the optical lens 10 in the sixth implementation. In FIG. 30, a vertical coordinate represents a field of view angle, in degrees (°); and a horizontal coordinate represents distortion of the light with a wavelength of 555 nm passing through the optical lens 10 in the fifth implementation, in %. It can be learned from FIG. 28 that in this implementation, the transverse spherical aberration of the light with different wavelengths passing through the optical lens 10 in this implementation is also controlled within a small range. It can be learned from FIG. 29 that after the light passes through the optical lens 10 in this implementation, astigmatism field curvatures in a sagittal direction and a meridian direction are small. In other words, an astigmatism field curvature of imaging of the optical lens 10 in this implementation are small. It can be learned from FIG. 30 that distortion of the light passing through the optical lens 10 in this implementation is small. In other words, imaging distortion of the optical lens 10 in this implementation is small. Therefore, in this implementation, the transverse spherical aberration, astigmatism field curvature, distortion, and the like of the light passing through the optical lens 10 in this implementation are small. In other words, the optical lens 10 in this implementation can achieve a good imaging effect.

Figure 31A:
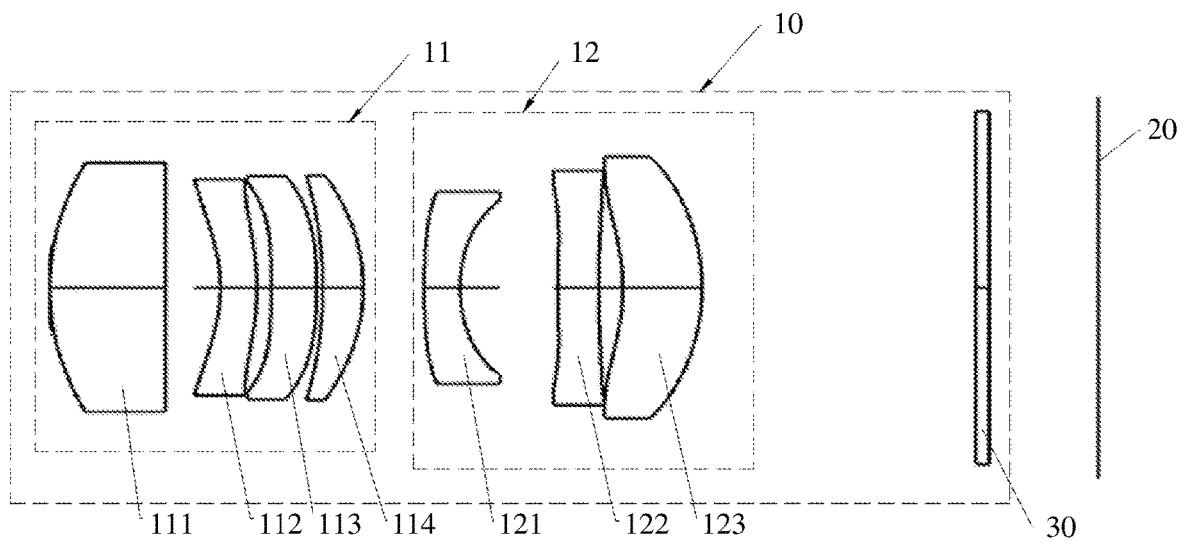
FIG. 31*a* is a schematic diagram of a structure of an optical lens in a seventh implementation of this application during telephoto shooting.
Figure 31B:
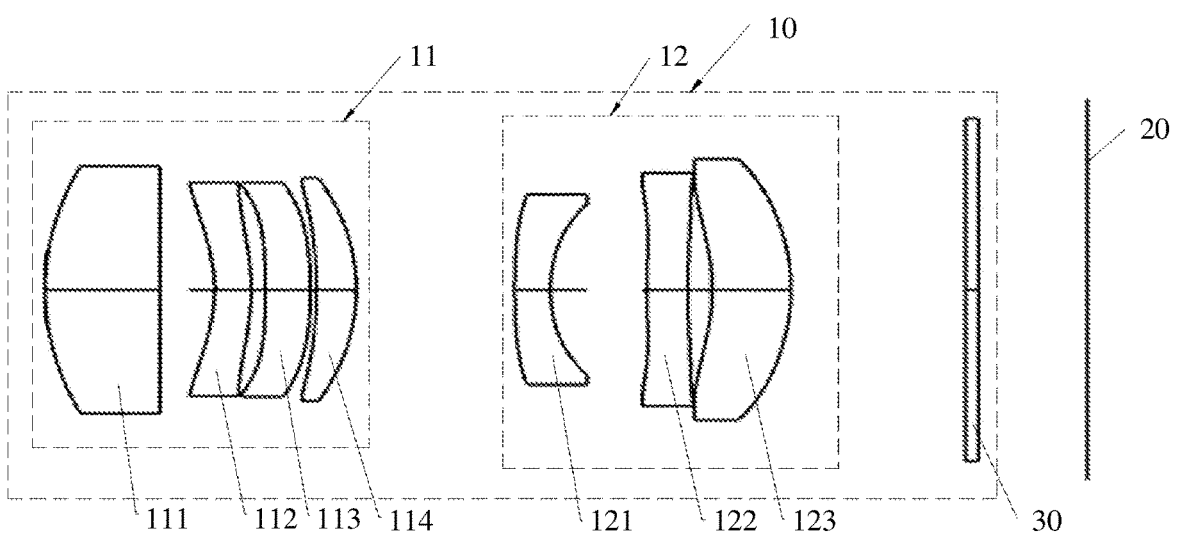
FIG. 31*b* is a schematic diagram of a structure of the optical lens in the seventh implementation of this application during macro shooting.

Refer to FIG. 31a and FIG. 31b. FIG. 31a is a schematic diagram of a structure of an optical lens 10 in a seventh implementation of this application during telephoto shooting. FIG. 31b is a schematic diagram of a structure of an optical lens 10 in the seventh implementation of this application during macro shooting. In this implementation, the optical lens 10 includes a first lens element group 11 and a second lens element group 12 that are sequentially arranged from an object side to an image side. The first lens element group 11 has four lens elements: a first lens element 111, a second lens element 112, a third lens element 113, and a fourth lens element 114. The first lens element 111, the second lens element 112, the third lens element 113, and the fourth lens element 114 are sequentially arranged from the object side to the image side. The second lens element group 12 has two lens elements: a first lens element 121, a second element 113, the fourth lens element 114, the first lens element 121, the second lens element 122, and the third lens element 123 are coaxially disposed. In this implementation, an axial direction of the first lens element group 11 is an optical axis direction of the first lens element 111, the second lens element 112, the third lens element 113, and the fourth lens element 114. An axial direction of the second lens element group 12 is an optical axis direction of the first lens element 121, the second lens element 122, and the third lens element 123. The first lens element group 11 and the second lens element group 12 are coaxial.

The first lens element group 11 has positive optical power, and the second lens element group 12 has negative optical power. In the first lens element group 11, the first lens element 111 has positive optical power, the second lens element 112 has negative optical power, and the third lens element 113 and the fourth lens element 114 both have positive optical power. In the second lens element group 12, the first lens element 121 has negative optical power, and the second lens element 122 and the third lens element 123 both have positive optical power. The first lens element 121 in the second lens element group 12 is a meniscus lens element, and an image side surface of the first lens element 121 is a concave surface.

In this implementation, the first lens element 111 in the first lens element group 11 is a glass lens element. Both an object side surface and the image side surface of the first lens element 111 in the first lens element group 11 are spherical surfaces. Object side surfaces and image side surfaces of the second lens element 112 and the third lens element 113 are high-order aspheric surfaces. Object side surfaces and image side surfaces of the first lens element 121 and the second lens element 122 in the second lens element group 12 are high-order aspheric surfaces. Based on the foregoing relations that the optical lens 10 in this application meets, design parameters of the optical lens 10 in the seventh implementation of this application are shown in Table 19.

TABLE 19

| Design parameters of the optical lens 10 in the seventh implementation | | | | | | |
|---|---|---|---|---|---|---|
| Surface number | Surface type | Curvature radius (mm) | Thickness d1 (mm) | Thickness d2 (mm) | Material refractive index | Material Abbe number |
| S11 | Spherical surface | 6.069 | 1.956 | 1.956 | 1.62 | 63.9 |
| S12 | Spherical surface | −362.071 | 0.618 | 0.618 | | |
| S13 | Aspheric surface | −3.845 | 0.450 | 0.450 | 1.64 | 23.5 |
| S14 | Aspheric surface | −6.102 | 0.907 | 0.907 | | |
| S15 | Aspheric surface | −45.033 | 1.130 | 1.130 | 1.64 | 23.5 |
| S16 | Aspheric surface | −11.118 | 0.080 | 0.080 | | |
| S17 | Aspheric surface | −10.288 | 0.688 | 0.688 | 1.54 | 55.9 |
| S18 | Aspheric surface | −4.687 | 1.000 | 2.300 | | |
| S21 | Aspheric surface | 22.239 | 0.590 | 0.590 | 1.54 | 55.9 |
| S22 | Aspheric surface | 3.651 | 1.600 | 1.600 | | |
| S23 | Aspheric surface | 17.841 | 0.680 | 0.680 | 1.54 | 55.9 |
| S24 | Aspheric surface | 18.284 | 0.400 | 0.400 | | |
| S25 | Aspheric surface | −5.003 | 1.300 | 1.300 | 1.54 | 55.9 |
| S26 | Aspheric surface | −5.043 | 4.510 | 3.210 | | |
| S31 | Spherical surface | Infinity | 0.210 | 0.210 | 1.5168 | 64.17 |
| S32 | Spherical surface | Infinity | 1.800 | 1.800 | | | lens element 122, and a third lens element 123. The first lens element 121, the second lens element 122, and the third lens element 123 are sequentially arranged from the object side to the image side. In this implementation, the first lens element 111, the second lens element 112, the third lens S25 represents an object side surface of the third lens element 123 in the second lens element group 12. S26 represents an image side surface of the third lens element 123 in the second lens element group 12. It should be noted that meanings of S25, S26, and the like are the same in this application. When the symbols appear again subsequently, their meanings are not described again.

Table 20 shows design parameters of aspheric lens elements of the optical lens 10 in this implementation. In this implementation, the second lens element 112, the third lens element 113, and the fourth lens element 114 in the first lens element group 11, and the first lens element 121, the second lens element 122, and the third lens element 123 in the second lens element group 12 are all aspheric lens elements.

TABLE 20

Design parameters of the aspheric lens elements of
the optical lens 10 in the seventh implementation

| | S13 | | S14 | | S15 | | S16 |
|---|---|---|---|---|---|---|---|
| K | 0.0000E+00 | K | 0.0000E+00 | K | 0.0000E+00 | K | 0.0000E+00 |
| $A_2$ | 0.0000E+00 | $A_2$ | 0.0000E+00 | $A_2$ | 0.0000E+00 | $A_2$ | 0.0000E+00 |
| $A_4$ | 1.4210E−02 | $A_4$ | 7.2141E−03 | $A_4$ | −1.7031E−02 | $A_4$ | −9.2329E−03 |
| $A_6$ | −6.6556E−04 | $A_6$ | 6.6329E−04 | $A_6$ | 1.0747E−03 | $A_6$ | 1.5089E−04 |
| $A_8$ | 4.6246E−05 | $A_8$ | −9.6180E−05 | $A_8$ | −1.2031E−04 | $A_8$ | −1.1402E−05 |
| $A_{10}$ | −2.2766E−06 | $A_{10}$ | 4.6114E−06 | $A_{10}$ | −4.8703E−08 | $A_{10}$ | −2.0337E−06 |
| $A_{12}$ | 0.0000E+00 | $A_{12}$ | 0.0000E+00 | $A_{12}$ | 0.0000E+00 | $A_{12}$ | 0.0000E+00 |

| | S17 | | S18 | | S21 | | S22 |
|---|---|---|---|---|---|---|---|
| K | 0.0000E+00 | K | 0.0000E+00 | K | 0.0000E+00 | K | 0.0000E+00 |
| $A_2$ | 0.0000E+00 | $A_2$ | 0.0000E+00 | $A_2$ | 0.0000E+00 | $A_2$ | 0.0000E+00 |
| $A_4$ | 5.4051E−05 | $A_4$ | −3.5242E−05 | $A_4$ | 7.0056E−03 | $A_4$ | 8.3054E−03 |
| $A_6$ | −3.5936E−06 | $A_6$ | 3.6542E−06 | $A_6$ | 6.9133E−04 | $A_6$ | 2.0619E−03 |
| $A_8$ | −1.3310E−07 | $A_8$ | 4.5344E−07 | $A_8$ | −2.6144E−04 | $A_8$ | −2.0078E−04 |
| $A_{10}$ | 1.2707E−07 | $A_{10}$ | 1.4673E−07 | $A_{10}$ | 2.2929E−05 | $A_{10}$ | 3.3307E−05 |
| $A_{12}$ | 0.0000E+00 | $A_{12}$ | 0.0000E+00 | $A_{12}$ | 0.0000E+00 | $A_{12}$ | 0.0000E+00 |

| | S23 | | S24 | | S25 | | S26 |
|---|---|---|---|---|---|---|---|
| K | 0.0000E+00 | K | 0.0000E+00 | K | 0.0000E+00 | K | 0.0000E+00 |
| $A_2$ | 0.0000E+00 | $A_2$ | 0.0000E+00 | $A_2$ | 0.0000E+00 | $A_2$ | 0.0000E+00 |
| $A_4$ | −1.3192E−02 | $A_4$ | −5.2818E−03 | $A_4$ | 9.7573E−03 | $A_4$ | 1.2922E−03 |
| $A_6$ | 3.9287E−04 | $A_6$ | 2.5953E−04 | $A_6$ | 7.0871E−05 | $A_6$ | −2.8601E−04 |
| $A_8$ | 2.2841E−05 | $A_8$ | 5.4373E−05 | $A_8$ | −6.5518E−05 | $A_8$ | 4.2902E−06 |
| $A_{10}$ | 1.8236E−05 | $A_{10}$ | −8.9534E−07 | $A_{10}$ | 7.6317E−06 | $A_{10}$ | −1.0571E−06 |
| $A_{12}$ | 0.0000E+00 | $A_{12}$ | 0.0000E+00 | $A_{12}$ | 0.0000E+00 | $A_{12}$ | 0.0000E+00 |

The foregoing parameters are substituted into the following formula:

$$z(x, y) = \frac{cr^2}{1 + \sqrt{1 - Kc^2r^2}} + \sum_{i=1}^{N} \alpha_i \rho^i$$

The second lens element 112, the third lens element 113, and the fourth lens element 114 in the first lens element group 11, and the first lens element 121, the second lens element 122, and the third lens element 123 in the second lens element group 12 can be designed. In this implementation:

$$\sum_{i=1}^{N} \alpha_i \rho^i = A_2 r^2 + A_4 r^4 + A_6 r^6 + A_8 r^8 + A_{10} r^{10} + A_{12} r^{12}$$

The optical lens 10 in this implementation is obtained based on the design parameters of the foregoing lens elements. Basic parameters of the optical lens 10 in this implementation are shown in Table 21.

TABLE 21

Basic parameters of the optical lens
10 in the seventh implementation

| Parameter | Value | Parameter | Value |
|---|---|---|---|
| f1 (mm) | 7.79 | f23 (mm) | 110.92 |
| f2 (mm) | −9.92 | f (mm) | 16.61 |

TABLE 21-continued

Basic parameters of the optical lens
10 in the seventh implementation

| Parameter | Value | Parameter | Value |
|---|---|---|---|
| f11 (mm) | 9.6 | F# (mm) | 3.2 |
| f12 (mm) | −17.58 | IH (mm) | 4 |
| f13 (mm) | 26.90 | β | 2.14 |
| f14 (mm) | 15.18 | $|1 − β^2|$ | 3.57 |
| f21 (mm) | −8.11 | TTL (mm) | 15.909 |
| f22 (mm) | 877.02 | | | f23 represents a focal length of the third lens element 123 in the second lens element group 12. It should be noted that meanings of f23 and the like are the same in this application. When the symbols appear again subsequently, their meanings are not described again.

In this implementation, the total track length of the optical lens 10 is 15.909 mm. In this implementation, a distance d between an image side surface of a lens element closest to the second lens element group 12 in the first lens element group 11 and an object side surface of a lens element closest to the first lens element group 11 in the second lens element group 12 is a distance between the image side surface S16 of the third lens element 113 and the object side surface S21 of the first lens element 121. In this implementation, when the optical lens 10 is in the telephoto shooting state, the distance between the image side surface S16 of the third lens element 113 and the object side surface S21 of the first lens element 121 is 1 mm. When the optical lens 10 is in the macro shooting state, the distance between the image side surface S16 of the third lens element 113 and the object side surface S21 of the first lens element 121 is 2.3 mm.

In this implementation, a distance $\Delta d$ for which the second lens element group 12 is movable relative to the first lens element group 11 is 1.3 mm. Application requirements in different scenarios of the optical lens 10 can be implemented through a short movement distance, and a requirement for a drive structure that drives the second lens element group 12 to move is low. A ratio of the distance $\Delta d$ for which the second lens element group 12 is movable relative to the first lens element group 11 to the total track length TTL of the optical lens 10 is 0.08.

In this implementation, a ratio |f1/f2| of the focal length of the first lens element group 11 to the focal length of the second lens element group 12 of the optical lens 10 is 0.79. A ratio |f1/f| of the focal length of the first lens element group 11 of the optical lens 10 to the focal length of the optical lens 10 is 0.47. A ratio |f2/f| of the focal length of the second lens element group 12 of the optical lens 10 to the focal length of the optical lens 10 is 0.59. The focal lengths of the first lens element group 11 and the second lens element group 12 of the optical lens 10 can be properly allocated, so that the optical lens 10 can have a good imaging effect. The second lens element group 12 can cooperate with the first lens element group 11 to correct aberration of the optical lens 10, reduce distortion, and improve imaging quality of the optical lens 10. In addition, in this implementation, an absolute value of the focal length of the first lens element group 11 is less than an absolute value of the focal length of the second lens element group 12. That is, a refraction capability of the first lens element group 11 is stronger than that of the second lens element group 12. The first lens element group 11 has a stronger light adjustment capability. A light adjustment effect of the second lens element group 12 is small. Therefore, a difference between light adjustment effects of the optical lens 10 when the second lens element group 12 moves between different positions is reduced, to ensure that the imaging effect of the optical lens 10 can be always good when the second lens element group 12 is moved to adjust the focal length of the optical lens 10 to implement telephoto shooting and macro shooting.

In this implementation, a ratio |f11/f12| of the focal length of the first lens element 111 to the focal length of the second lens element 112 in the first lens element group 11 is 0.55. The focal lengths of the first lens element 111 and the second lens element 112 in the first lens element group 11 can be properly allocated, so that the optical lens 10 can have a good imaging effect. In addition, in this implementation, optical power of the first lens element 111 is less than optical power of the second lens element 112. That is, the first lens element 111 can have a good light convergence effect to converge more external light into the optical lens 10. This increases an amount of light incident to the optical lens 10, so that the optical lens 10 has a better imaging effect.

In this implementation, a ratio |f21/f2L| of the focal length of the first lens element 121 to a focal length of a lens element closest to the image side (namely, the third lens element 123) in the second lens element group 12 is 0.07. The focal lengths of the first lens element 121 and the lens element closest to the image side (namely, the third lens element 123) in the second lens element group 12 can be properly allocated, so that the second lens element group 12 can have a good light adjustment effect, and the second lens element group 12 can achieve a good focal length adjustment effect, to move in an axial direction to achieve a good effect of adjusting the focal length of the optical lens 10. This ensures that the optical lens 10 can have a good shooting effect for different use requirements. In addition, in this implementation, an absolute value of the focal length of the first lens element 121 is less than an absolute value of the focal length of the lens element closest to the image side (namely, the third lens element 123) in the second lens element group 12. That is, the first lens element 121 in the second lens element group 12 has a high refraction degree. Therefore, during movement of the second lens element group 12 in the axial direction, light incident to the first lens element group 11 and transmitted to the second lens element group 12 can be adjusted as soon as possible after passing through the first lens element 121. This ensures that a good light adjustment effect is achieved in different use scenarios through as few lens elements as possible, to ensure that the optical lens 10 can have a good imaging effect in different use scenarios.

The focal length sensitivity $|1-\beta^2|$ of the second lens element group 12 is 3.57. The ratio $\beta$ of the incident angle of the light on the second lens element group 12 to the emergent angle of the light is 2.14. In this implementation, the focal length and the light adjustment capability of the second lens element group 12 fall within an appropriate range. This can achieve a better focal length adjustment effect, so that the optical lens 10 can achieve a good imaging effect in different use scenarios.

Figure 32:
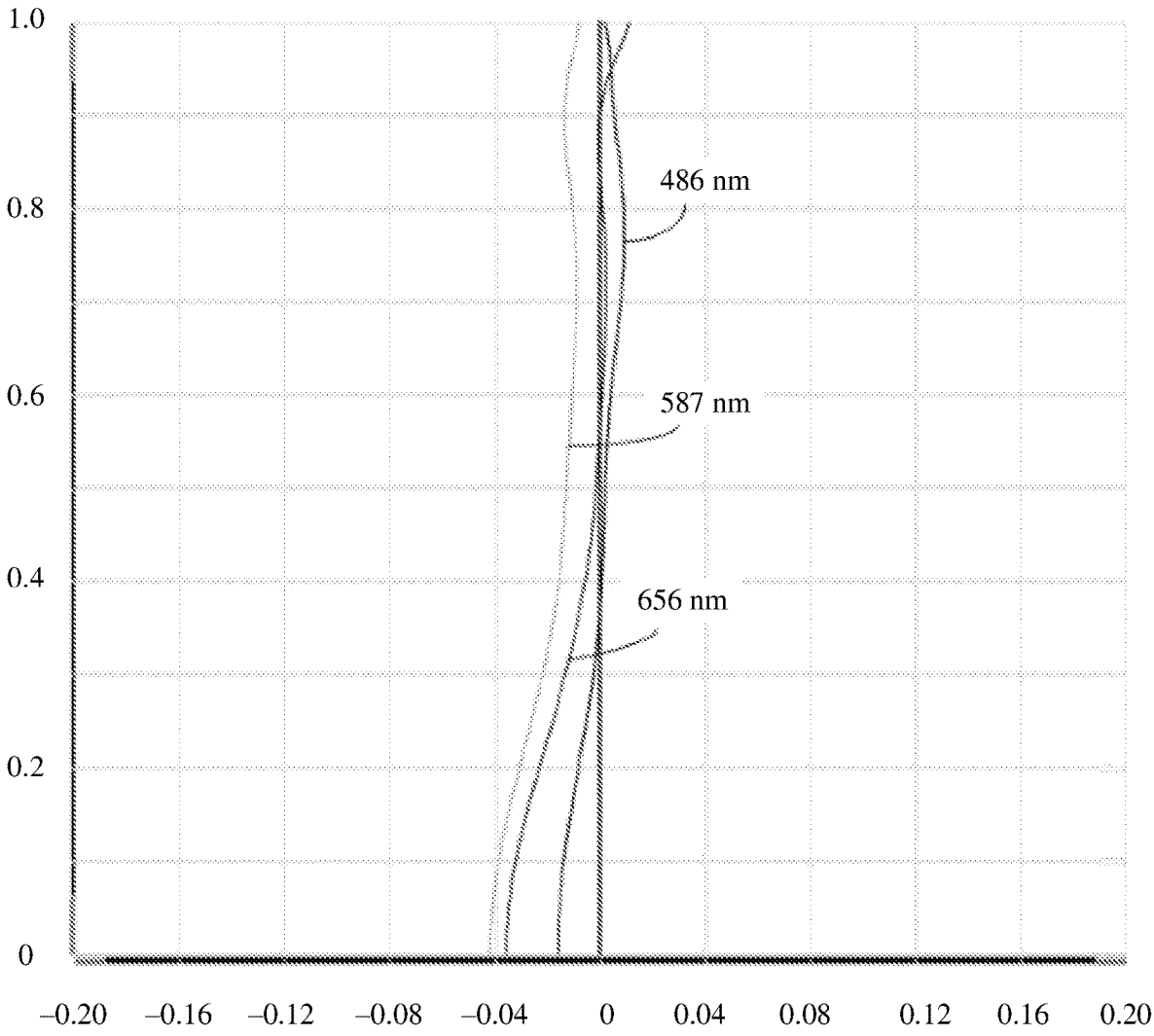
FIG. 32 is a diagram of transverse spherical aberration curves of light with wavelengths of 656 nm, 587 nm, and 486 nm passing through the optical lens in the seventh implementation of this application.
Figure 33:
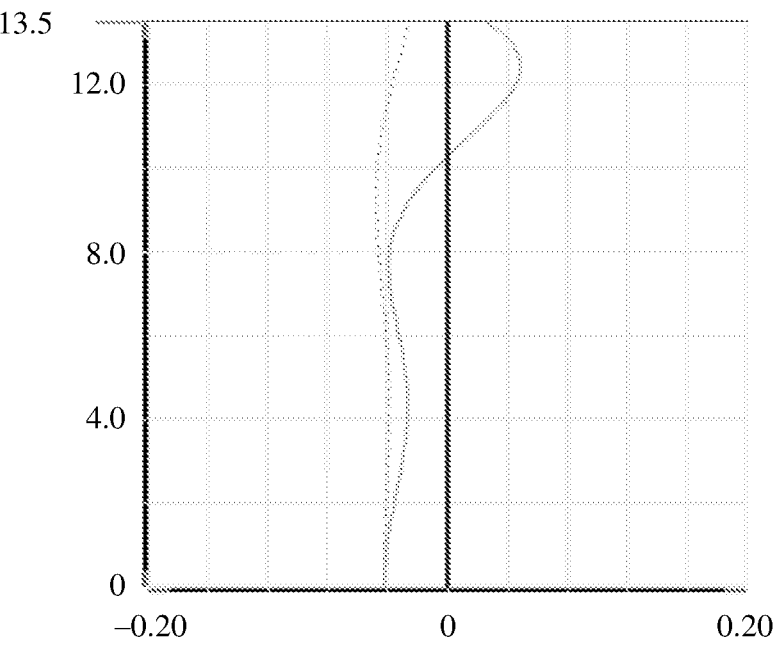
FIG. 33 is a diagram of an astigmatism field curvature of light with a wavelength of 555 nm passing through the optical lens in the seventh implementation of this application.
Figure 34:
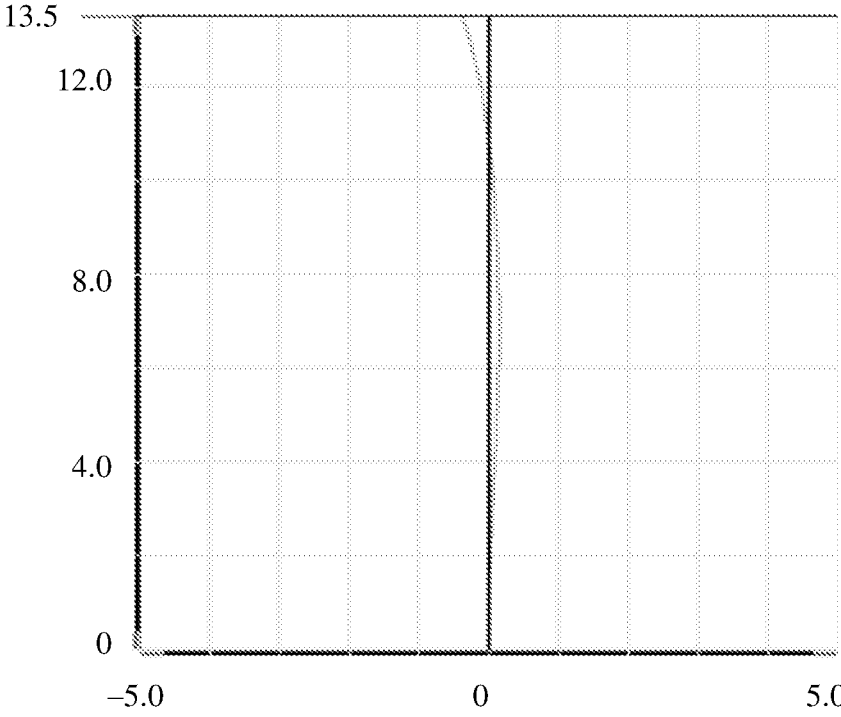
FIG. 34 is a distortion diagram of light with a wavelength of 555 nm passing through the optical lens in the seventh implementation of this application.

Refer to FIG. 32, FIG. 33, and FIG. 34. FIG. 32 is a diagram of transverse spherical aberration curves of light with wavelengths of 656 nm, 587 nm, and 486 nm passing through the optical lens 10 in the seventh implementation. In FIG. 32, a vertical coordinate represents an actual image height, in millimeters; and a horizontal coordinate represents chromatic aberration in a transverse direction, in millimeters. FIG. 33 is a diagram of an astigmatism field curvature of light with a wavelength of 555 nm passing through the optical lens 10 in the seventh implementation. In FIG. 33, a vertical coordinate represents a field of view angle, in degrees (°); and a horizontal coordinate represents an astigmatism field curvature of the optical lens 10, in millimeters (mm). A solid line represents a field curvature of light with a center wavelength (555 nm) on a meridian image plane. A dashed line represents a field curvature of light with a center wavelength (555 nm) on a sagittal image plane. FIG. 34 is a distortion diagram of light with a wavelength of 555 nm passing through the optical lens 10 in the seventh implementation. In FIG. 34, a vertical coordinate represents a field of view angle, in degrees (°); and a horizontal coordinate represents distortion of the light with a wavelength of 555 nm passing through the optical lens 10 in the seventh implementation, in %. It can be learned from FIG. 32 that in this implementation, the transverse spherical aberration of the light with different wavelengths passing through the optical lens 10 in this implementation is also controlled within a small range. It can be learned from FIG. 33 that after the light passes through the optical lens 10 in this implementation, astigmatism field curvatures in a sagittal direction and a meridian direction are small. In other words, an astigmatism field curvature of imaging of the optical lens 10 in this implementation are small. It can be learned from FIG. 34 that distortion of the light passing through the optical lens 10 in this implementation is small. In other words, imaging distortion of the optical lens 10 in this implementation is small. Therefore, in this implementation, the transverse spherical aberration, astigmatism field curvature, distortion, and the like of the light passing through the optical lens 10 in this implementation are small. In other words, the optical lens 10 in this implementation can achieve a good imaging effect.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical lens, comprising:
a first lens element group and a second lens element group that are arranged from an object side to an image side, wherein the first lens element group and the second lens element group being coaxially disposed;
the first lens element group and the second lens element group each comprise a plurality of lens elements, and each of the lens element comprises an object side surface facing the object side and an image side surface facing the image side;
the first lens element group has positive optical power, and the second lens element group has negative optical power; and
the second lens element group being movable relative to the first lens element group in an axial direction, a distance $\Delta d$ for which the second lens element group is movable relative to the first lens element group satisfies the following relation: $\Delta d \leq 4$ mm, and the second lens element group of the optical lens satisfies the following relation: $1.4 < |1-\beta^2| < 3.8$, wherein $\beta$ represents a ratio of an incident angle of light on the second lens element group to an emergent angle of the light, and $1-\beta^2|1-\beta^2|$ represents focal length sensitivity of the second lens element group.

2. The optical lens according to claim 1, wherein the optical lens satisfies the following relation:
$TTL \leq 25$ mm, wherein TTL represents a total track length of the optical lens.

3. The optical lens according to claim 1, wherein the optical lens satisfies the following relation:
$F \# \geq 2$, wherein F # represents an f-number of the optical lens.

4. The optical lens according to claim 1, wherein a position of the first lens element group is fixed.

5. The optical lens according to claim 1, wherein the plurality of lens elements in the first lens element group comprises a first lens element and a second lens element that are sequentially arranged from the object side to the image side, the first lens element having positive optical power, the second lens element having negative optical power, and combined optical power of the lens elements in the first lens element group, except the first lens element and the second lens element, is positive optical power.

6. The optical lens according to claim 1, wherein a first lens element closest to the object side in the second lens element group is a meniscus lens element, and an image side surface of the first lens element is a concave surface.

7. The optical lens according to claim 1, wherein the first lens element group comprises three or four lens elements, and the second lens element group comprises two or three lens elements.

8. The optical lens according to claim 1, wherein the optical lens satisfies the following relation:

$0.4 < |f1/f2| < 1.1$, wherein f1 represents a focal length of the first lens element group, and f2 represents a focal length of the second lens element group.

9. The optical lens according to claim 8, wherein the optical lens satisfies the following relation:
$0.4 < |f1/f2| < 1$, wherein f1 represents the focal length of the first lens element group, and f2 represents the focal length of the second lens element group.

10. The optical lens according to claim 1, wherein the optical lens satisfies the following relation:
$0.4 < |f2/f| < 1$, wherein f2 represents the focal length of the second lens element group, and f represents a focal length of the optical lens corresponding to a case in which the first lens element group is closest to the second lens element group.

11. The optical lens according to claim 1, wherein the first lens element group of the optical lens satisfies the following relation:
$0.2 < |f11/f12| < 1.1$, wherein
f11 represents a focal length of the first lens element in the first lens element group, and
f12 represents a focal length of the second lens element in the first lens element group.

12. The optical lens according to claim 11, wherein the first lens element group of the optical lens satisfies the following relation:
$0.2 < |f11/f12| < 1$, wherein f11 represents the focal length of the first lens element in the first lens element group, and f12 represents the focal length of the second lens element in the first lens element group.

13. The optical lens according to claim 1, wherein the second lens element group of the optical lens satisfies the following relation:
$|f21/f2L| < 10$, wherein f21 represents a focal length of the first lens element in the second lens element group, and f2L represents a focal length of a lens element closest to the image side in the second lens element group.

14. The optical lens according to claim 13, wherein the second lens element group of the optical lens satisfies the following relation:
$|f21/f2L| < 1$, wherein f2L represents the focal length of the first lens element in the second lens element group, and f2L represents the focal length of the lens element closest to the image side in the second lens element group.

15. The optical lens according to claim 1, wherein the lens element closest to the object side in the first lens element group is a glass lens element, and the lens element closest to the object side in the first lens element group is a spherical lens element.

16. The optical lens according to claim 1, wherein the plurality of lens elements in the first lens element group comprise at least four aspheric lens elements, and the lens elements in the second lens element group are all aspheric lens elements.

17. The optical lens according to claim 1, wherein the optical lens further comprises an optical path refraction element, the optical path refraction element is disposed on a side that is of the first lens element assembly side and that is away from the second lens element assembly, wherein light is refracted by the optical path refraction component, sequentially passes through the first lens element assembly and the second lens element assembly, and then is emergent.

18. A camera module, comprising:
a photosensitive element; and
an optical lens, the optical lens comprising a first lens element group and a second lens element group arranged from an object side to an image side, the first lens element group and the second lens element group being coaxially disposed;

the first lens element group and the second lens element group each comprise a plurality of lens elements, each lens element comprises an object side surface facing the object side and an image side surface facing the image side;

the first lens element group has positive optical power, and the second lens element group has negative optical power;

the second lens element group being movable relative to the first lens element group in an axial direction, a distance $\Delta d$ for which the second lens element group is movable relative to the first lens element group satisfies the relation: $\Delta d \leq 4$ mm, and the second lens element group of the optical lens satisfies the following relation: $1.4 < |1-\beta\hat{}2| < 3.8$, wherein $\beta$ represents a ratio of an incident angle of light on the second lens element group to an emergent angle of the light, and $1-\beta\hat{}2|1-\beta\hat{}2|$ represents focal length sensitivity of the second lens element group;

wherein the photosensitive element is located on the image side of the optical lens, and light is projected onto the photosensitive element after passing through the optical lens; and a distance between the first lens element assembly and the photosensitive element remains unchanged, and the second lens element assembly is movable along an optical axis between the first lens element assembly and the photosensitive element.

19. An electronic device, comprising:

an image processor; and a camera module, the camera module comprising:

a photosensitive element; and an optical lens, the optical lens comprising a first lens element group and a second lens element group, the first lens element group and the second lens element group being arranged from an object side to an image side, the first lens element group and the second lens element group are coaxially disposed;

the first lens element group and the second lens element group each comprise a plurality of lens elements, and each lens element comprises an object side surface facing the object side and an image side surface facing the image side;

the first lens element group has positive optical power, and the second lens element group has negative optical power; and the second lens element group being movable relative to the first lens element group in an axial direction, a distance $\Delta d$ for which the second lens element group is movable relative to the first lens element group satisfies the relation: $\Delta d \leq 4$ mm, and the second lens element group of the optical lens satisfies the following relation: $1.4 < |1-\beta\hat{}2| < 3.8$, wherein $\Delta$ represents a ratio of an incident angle of light on the second lens element group to an emergent angle of the light, and $1-\beta\hat{}2|1-\beta\hat{}2|$ represents focal length sensitivity of the second lens element group;

the photosensitive element being located on the image side of the optical lens, and light is projected onto the photosensitive element after passing through the optical lens; and a distance between the first lens element assembly and the photosensitive element remains unchanged, and the second lens element assembly is movable along an optical axis between the first lens element assembly and the photosensitive element;

the image processor being communicatively connected to the camera module;

the camera module being configured to obtain image data and input the image data into the image processor, and the image processor is configured to process the image data.

\* \* \* \* \*